US012587807B2

(12) United States Patent
Seed et al.

(10) Patent No.: US 12,587,807 B2
(45) Date of Patent: Mar. 24, 2026

(54) CONTEXTUAL-BASED SERVICES FOR THE DYNAMIC MANAGEMENT OF DEVICE LOCATIONING GROUP

(71) Applicant: InterDigital Patent Holdings, Inc., Wilmington, DE (US)

(72) Inventors: Dale Seed, Allentown, PA (US); Xu Li, Plainsboro, NJ (US); Lu Liu, Conshohocken, PA (US); Michael Starsinic, Newtown, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 271 days.

(21) Appl. No.: 18/259,880

(22) PCT Filed: Dec. 30, 2021

(86) PCT No.: PCT/US2021/065768
§ 371 (c)(1),
(2) Date: Jun. 29, 2023

(87) PCT Pub. No.: WO2022/147311
PCT Pub. Date: Jul. 7, 2022

(65) Prior Publication Data
US 2024/0080643 A1 Mar. 7, 2024

Related U.S. Application Data

(60) Provisional application No. 63/131,994, filed on Dec. 30, 2020.

(51) Int. Cl.
*H04W 4/02* (2018.01)
*H04W 4/029* (2018.01)
*H04W 60/04* (2009.01)

(52) U.S. Cl.
CPC ........... *H04W 4/023* (2013.01); *H04W 4/029* (2018.02); *H04W 60/04* (2013.01)

(58) Field of Classification Search
CPC ..... H04W 4/023; H04W 4/029; H04W 60/04; H04W 4/08; G01S 5/0027; G01S 5/0205
USPC ....................................................... 455/456.1
See application file for complete search history.

(56) References Cited

FOREIGN PATENT DOCUMENTS

| | | | | | |
|---|---|---|---|---|---|
| CN | 1851497 | A | * 10/2006 | | |
| EP | 1860904 | | 11/2007 | | |
| EP | 1860904 | A1 | * 11/2007 | .............. | H04W 8/08 |

* cited by examiner

*Primary Examiner* — Tanmay K Shah
(74) *Attorney, Agent, or Firm* — Flaster Greenberg, P.C.

(57) ABSTRACT

Methods are described for dynamically managing device locationing groups. According to some aspects, mobile devices may be tracked on a group basis, e.g., as opposed to being tracking on an individual basis. For example, location information for each of a plurality of mobile devices may be received at a location group server (LGS) and the LGS may determine (e.g., based on the location information) that each of the plurality of devices are in a physical location. One or more location group operations may be triggered by the location group server (e.g., based on determining that each of the plurality of devices are in the physical location) and the LGS may receive a location update from a device of the plurality of mobile devices (e.g., wherein the location update is not received from a remainder of the plurality of mobile devices).

20 Claims, 56 Drawing Sheets

LG Policy Configuration

- AC Types
- LG Operations
- Max number members
- Min number members
- LG leader criteria
- LG ranging criteria
- LG schedule criteria
- LG location criteria
- LG operation policies

CONTEXTUAL-BASED SERVICES FOR THE DYNAMIC MANAGEMENT OF DEVICE LOCATIONING GROUP

CROSS-REFERENCE TO RELATED APPLICATIONS

This application is the National Stage Application of International Patent Application No. PCT/US2021/065768, filed Dec. 30, 2021, which claims the benefit of U.S. Provisional Application No. 63/131,994, filed Dec. 30, 2020, entitled "Contextual-Based Services for the Dynamic Management of Device Locationing Groups," which is hereby incorporated by reference in its entirety.

BACKGROUND

3GPP SA6 defines additional location and group management services to complement and interface to the group and location management functions defined by 3GPP SA2. These services are hosted on a UE and in the network and enable a UE to send location reports to a location server in the network such that the location of the UE can be shared with other authorized entities. Also defined is a service for creating a group of UEs based on their location (e.g., group UEs that are in the same location). See 3GPP TS 23.434 V16.5.0.

3GPP as well as other networking standards currently lack intelligent services to assist with the dynamic and opportunistic grouping of devices located within proximity of one another and that have similar location service requirements. By opportunistically grouping together devices having similar location service requirements and that are within the vicinity of one another, location reporting and tracking can be optimized such that it is performed on a group-basis rather than on an individual device-basis. This can save device, network and application resources by reducing the number of location reporting messages and overhead in the system. For example, rather than each individual device having to send separate location reports to a location server, a single device in the group can report location on behalf of all the members in the group. However, this is not realistically feasible in present day network deployments. Intelligent services are currently lacking the capability to dynamically collect and analyze situational context from the network, devices, application clients hosted on the devices and the remote applications and servers communicating with the devices, and dynamically detect opportunities for grouping devices within proximity of one another and that have similar location service requirements.

SUMMARY

Described herein are methods, apparatus, and systems for dynamically managing device locationing groups. According to one aspect, locationing group (LG) services may address a shortcoming of a lack of intelligent services to manage situational grouping of devices located within vicinity of one another for the purpose of tracking location on a group-basis.

According to some aspects, LG services may support the capability to dynamically collect and analyze situational context from various entities including communication networks, devices, application clients hosted on the devices and remote applications and servers. LG services may determine optimal conditions and times for triggering group management operations to be performed on a set of devices for purposes of tracking their location on a group basis rather than on an individual device basis. According to some aspects, this may result in a reduction of location tracking overhead on member devices of the group, a network used by the devices for location tracking, and applications receiving device location information.

According to some aspects, mobile devices may be tracked on a group basis, e.g., as opposed to being tracking on an individual basis. For example, location information for each of a plurality of mobile devices may be received at a location group server. The location information may be part of a request from one or more location group clients. The location group server (LGS) may determine (e.g., based on the location information) that each of the plurality of devices are in a physical location (e.g., a geographic location or proximity to a geographic location). The location information may include one or more of a location group client (LGC) identifier, a LGC credential, identifiers (IDs) of application clients (ACs) associated with a LGC, an AC context, an LGC registration result, LGC policies, and/or LGS context.

According to some aspects, one or more location group operations may be triggered by the location group server (e.g., based on determining that each of the plurality of devices are in the physical location). For example, the location group operations may include one or more of selecting a lead device of the plurality of devices, forming a location group, adding or removing a member from a location group, assigning a leader to a location group, configuring a client to start or stop reporting location information, and/or controlling a frequency at which location information is reported. The location group server may receive a location update from a device of the plurality of mobile devices (e.g., wherein the location update is not received from a remainder of the plurality of mobile devices).

According to some aspects, a User Equipment (UE) may include a processor, communications circuitry, and a memory. The memory may include instructions which, when executed by the processor cause the UE to perform one or more operations. For example, the UE may transmit location information associated with the UE to a location group server. The UE may receive (e.g., from the location group server) one or more location group operations. The one or more location group operations may be based at least in part on the location information and the location group operations may include forming a location group including the UE and a plurality of mobile devices. For example, the one or more location group operations may include one or more of selecting the UE as a lead device of the location group, adding or removing a member from the location group, configuring a client to start or stop reporting location information, or controlling a frequency at which location information is reported.

According to some aspects, the UE may transmit (e.g., based on the one or more location group operations) a location update. The location update may include a group location of the plurality of mobile devices (e.g., where\ the location update is not transmitted by a remainder of the plurality of devices).

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to features that solve any or all disadvantages noted in any part of this disclosure.

BRIEF DESCRIPTION OF THE DRAWINGS

A more detailed understanding may be had from the following description, given by way of example in conjunction with the accompanying drawings.

DETAILED DESCRIPTION

Figure 1:
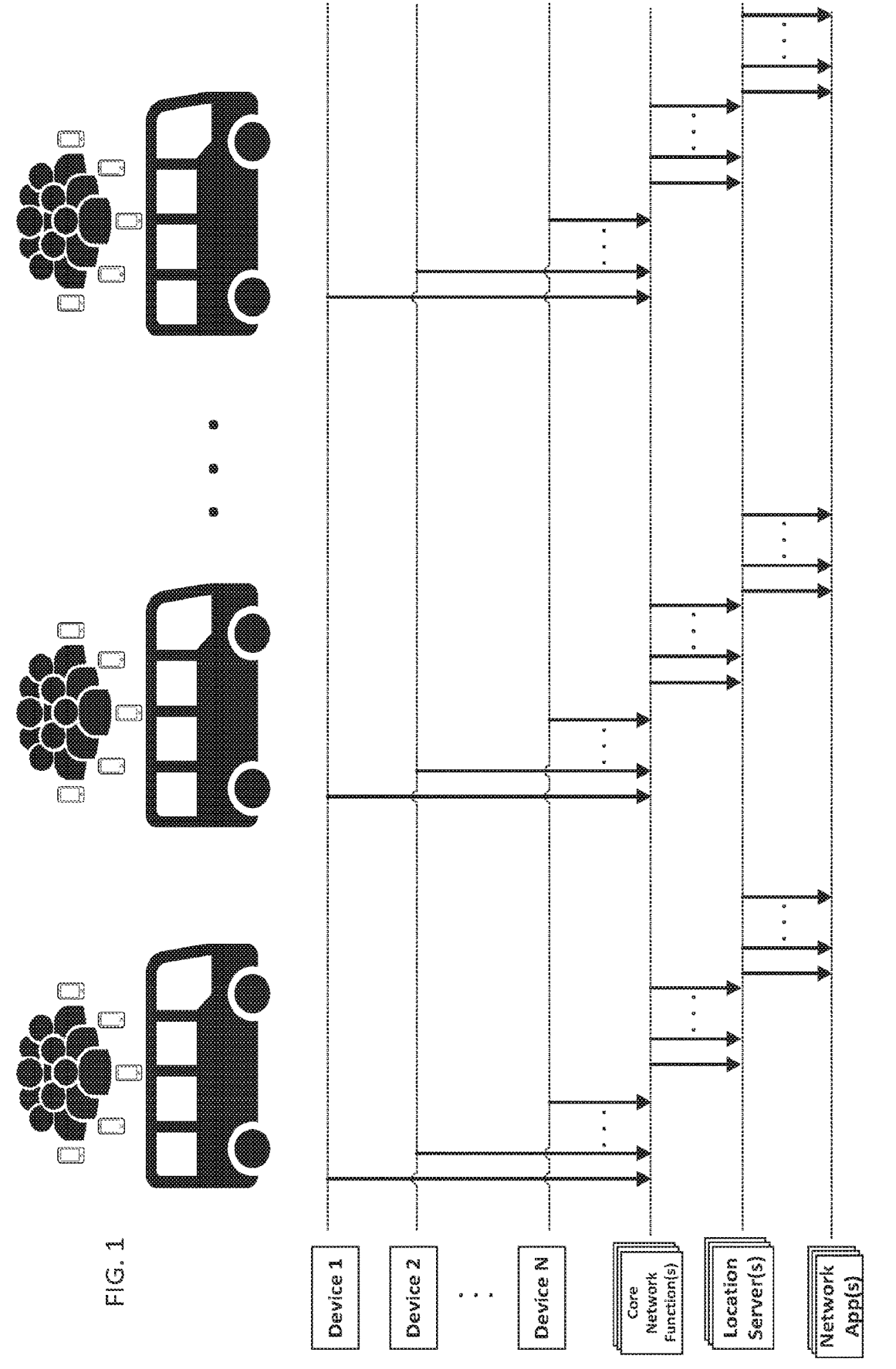
FIG. 1 shows an example of Individual Device-based Location Reporting and Tracking.

Table 0.1 describes some of the abbreviations used herein.

TABLE 0.1

| Abbreviations | |
|---|---|
| 5GC | 5G Core Network |
| API | Application Programming Interface |
| AS | Application Server |
| AC | Application Client |
| CN | Core Network |
| LGC | Locationing Group Client |
| LGS | Locationing Group Server |
| LGMF | Locationing Group Management Function |
| EAS | Application Server |
| ECS | Edge Configuration Server |
| EES | Edge Enabler Server |
| EEC | Edge Enabler Client |
| GUI | Graphical User Interface |
| NEF | Network Exposure Function |
| NF | Network Function |
| SCS | Service Capability Server |
| SCEF | Service Capability Exposure Function |
| SEAL | Service Enabler Architecture Layer |
| SL | Service Layer |
| TLS | Transport Layer Security |
| UE | User Equipment |
| URI | Universal Resource Identifier |
| VAE | V2X Application Enabler |
| V2X | Vehicle to Everything |

Terms and Definitions

The following is a list of terms that may appear in the following description. Unless otherwise specified, the terms used herein are defined as follows.

Device—A user endpoint (UE) or unmanned endpoint node in the system.

Locationing Group (LG)—A group of mobile or stationary devices formed for the purposes of reporting and tracking location on a group basis rather than on an individual device basis.

LG Service—A service for managing LGs.

LG-aware Entity—An entity that either provides or consumes LG services such as but not limited to an AC, AS, LGC, LGS, LGMF, or a location server or group management function located in a communication network or affiliated with a 3rd party.

Locationing Group Server (LGS)—An entity that provides the server-side LG services.

Locationing Group Client (LGC)—An entity that provides client-side LG services.

Locationing Group Management Function (LGMF)—An entity that provides configuration services to LGCs and LGSs (e.g., bootstrapping of LG identifiers, credentials and policies)

LG Context—Information that is associated with an existing LG or an LG that is a candidate for formation (e.g., LG members, location of LG members, LG status, etc.).

LG Policies—Define criteria that that must be met for an LG operation to be performed.

3GPP Group and Location Management Functionality

3GPP SA2 defines a set of functions within the 3GPP core network to perform lower level group and location management operations on a set of UEs such as forming a group, disbanding a group, adding a member, removing a member, and reporting the location of a group. 3GPP also defines a set of APIs to expose these core network functions to applications and services to call and use. See 3GPP TS 29.122 v16.7.0 and 3GPP TS 29.522 V16.5.0.

3GPP SA6 defines additional location and group management services to complement and interface to the group and location management functions defined by 3GPP SA2. These services are hosted on a UE and in the network and enable a UE to send location reports to a location server in the network such that the location of the UE can be shared with other authorized entities. Also defined is a service for creating a group of UEs based on their location (e.g., group UEs that are in the same location). See 3GPP TS 23.434 V16.5.0.

3GPP as well as other networking standards currently lack intelligent services to assist with the dynamic and opportunistic grouping of devices located within proximity of one another and that have similar location service requirements. By opportunistically grouping together devices having similar location service requirements and that are within the vicinity of one another, location reporting and tracking can be optimized such that it is performed on a group-basis rather than on an individual device-basis. This can save device, network and application resources by reducing the number of location reporting messages and overhead in the system. For example, rather than each individual device having to send separate location reports to a location server, a single device in the group can report location on behalf of all the members in the group. However, this is not realistically feasible in present day network deployments. Intelligent services are currently lacking the capability to dynamically collect and analyze situational context from the network, devices, application clients hosted on the devices and the remote applications and servers communicating with the devices, and dynamically detect opportunities for grouping devices within proximity of one another and that have similar location service requirements.

For example, FIG. 1 illustrates a mass transit use case involving a bus traveling along its route. Passengers enter and exit the bus at each stop along the route. While traveling on the bus, passengers use various types of applications on their personal devices (e.g., UEs). Some types of applications require location services (e.g., maps, traffic, weather, social media, etc.). Depending on the type of application, the location service requirements may differ (e.g., location reporting frequency, location precision, etc.). There currently is a lack of services to enable the opportunistic grouping of passenger UEs having similar location service requirements such that their location can be opportunistically tracked on a group basis rather than on an individual device basis to reduce location service overhead. Hence in these types of use cases, device location messaging must occur on an individual device basis. For example, device location messaging must flow between individual devices, applications on the devices, 3GPP network functions, location servers and network applications that interface with the location servers (e.g., to track the location of devices). These individual messages can result in significant overhead on these devices, 3GPP network functions, location servers and network applications.

To address the aforementioned problems and shortcomings regarding a lack of intelligent services to assist with the dynamic and opportunistic grouping of devices located within proximity of one another and that have similar location service requirements, one aspect proposes advanced Locationing Group (LG) services. The LG services consist of an LG Client (LGC) hosted on the device and an LG Server (LGS) and LG Management Function (LGMF) hosted in the network. The LG services support the capability to dynamically collect situational context from the network, devices, application clients hosted on the devices and the remote applications and servers communicating with the devices. The LG services analyze this context to determine optimal conditions and times for triggering group management operations to be performed on a set of devices for purposes of reporting the location on a group basis rather than on an individual device basis. Once a group is formed, the LG service manages the group to assign a lead device that performs locationing services (e.g., reporting) on behalf of the group members. Once the LG leader has been assigned, the leader can perform operations such as reporting and disseminating location information to various entities in the system on behalf of the group. This results in the reduction of location reporting overhead on the member devices of the group, the network used by the devices for location reporting, and the applications receiving device location information.

Figure 2:
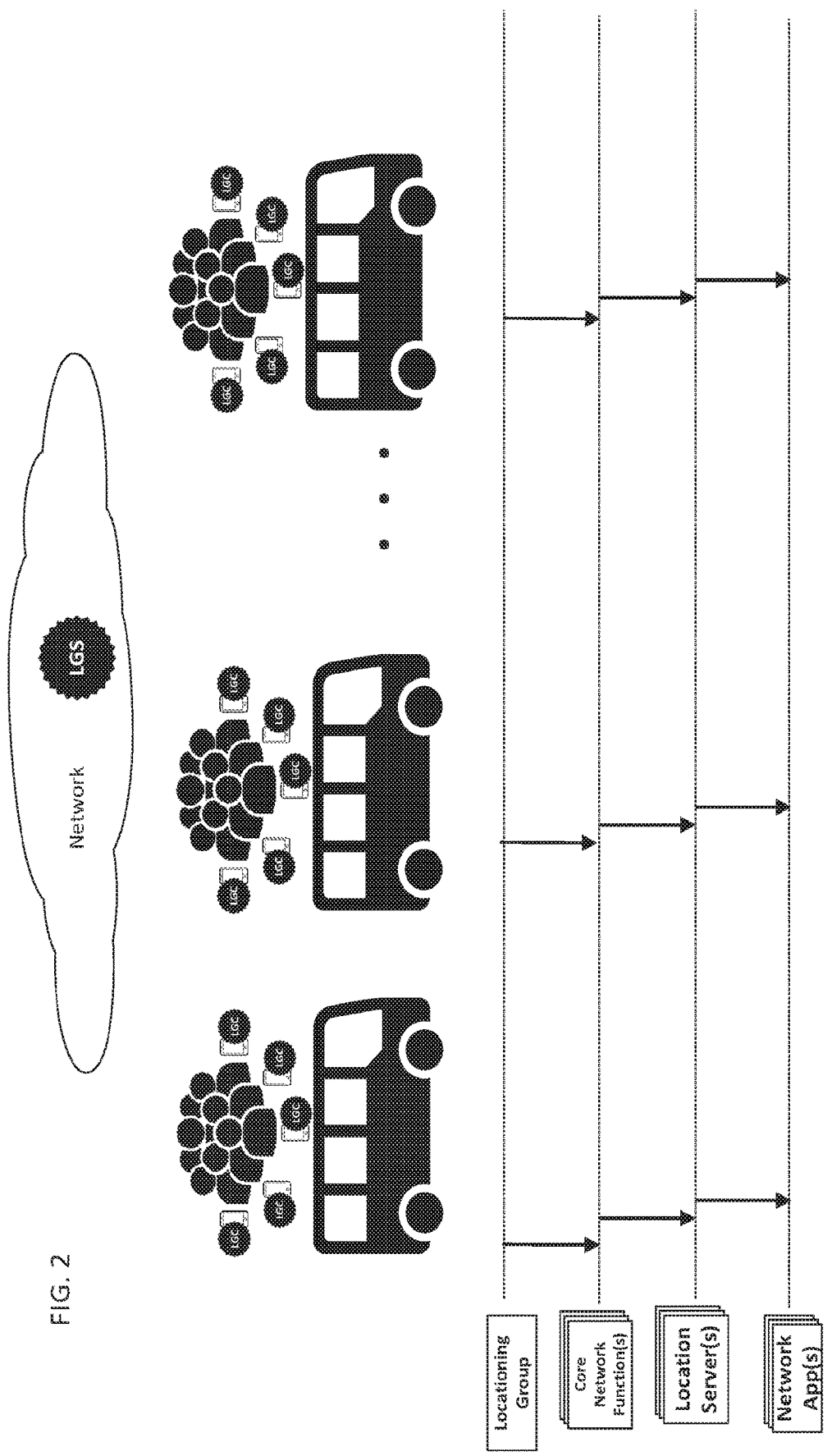
FIG. 2 shows an example of Locationing Group-based Reporting and Tracking.

This is especially useful in more dynamic and opportunistic types of use cases involving not only mobile devices but also scenarios in which different devices enter and leave the proximity of each other in an unplanned/uncoordinated manner (e.g., based on user travel/commute patterns). In these types of use cases, managing device groups and coordinating location management operations can be especially challenging for users and applications and use of an intelligent LG service is needed. For example, FIG. 2 illustrates the same aforementioned mass transit use case involving a bus traveling along its route. Instead of reporting and tracking device location on an individual device basis, a locationing group is dynamically formed by the proposed LG services. The LG services collect and analyze situational context. The LG services opportunistically detect passenger devices on the bus having similar location service require- ments and that are in proximity of one another. The LG services then dynamically form and manage an LG consist- ing of those devices and assign a leader of the LG. As a result, location can be reported in a group-based manner. This results in a significant reduction in overhead regarding the number of device locationing messages that are required to flow between devices, applications on the devices, 3GPP network functions, location servers and network applica- tions that interface with the location servers (e.g., to track the location of devices).

Aspect #1

A summary of LG service functionality according to one aspect is described below. A Locationing Group Client (LGC) may be hosted on a device and may perform one or more operations to manage the dynamic grouping of mobile devices such that the location of the devices is reported and tracked on a group basis rather than on an individual device basis.

For example, the LGC may send a request to an LGMF to configure the LGC and receive a response, where the request or response may include one or more types of information, e.g., device identifier, device location, LGC identifier, LGC credential, LGC LG context, LGS identifiers, LGS context information, information of ACs hosted on same device as LGC, or LGC policies.

As another example, the LGC may receive a request from an AC and return a response, where the request or response may include one or more of types of information, e.g., AC identifier, AC credential, AC context, AC registration result, AC policies, or LGC context.

As another example, the LGC may send a request to an LGS to share LG information and receive a response, where the request or response may include one or more types of information, e.g., LGC identifier, LGC credential, IDs of ACs associated with LGC, AC context, LGC registration result, LGC policies, or LGS context.

As another example, the LGC may send a request to another LG-aware entity and receive a response, where the request or response may include one or more types of information, e.g., LGC identifier, LG subscription context, or LG Subscription Identifier.

As another example, the LGC may receive context from other LG-aware entities that may include one or more types of information, e.g., AC context, LG context, LGC context, or LGS context.

As another example, the LGC may sending context to other LG-aware entities that may include one or more types of information, e.g., AC context, LG context, LGC context, or LGS context.

As another example, the LGC may receive requests from other LG-aware entities to perform LG operations, e.g., discover LGs, form an LG, disband an LG, join an LG, add a member, leave an LG, remove a member, or assign/re- assign LG leader.

As another example, the LGC may analyze context and trigger LG operations to be performed based on the prox- imity of devices and location service requirements of ACs active on those devices, where analyzing context may include monitoring AC, LG, LGC and/or LGS context, comparing context or LG operation requests received against the LG policy rules. Based on the permitted type(s) of LG operations and the operation criteria defined within each LG policy rule, the LGC may determine whether an LG operation should be triggered and performed or not.

As another example, the LGC may perform LG opera- tions that include discovering an LG, forming an LG, disbanding an LG, adding a member to an LG, removing a member from an LG, an LG leader management operation, sending LG context to other entities when the LGC is hosted on the LG leader device, or receiving LG context from another LGC when this LGC is not hosted on the LG leader device.

As another example, the LGC may send LG operation requests to other LG-aware entities to perform and receive LG operation responses, where the request or response may include one or more types of information, e.g., Identifier of LG-aware entity, LG identifier, LG operation to perform, LG context, or AC context.

Aspect #2

A summary of a Locationing Group Server (LGS) accord- ing to one aspect is described below. The LGS may perform one or more operations to manage the dynamic grouping of mobile devices such that the location of the devices is reported and tracked on a group basis rather than on an individual device basis.

For example, the LGS may send a request to an LGMF and receive a response, where the request or response may include one or more types of information, e.g., LGS iden- tifier, LGS credential, LGS context, LGS policies, LGC identifiers, or LGC credentials.

As another example, the LGS may receive requests from LGCs and return responses, where the request or response may include one or more types of information, e.g., LGC identifier, LGC credential, IDs of ACs associated with LGC, AC context, LGC registration result, LGC policies, or LGS context.

As another example, the LGS may send a request to another LG-aware entity and receive a response, where the request or response may include one or more types of information, e.g., LGC identifier, LG subscription context, or LG Subscription Identifier.

As another example, the LGS may receive context from other LG-aware entities that may include one or more types of information, e.g., AC context, LG context, LGC context, LGS context, or CN context.

As another example, the LGS may send context to other LG-aware entities that may include one or more types of information, e.g., AS context, Device context, AC context, LG context, LGC context, or LGS context.

As another example, the LGS may receive requests to perform LG operations from other LG-aware entities that may include one or more types of information, e.g., Identi- fier of LG-aware entity, LG identifier, LG operation to perform, or LG context.

As another example, the LGS may analyze context and triggering LG operations to be performed based on proxim- ity of devices and location service requirements of ACs active on those devices, where analyzing context may involve one or more operations, e.g., Monitoring AS con- text, Device context, AC context, LG context, LGC context, LGS context, or LG operation requests received and com- paring it against the LG policy rules defined in Table 3. Moreover, the LGS may, based on the permitted type(s) of LG operations and the operation criteria defined within each LG policy rule, determine whether an LG operation should be triggered and performed or not.

As another example, the LGS may perform LG operations, e.g., discovering an LG, forming an LG, disbanding an LG, adding a member to an LG, removing a member from an LG, a leader management operation, sending and receiving LG location context to/from an LG leader and other LG entities once an LG has been formed, or configuring LG client behavior (e.g., location reporting frequency).

As another example, the LGS may send LG operation requests to other LG-aware entities to perform and receive LG operation responses, where the request or response may include one or more types of information, e.g., Identifier of LG-aware entity, LG identifier, LG operation to perform, LG context, or AC context.

Aspect #3

According to one aspect, an Application Client may receive a request or notification that the client is in a group, but is not the group leader. The Application Client may use the information in this request or notification to disable or decrease the frequency of its location reports.

Aspect #4

According to one aspect, an Application Client may receive a request or notification that the client is in a group, and is the group leader. The Application Client may use the information in this request or notification to enable or increase the frequency of its location reports.

Locationing Group Service Framework

Figure 3:
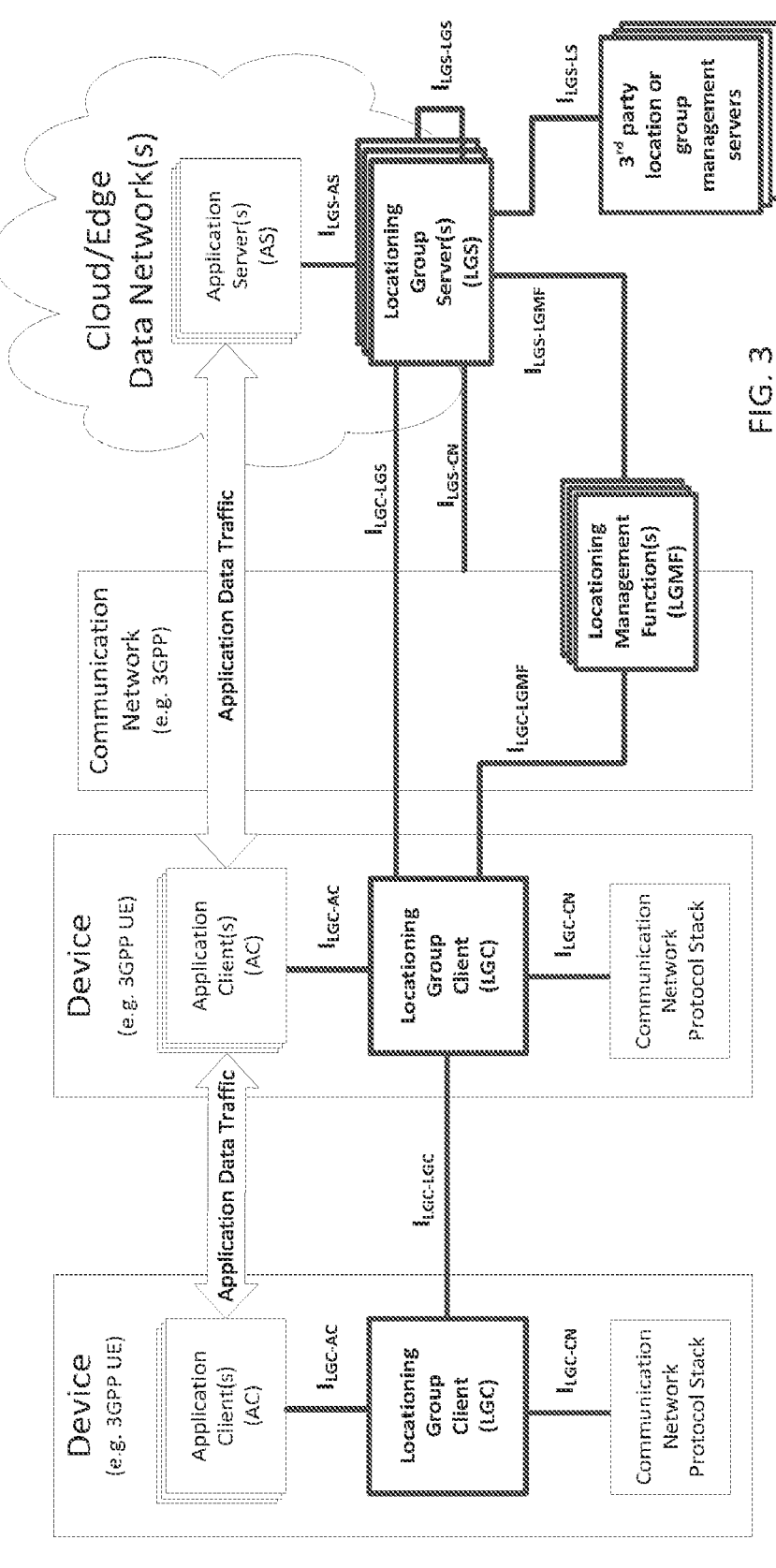
FIG. 3 shows an example Locationing Group Service Framework.

To enable locating devices in a dynamic group-based manner, a Locationing Group (LG) Service Framework is defined. The LG Service Framework may be deployed in a distributed manner consisting of Locationing Group Clients (LGC), Locationing Group Servers (LGS) and Locationing Management Functions (LGMF) as illustrated in FIG. 3.

The Locationing Group Client (LGC) and Locationing Group Server (LGS) interface to various other entities in the system such as one or more Application Clients (ACs), Application Servers (ASs), Locationing Group Management Functions (LGMFs), Communication Networks and 3rd party locationing and group management servers. The interfaces to these other entities are defined as the ILGC-AC, ILGS-AS, ILGS-LGMF, ILGC-LGMF ILGS-CN, ILGC-CN and ILGS-LS reference points, respectively. An LGC and LGS may interface to one another via the ILGC-LGS reference point. An LGC may interface to another LGC via the ILGC-LGC reference point. An LGS may interface to another LGS via the ILGS-LGS reference point.

An LGC is defined such that it may be hosted on a device in the system and interacts with one or more LGSs as well as other instances of LGCs hosted on other devices. An LGC may be deployed as a standalone function on the device or as a sub-function of an existing function on a device (e.g., part of a V2X client on a device). The LGC may interface and interact with various other functions in the system when assisting with management of LGs. This may involve the LGC sharing information, receiving events, and performing operations involving other functions in the system. Further details of this interaction are described herein.

An LGS is defined such that it may be deployed external to devices within the system. An LGS may be deployed as a standalone function in the system or as a sub-function of an existing function (e.g., part of a V2X Server). An LGS may be deployed within an edge data network, within a cloud network or within a communication network (e.g., 3GPP network). An LGS may also interface and interact with various other functions in the system when assisting with management of LGs. This may involve the LGS sharing information, receiving events, and performing operations involving other functions in the system. Further details of this interaction are described herein.

An LGMF is defined such that it may be deployed external to devices within the system. An LGMF may be deployed as a standalone function in the system or as a sub-function of an existing function such as a function in a communication network (e.g., 3GPP) or as a function in a cloud or edge network that interfaces to a communication network. An LGMF may interact with LGSs to receive information about the capabilities and instantiation of LGSs and configure LGSs with LG policies. An LGMF may interact with LGCs to configure the LGCs and send LG policies to LGCs. An LGMF may also interface and interact with various other functions in the system when assisting with LG management. This may involve the LGMF sharing information, receiving events, and performing operations involving other functions in the system. In alternative embodiment, the functionality of the LGMF may be combined and supported by an LGS. Further details of this interaction are described herein.

Locationing Group Procedures

One aspect proposes a top-level LG procedure that defines how individual LG operations are performed by the different LG-aware entities in the system and the interdependencies that these individual LG operations may have on one another. Some of the individual steps defined within this top-level LG procedure reference lower-level LG procedures that are performed by one or more LG-aware entities in the system. These lower-level procedures are defined in subsequent sub-sections and are referenced by this top-level procedure. The individual LG operations used within the top-level as well as lower level procedures are the same operations defined for each of the proposed reference points.

Note, although not explicitly captured in the following procedures, other sequences involving cascading of the defined operations together with one another may also be performed by an LGC or LGS. For example, an Application Server sends a member addition request to an LGS, and the LGS forwards this request to a LGC to perform the operation.

Top Level Locationing Group Procedures

LG Management Operations

Figure 4:
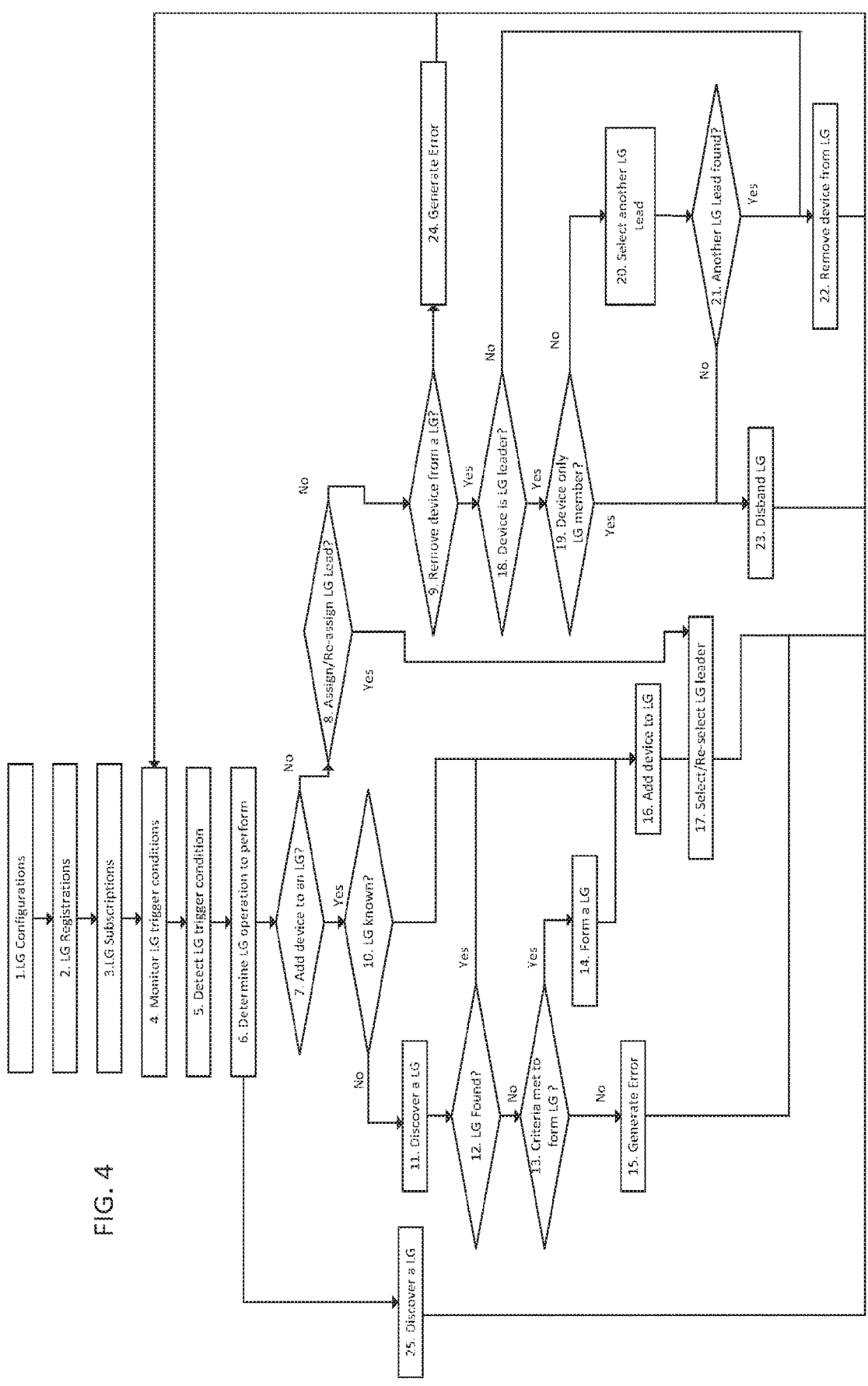
FIG. 4 shows an example of LG Management Operations.

FIG. 4 illustrates a procedure for LG management operations including discovering an LG, forming an LG, disbanding an LG, adding a member to an LG, removing a member from an LG, and assigning/re-assigning a leader of an LG. These LG operations are performed by various entities in the system. Within each of the individual steps of this top-level procedure, multiple LG operations may be performed by one or more entities resulting in a lower level procedure defined in subsequent sub-sections. When this occurs, a reference is provided to the lower-level procedure. In addition, for some steps defined in this top-level procedure, different variants of lower-level procedures are defined which define different possible solutions.

Step 1: Before LG-aware entities in the system can perform LG operations, some LG configuration operations may first need to be performed according to the procedures defined herein.

Step 2: Before LG-aware entities in the system can perform LG operations, some LG registration operations may first need to be performed according to the procedures defined herein.

Step 3: Before LG-aware entities in the system can perform LG operations, some LG subscription operations may first need to be performed according to the procedures defined herein.

Step 4: Once any necessary LG configuration, registration and/or subscription operations have been completed, LGC(s) and LGS(s) begin to monitor for any LG related context information that they receive according to the procedures defined herein as well as any explicit requests they receive to perform LG operations. LGC(s) and LGS(s) compare any LG context information or LG operation requests they receive against the LG policy rules defined in Table 13. Based on the permitted type(s) of LG operations and the operation criteria defined within each LG policy rule, an LGC and LGS can determine whether an LG operation should be triggered and performed.

Step 5: If/when the LGC or LGS detects that all the criteria defined by an LG policy rule has been met, the LGC or LGS triggers performing the permitted LG operation. For example, triggering LG operations when detecting the following trigger criteria have been met:

Trigger the formation of an LG group when detecting that a group of devices are moving together, within range of one another and/or on the same route as one another (e.g., devices belonging to passengers on a train, bus, or plane) and the devices are requiring location services;

Trigger removing one or more members from an LG or disbanding an LG altogether when detecting that a single member or all members of an LG are no longer moving together, within range of one another and/or on the same route as one another;

Trigger the formation of an LG group or the addition of devices as new members of an existing LG when detecting an event from a communication network (e.g., the communication network has become congested in an area where there are a large number of devices in proximity to one another and where the devices are using location services)

Trigger the formation of an LG group or the addition of devices as new members of an existing LG when detecting a device level event (e.g., battery level is getting low) from a device that is using individual device locationing services and that could benefit from becoming a member of an LG. In doing so, the device could be relieved from having to perform individual device locationing operations (e.g., report its own location) and could instead rely on other devices in the group to perform operations that allow the location of the group to be tracked.

Step 6: The LGC or LGS first determines the type of LG operation to perform. If an LG operation is triggered by a request that the LGC or LGS received to perform the operation, the LGC or LGS may extract the type of LG operation to perform from the LG request it receives. If instead, the LG operation is triggered by the LGC or LGS monitoring LG related context that an LGC or LGS receives, then the LG operation is defined by the LG policy rule. If the LG operation is to perform only an LG discovery, then the LGC or LGS proceeds to Step 25. Otherwise the LGC or LGS proceeds to Step 7.

Step 7: The LGC or LGS checks whether the determined LG operation is to add a device to an LG. If so, the LGC or LGS proceeds to Step 10. Otherwise the LGC or LGS proceeds to Step 8.

Step 8: The LGC or LGS checks whether the determined LG operation is to assign/re-assign the leader device of an LG. If so, then the LGC or LGS proceeds to Step 17. Otherwise the LGC or LGS proceeds to Step 9.

Step 9: The LGC or LGS checks whether the determined LG operation is to remove a device from an LG. If so, then the LGC or LGS proceeds to Step 18. Otherwise the LGC or LGS proceeds to Step 24.

Step 10: The LGC or LGS checks whether the LG to add the device is specified. If the LG is specified, the LGC or LGS proceeds to Step 16. Otherwise the LGC or LGS proceeds to Step 11.

Step 11: If the LG is not specified, the LGC or LGS that triggered the LG operation performs an LG discovery according to the procedures defined herein.

Step 12: If the LGC or LGS that issues the LG discovery operation finds an existing LG that is compatible and meets the requirements of the device to be added, the LGC or LGS proceeds to Step 16. Otherwise, the LGC or LGS proceeds to Step 13.

Step 13: If the LGC or LGS that issues the LG discovery operation does not find an existing LG that is compatible and meets the requirements of the device to be added, then the LGC or LGS checks whether the criteria (as defined in the LG policies) for forming a new LG have been met. If the criteria are met, it proceeds to Step 14, otherwise it proceeds to Step 15.

Step 14: If the criteria for forming a new LG have been met, the LGC or LGS forms a new LG according to the procedures defined herein and then proceeds to Step 16.

Step 15: If the criteria for forming a new LG have not been met, the LGC or LGS generates an error indicating that it is unable to complete the LG operation to add the device to an LG and then proceeds to Step 4.

Step 16: The LGC or LGS adds the device to an LG group according to the procedures defined herein and then proceeds to Step 17.

Step 17: The LGC or LGS identifies the best candidate device that is a member of the LG to be the LG leader according to the procedures defined herein. The LGC or LGS then proceeds to Step 1.

Step 18: The LGC or LGS checks if the device to remove from the LG is the LG leader. If so, the LGC or LGS proceeds to Step 19. Otherwise, the LGC or LGS proceeds to Step 22.

Step 19: The LGC or LGS checks if the device to remove from the LG is the only member of the LG. If so, LGC or LGS proceeds to Step 23. Otherwise, the LGC or LGS proceeds to Step 20.

Step 20: The LGC or LGS attempts to find a new LG leader amongst the remaining LG members according to the procedures defined herein and then proceeds to Step 21.

Step 21: If a new LG leader amongst the remaining LG members is found, the LGC or LGS proceeds to Step 22. Otherwise, the LGC or LGS proceeds to Step 23.

Step 22: The LGC or LGS removes the device from the LG according to the procedures defined herein and then proceeds to Step 1.

Step 23: The LGC or LGS disbands the LG according to the procedures defined in herein and then proceeds to Step 1.

Step 24: The LGC or LGS generates an error indicating that the requested LG operation to perform is not supported and proceeds to Step 4.

Step 24: The LGC or LGS performs an LG discovery operation according to the procedures defined in herein and proceeds to Step 4.

Figure 5:
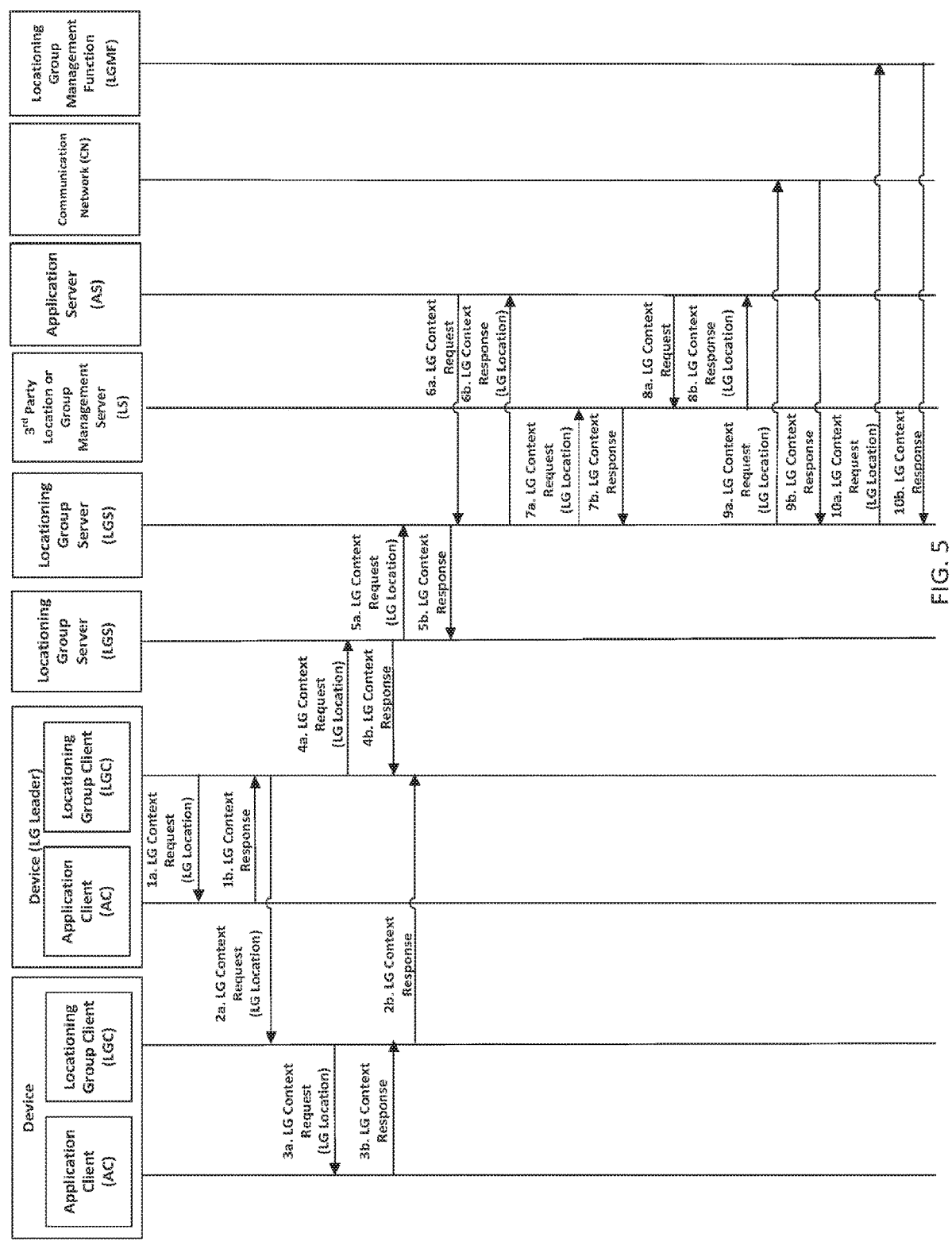
FIG. 5 shows an example of a Procedure for sharing LG context via LG leader.

FIG. 5 illustrates a procedure for sharing LG context information between the entities in the system after an LG is formed and a member device is selected to be LG leader. For example, the LG leader can report the location of the LG to various entities in the system such as local ACs on the same device as the LGC, other LGCs on other member devices in the same LG that are not the LG leader, LGSs and LGMFs. LGSs can in turn share LG location (as well as other LG context) that is reported to it from an LG leader with other LGSs, CNs, LGMFs and LSs. This LG context that is shared between entities, can be used by the entities to adjust their behavior. For example, based on its role in the LG (e.g., whether or not the device is selected as the LG leader), a device (or one or more ACs on a device) may enable/disable location reporting or change how frequently it reports its location.

Although not illustrated in FIG. 5, LG context such as LG location can also be sent to an LGC on the LG leader device from other entities in the system. For example, an LGS may obtain LG location from a CN or an LS. The LGS may then send this LG location information to the LGC on the LG leader device. The LGC may then forward this LG location to local ACs on the same device as the LGC and/or to other LGCs on other member devices in the same LG that are not functioning as the LG leader. The other LGs can in turn forward the LG context to ACs hosted on their respective devices.

Procedure for Sharing LG Context Via LG Leader

Step 1: The LGC on the LG leader device may send a request to share LG context (e.g., location of LG) with an AC hosted on the same device and receive a response in return.

Step 2: The LGC on the LG leader device may send a request to share LG context (e.g., location of LG) with an LGC on a different device that is also member of the same LG and receive a response in return.

Step 3: An LGC on device that is a member of an LG and that receives LG context (e.g., location of LG) from the LGC on the LG leader device, may send a request to share the LG context with an AC hosted on the same device and receive a response in return.

Step 4: The LGC on the LG leader device may send a request to share LG context (e.g., location of LG) with an LGS in the network and receive a response in return.

Step 5: An LGS may send a request to share LG context (e.g., location of LG) that it receives from an LGC on the LG leader device with another LGS in the system. The LGS may receive a response in return.

Step 6: An LGS may receive a request from an AS to share LG context (e.g., location of LG) with the AS. The LGS may send a response in return to the AS which contains the LG context.

Step 7: An LGS may send a request to share LG context (e.g., location of LG) that it receives from an LGC on the LG leader device with a 3rd party location or group management server. The LGS may receive a response in return.

Step 8: An LS may receive a request from an AS to share LG context (e.g., location of LG) that it indirectly received from an LGC on a LG leader device via an LGS. The LS may send a response in return to the AS which contains the LG context.

Step 9: An LGS may send a request to share LG context (e.g., LG status, LG member device identifiers, LG leader) that it receives from an LGC on the LG leader device with a CN. The LGS may receive a response in return.

Step 10: An LGS may send a request to share LG context (e.g., location of LG) that it receives from an LGC on the LG leader device with a LGMF. The LGS may receive a response in return.

LG Configuration

Figure 6:
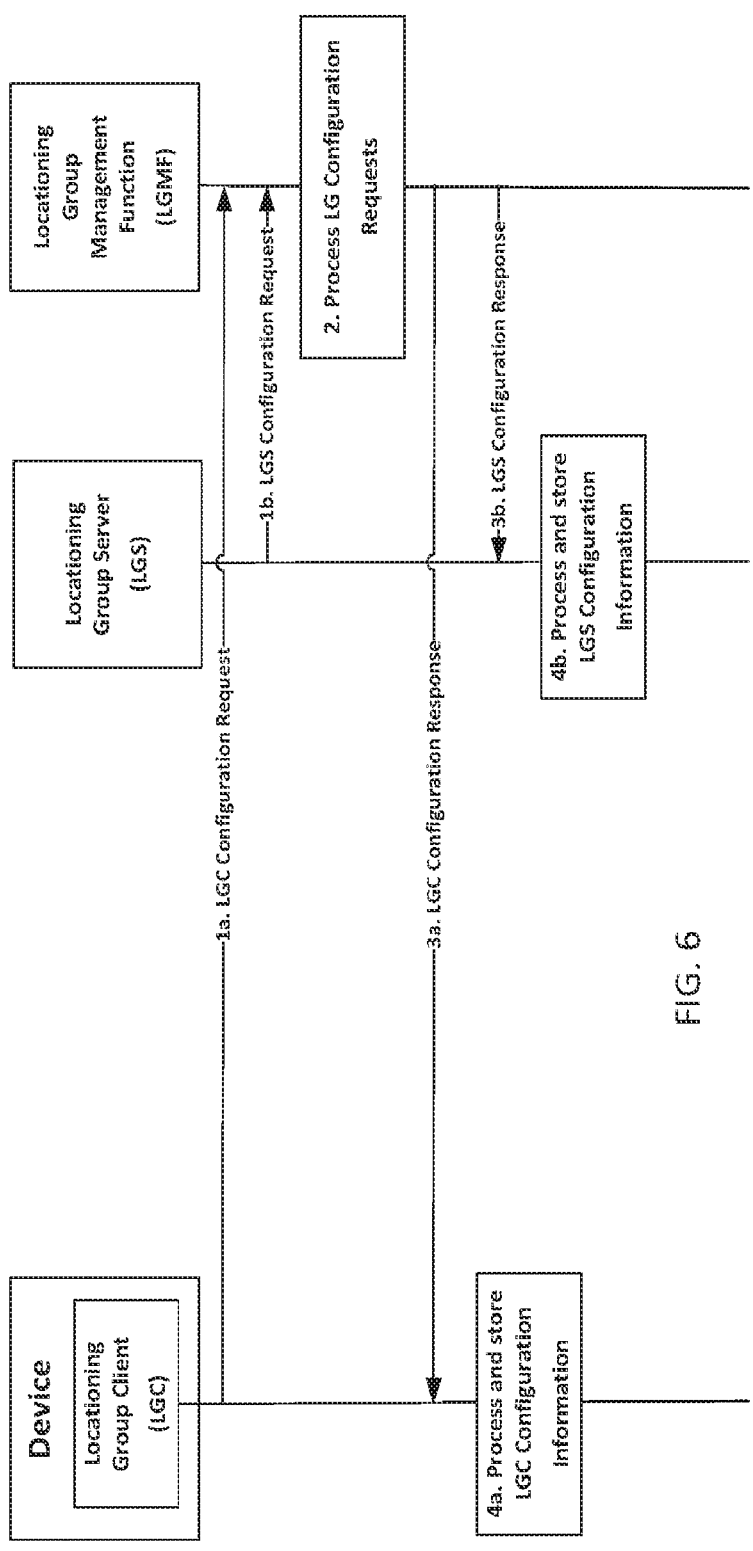
FIG. 6 shows an example of an LG Configuration.

Configuration of LG information to the various entities in the system may take place in a pre-provisioned manner that occurs out-of-band of the system. Alternatively, configuration of LG information can take place in-band within the system using a procedure that is illustrated in FIG. 6. In this procedure, LGC(s) and LGS(s) in the system may be bootstrapped and initialized with LG configuration information from LGMF(s). An LGC or LGS may initiate a LG configuration request to an LGMF based on trigger conditions such as but not limited to the LGC or LGS initially connecting to a network, transitioning connectivity to a different network or domain, detecting an error condition or expiration condition requiring an update of one or more configuration information elements to resolve the issue. The LG configuration information may include LG centric identifiers, credentials, settings and policies as defined in Table 11, Table 12 and Table 13. Note, that the LG configuration operations illustrated in FIG. 6 may be performed independent of each other and/or in a different order than illustrated in FIG. 6. Note, instead of or in addition to receiving this configuration information from an LGMF, an LGC or LGS may be configured with LG information from other entities in the system such as but not limited to AC(s), User(s) interfacing to AC(s), function(s) in the communication network (e.g., Location Servers, Group Management Servers, etc.), or other LGC(s) and LGS(s). However, this is not illustrated in FIG. 6. An LGS or LGC may retrieve LG policies from these entities or subscribe to these entities to receive notifications if/when changes to LG policies are required (not illustrated in FIG. 6).

LG Configuration

Step 1a and 1b: An LGC or LGS may send one or more configuration requests to an LGMF over the ILGC-LGMF and ILGS-LGMF reference points, respectively. The requests may contain LGC or LGS configuration information as defined in Table 5 and Table 8, respectively.

Step 2: The LGMF receives and processes the configuration requests. The LGMF may perform operations such as authenticating the LGC or LGS to verify whether the LGC or LGS can be trusted to use LG services. The LGMF may also perform authorization checks to verify if the LGC or LGS has privileges to perform LG operations. An LGMF may also generate LG policies for the LGC or LGS and configure these policies. The policies may be comprised of a set of one or more LG policy rules. Each LG policy rule may be comprised of information such as but not limited to the information defined in Table 13.

Step 3a and 3b: The LGMF returns LG configuration responses to the LGC(s) and/or LGS(s). The responses may include configuration response information defined in Table 5, Table 8 as well as LG policy rules defined in Table 13.

Step 4a and 4b: The LGC and/or LGS receives the LG configuration responses from LGMF. The LGC and/or LGS extracts and stores the LG configuration information such that the information can be factored into LG decisions and operations that are performed by the LGC and/or LGS. An LGC or LGS may use the LG configuration information to trigger the initiation of LG operations with other entities in the system. Some examples of these other LG operations may include LG registrations, LG subscriptions, LG context requests, LG discovery requests, etc.

LG Registration

Figure 7:
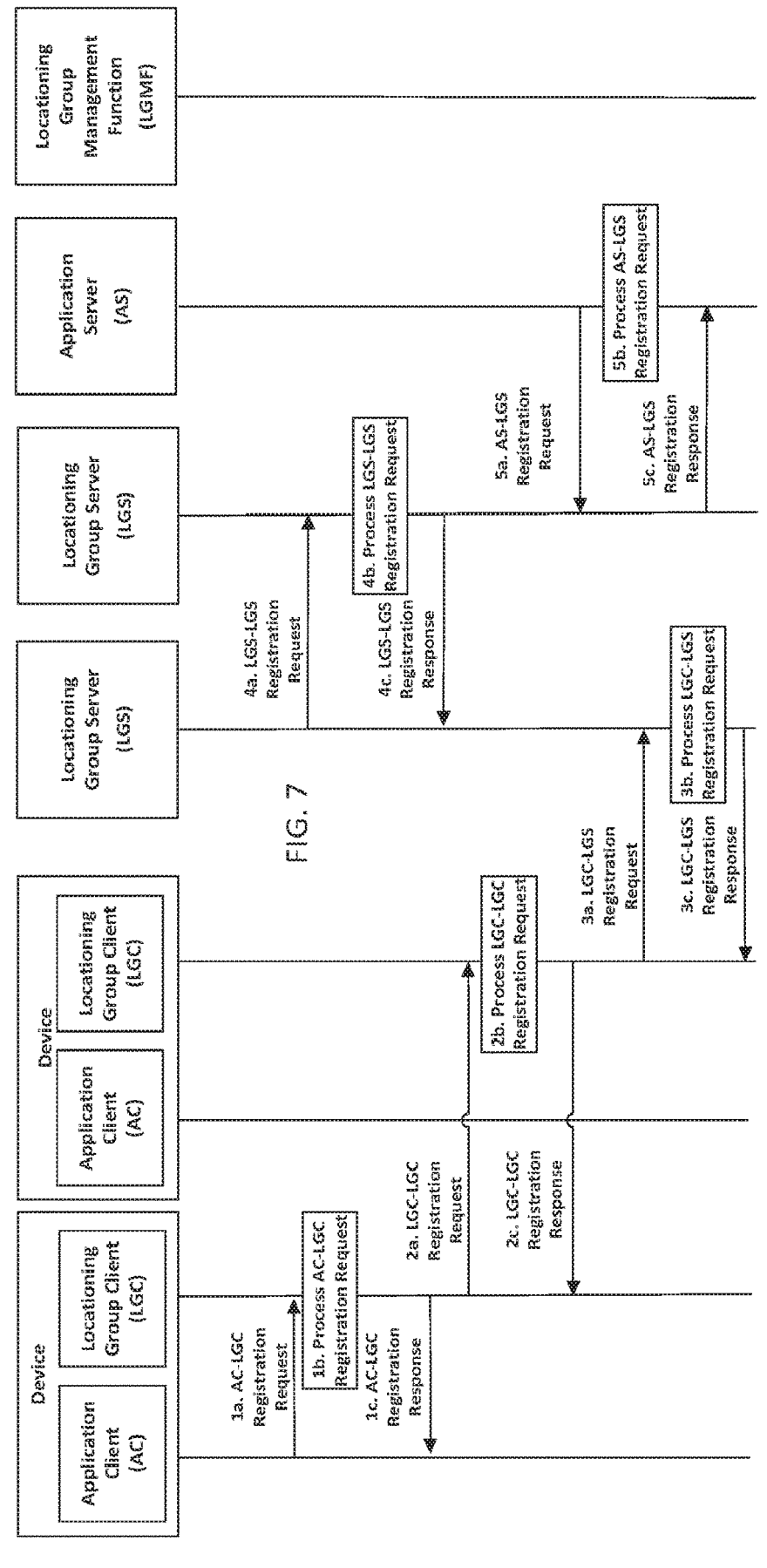
FIG. 7 shows example LG Registrations.

As illustrated in FIG. 7, there may be several types of LG related registration operations performed in the system. If applicable, these registration operations may be performed after an LGC and/or LGS have successfully completed LG configuration with an LGMF. These registration operations may be performed as dedicated LG registrations occurring between entities in the system. Alternatively, these registration operations may be combined with other configuration operations occurring between entities such that LG specific registration information and actions are combined together with other non-LG specific registration information and actions (not illustrated in FIG. 7). Note, that the order that LG registration operations illustrated in FIG. 7 may be performed independent of each other and/or in a different order than illustrated in FIG. 7.

LG Registrations

Step 1a, 1b and 1c: An AC may send a registration request to an LGC for the purposes of performing an authentication with the LGC to establish trust between an AC and LGC and to perform trusted LG operations on one another's behalf. Within this registration request, an AC may include information such as but not limited to the information defined in Table 1. Upon receiving the registration request, an LGC may perform an authentication procedure to establish trust with the AC based on information provided in the request such as identifiers and credentials and information configured in the LGC. Once authenticated, the LGC may also check its local LG policies to determine if the AC is permitted to register to the LGC and use LG services. The LGC may also communicate with one or more LGS, LGC or LGMF in the system to determine if the AC is permitted to register and use LG services (not illustrated in FIG. 7). If the LGC determines that the AC is permitted to register, the LGC may locally store LG related context information provided by the AC such that the information can later be used by the LGC to perform LG operations on behalf of the AC if/when required. The LGC may share any context information provided by the AC with other entities in the system such as but not limited to an LGS, LGC or LGMF (not illustrated in FIG. 7). After processing the registration request, the LGC may return a response to the AC indicating the results and status of the registration request. This response may include information such as but not limited to the information defined in Table 1.

Step 2a, 2b and 2c: An LGC may send a registration request to one or more peer LGCs for performing an authentication with the peer LGC(s) to establish trust between peer LGCs to perform trusted LG operations on one another's behalf. Within this registration request, an LGC may include LG context information such as but not limited to the information defined in Table 3. Upon receiving the registration request, an LGC may perform an authentication procedure to establish trust with a peer LGC based on information provided in the request such as identifiers and credentials and any information configured locally in the LGC. Once authenticated, the LGC may also check its local LG policies to determine if a peer LGC is permitted to register to the LGC and use LG services. The LGC may also communicate with one or more LGS, LGC or LGMF in the system to determine if the peer LGC is permitted to register and use LG services (not illustrated in FIG. 7). If the LGC determines that the peer LGC is permitted to register, the LGC may locally store LG related context information provided by the peer LGC such that the information can later be used by the LGC to perform LG operations on behalf of the peer LGC if/when required. The LGC may share any LG context information provided by the peer LGC with other entities in the system such as but not limited to an LGS, LGC or LGMF (not illustrated in FIG. 7). After processing the registration request, the LGC may return a response to the peer LGC indicating the results and status of the registration request. This response may include information such as but not limited to the types of information defined in Table 3.

Step 3a, 3b and 3c: An LGC may send a registration request to one or more LGSs for performing an authentication with the LGS(s) to establish trust with the LGS(s) to perform trusted LG operations on one another's behalf. Within this registration request, an LGC may include LG context information such as but not limited to the information defined in Table 2. Upon receiving the registration request, an LGS may perform an authentication procedure to establish trust with the LGC based on information provided in the request such as identifiers and credentials and any information configured locally in the LGS. Once authenticated, the LGS may also check its local LG policies to determine if the LGC is permitted to register to the LGS and use LG services. The LGS may also communicate with one or more LGS, LGC or LGMF in the system to determine if an LGC is permitted to register and use LG services (not illustrated in FIG. 7). If the LGS determines that a peer LGC is permitted to register, the LGS may locally store LG related context information provided by the LGC such that the information can later be used by the LGS to perform LG operations on behalf of the LGC if/when required. The LGS may share any LG context information provided by the LGC with other entities in the system such as but not limited to an LGS, LGC or LGMF (not illustrated in FIG. 7). After processing the registration request, the LGS may return a response to the LGC indicating the results and status of the registration request. This response may include information such as but not limited to the types of information defined in Table 2.

Step 4a, 4b and 4c: An LGS may send a registration request to one or more peer LGSs for performing an authentication with the peer LGS(s) to establish trust between peer LGSs to perform trusted LG operations on one another's behalf. Within this registration request, an LGS may include LG context information such as but not limited to the information defined in Table 10. Upon receiving the registration request, an LGS may perform an authentication procedure to establish trust with a peer LGS based on information provided in the request such as identifiers and credentials and any information configured locally in the LGS. Once authenticated, the LGS may also check its local LG policies to determine if a peer LGS is permitted to register to the LGS and use LG services. The LGS may also communicate with one or more LGS, LGC or LGMF in the system to determine if a peer LGS is permitted to register and use LG services (not illustrated in FIG. 7). If the LGS determines that a peer LGS is permitted to register, the LGS may locally store LG related context information provided by a peer LGS such that the information can later be used by the LGS to perform LG operations on behalf of a peer LGS if/when required. The LGS may share any LG context information provided by a peer AC with other entities in the system such as but not limited to an LGS, LGC or LGMF (not illustrated in FIG. 7). After processing the registration request, the LGS may return a response to a peer LGS indicating the results and status of the registration request. This response may include information such as but not limited to the types of information defined in Table 10.

Step 5a, 5b and 5c: An AS may send a registration request to an LGS for the purposes of performing an authentication with the LGS to establish trust between an AS and LGS to perform trusted LG operations on one another's behalf. Within this registration request, an AS may include LG context information such as but not limited to the information defined in Table 6. Upon receiving the registration request, an LGS may perform an authentication procedure to establish trust with the AS based on information provided in the request such as identifiers and credentials and information configured in the LGS. Once authenticated, the LGS may also check its local LG policies to determine if the AS is permitted to register to the LGS and use LG services. The LGS may also communicate with one or more LGS, LGC or LGMF in the system to determine if the AS is permitted to register and use LG services (not illustrated in FIG. 7). If the LGS determines that the AS is permitted to register, the LGS may locally store LG related context information provided by the AS such that the information can later be used by the LGS to perform LG operations on behalf of the AS if/when required. The LGS may share any LG context information provided by the AS with other entities in the system such as but not limited to an LGS, LGC or LGMF (not illustrated in FIG. 7). After processing the registration request, the LGS may return a response to the AS indicating the results and status of the registration request. This response may include information such as but not limited to the types of information defined in Table 6.

LG Subscriptions

Figure 8:
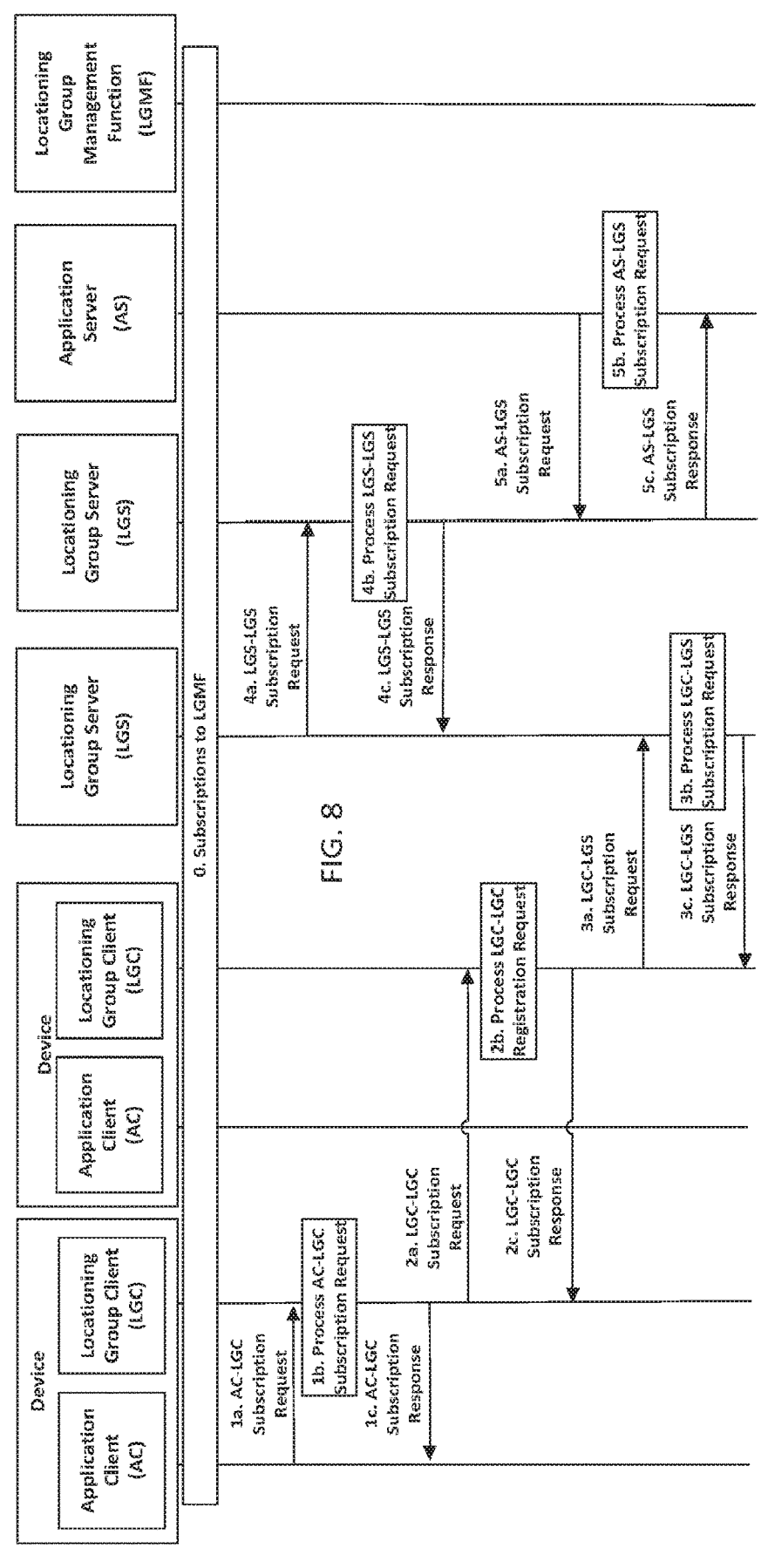
FIG. 8 shows example LG Subscriptions.

As illustrated in FIG. 8, there may be several types of LG related subscription operations performed between different LG-aware entities in the system. If applicable, these subscription operations may be performed after an entity has successfully completed LG configuration with an LGMF and/or LG registration operations. An LG subscription may define LG centric notification criteria that may be used to subscribe to another entity and receive LG notifications if/when these other entities detect that the LG centric notification criteria have been satisfied. The order that LG subscription operations are performed may be different than the order illustrated in FIG. 8.

LG Subscriptions

Step 0: An LGC or LGS may send subscription requests, as defined in Table 5 and Table 8, respectively, to an LGMF to receive LG notifications from the LGMF if/when specified LG notification criteria have been satisfied and detected by the LGMF. A subscription request from an LGC to an LGMF may include subscription criteria based on events such as but not limited to a change in availability status of an LGS that the LGC is using or a change in LGC configuration or policy settings. A subscription request from an LGS to an LGMF may include subscription criteria based on events such as but not limited to a change in availability status of an LGC, another LGS, a location server, or a group management server, or a change in LGC configuration or policy settings. Based on these subscriptions, an LGMF may send notifications to an LGC informing the LGC that the availability status of an LGS that the LGC is using has changed or that a change in LGC configuration or policy settings has occurred. Likewise, an LGMF may send notifications to an LGS informing the LGS that there has been a change in availability status of an LGC or another LGS or a change in LGS configuration or policy settings has occurred.

Step 1a, 1b and 1c: An AC may send an LG subscription request to an LGC for the purposes of subscribing to LG events of interest. Within this LG subscription request, an AC may include a callback URI to receive LG notifications, criteria for receiving LG notifications such as conditions based on LG context information defined in Table 12 (e.g., number of LG members in a group exceeds a specified threshold), or an event based on an LG operation that is performed (e.g., LG formed or disbanded, LG member added or removed, change in LG leader, change in location of LG, etc.). Upon receiving the subscription request, an LGC may store the subscription and monitor the LG subscription criteria specified by the AC to detect if/when the criteria has been met. The LGC may also communicate with one or more LGS, LGC or LGMF in the system to create corresponding subscriptions with these entities to assist the LGC with detecting if/when the LG subscription criteria specified by the AC has been met (not illustrated in FIG. 8). After processing the subscription request, the LGC may return a response to the AC indicating the results and status of the subscription request. This response may include information such as but not limited to the types of information defined in Table 1. Later, if the LGC determines that the subscription criteria has been met, the LGC may send a notification to the AC indicating that the subscription criteria has been met (not illustrated in FIG. 8). This notification may include information such as but not limited to the types of information defined in Table 1.

Step 2a, 2b and 2c: An LGC may send an LG subscription request to a peer LGC for the purposes of subscribing to LG events of interest. Within this LG subscription request, an LGC may include a callback URI to receive LG notifications, criteria for receiving LG notifications such as conditions based on LG context information defined in Table 12 (e.g., number of LG members in a group exceeds a specified threshold), or an event based on an LG operation that is performed (e.g., LG formed or disbanded, LG member added or removed, change in LG leader, change in location of LG, etc.). Upon receiving the subscription request, a peer LGC may store the subscription and monitor the LG subscription criteria specified to detect if/when the criteria has been met. The peer LGC may also communicate with one or more LGS, LGC or LGMF in the system to create corresponding subscriptions with these entities to assist it with detecting if/when the LG subscription criteria specified has been met (not illustrated in FIG. 8). After processing the subscription request, the peer LGC may return a response indicating the results and status of the subscription request. This response may include information such as but not limited to the types of information defined in Table 3. Later, if the peer LGC determines that the subscription criteria has been met, it may send a notification indicating that the subscription criteria has been met (not illustrated in FIG. 8). This notification may include information such as but not limited to the types of information defined in Table 3.

Step 3a, 3b and 3c: An LGC may send an LG subscription request to an LGS for the purposes of subscribing to LG events of interest. Within this LG subscription request, an LGC may include a callback URI to receive LG notifications, criteria for receiving LG notifications such as conditions based on LG context information defined in Table 12 (e.g., number of LG members in a group exceeds a specified threshold), or an event based on an LG operation that is performed (e.g., LG formed or disbanded, LG member added or removed, change in LG leader, change in location of LG, etc.). Upon receiving the subscription request, a LGS may store the subscription and monitor the LG subscription criteria specified to detect if/when the criteria has been met. The LGS may also communicate with one or more LGS, LGC or LGMF in the system to create corresponding subscriptions with these entities to assist it with detecting if/when the LG subscription criteria specified has been met (not illustrated in FIG. 8). After processing the subscription request, the LGS may return a response indicating the results and status of the subscription request. This response may include information such as but not limited to the types of information defined in Table 2. Later, if the LGS determines that the subscription criteria has been met, it may send a notification indicating that the subscription criteria has been met (not illustrated in FIG. 8). This notification may include information such as but not limited to the types of information defined in Table 2.

Step 4a, 4b and 4c: An LGS may send an LG subscription request to a peer LGS for the purposes of subscribing to LG events of interest. Within this LG subscription request, an LGS may include a callback URI to receive LG notifications, criteria for receiving LG notifications such as conditions based on LG context information defined in Table 12 (e.g., number of LG members in a group exceeds a specified threshold), or an event based on an LG operation that is performed (e.g., LG formed or disbanded, LG member added or removed, change in LG leader, change in location of LG, etc.). Upon receiving the subscription request, a peer LGS may store the subscription and monitor the LG subscription criteria specified to detect if/when the criteria has been met. The peer LGS may also communicate with one or more LGS, LGC or LGMF in the system to create corresponding subscriptions with these entities to assist it with detecting if/when the LG subscription criteria specified has been met (not illustrated in FIG. 8). After processing the subscription request, the peer LGS may return a response indicating the results and status of the subscription request. This response may include information such as but not limited to the types of information defined in Table 9. Later, if the peer LGS determines that the subscription criteria has been met, it may send a notification indicating that the subscription criteria has been met (not illustrated in FIG. 8). This notification may include information such as but not limited to the types of information defined in Table 9.

Step 5a, 5b and 5c: An AS may send an LG subscription request to an LGS for the purposes of subscribing to LG events of interest. Within this LG subscription request, an AS may include a callback URI to receive LG notifications, criteria for receiving LG notifications such as conditions based on LG context information defined in Table 12 (e.g., number of LG members in a group exceeds a specified threshold), or an event based on an LG operation that is performed (e.g., LG formed or disbanded, LG member added or removed, change in LG leader, change in location of LG, etc.). Upon receiving the subscription request, an LGS may store the subscription and monitor the LG subscription criteria specified to detect if/when the criteria has been met. The LGS may also communicate with one or more LGS, LGC or LGMF in the system to create corresponding subscriptions with these entities to assist it with detecting if/when the LG subscription criteria specified has been met (not illustrated in FIG. 8). After processing the subscription request, the LGS may return a response indicating the results and status of the subscription request. This response may include information such as but not limited to the types of information defined in Table 6. Later, if the LGS determines that the subscription criteria has been met, it may send a notification indicating that the subscription criteria has been met (not illustrated in FIG. 8). This notification may include information such as but not limited to the types of information defined in Table 6.

Locationing Group Context Sharing

Context information may include but is not limited to the types of information defined in Table 12. This context may be factored into LG decisions made by LG-aware entities to perform LG operations (e.g., forming or disbanding an LG, adding or removing an LG member, changing a leader, etc.). Received or locally generated context may be stored and/or shared with other LG-aware entities in the system. This information may be shared by one LG-aware entity sending a request to another LG-aware entity and receiving a response back that contains the LG context information. Alternatively, one LG-aware entity may subscribe to another LG-aware entity to receive notifications containing context information if/when a specified set of LG criteria regarding the context have been met and detected by the other LG-aware entity.

LGS Initiated LG Context Sharing

Figure 9:
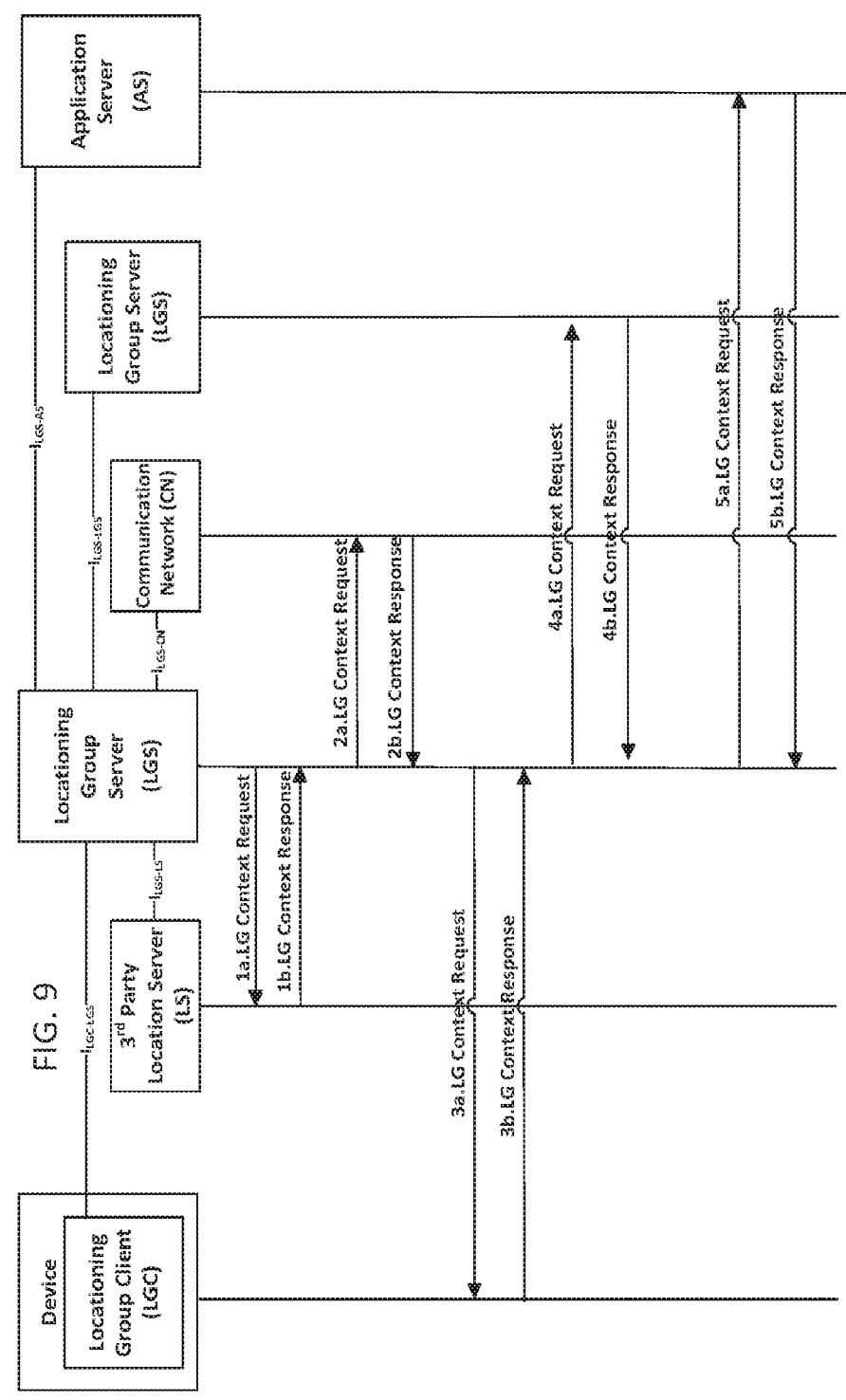
FIG. 9 shows an example of LGS Initiated LG Context Sharing.

As illustrated in FIG. 9, an LGS may exchange context information defined in Table 12 with other LG-aware entities in the system. The LG context may be shared or requested by the LGS initiating a request to these other LG-aware entities. Alternatively (not illustrated in FIG. 9), an LGS may subscribe to other LG-aware entities regarding context that the LGS is interested in, and receive LG notifications from these other LG-aware entities containing context if/when criteria defined within the subscription has been met. Conversely, an LGS may also receive LG subscriptions from other LG-aware entities regarding context they are interested in receiving from the LGS. The LGS can in turn send LG notifications containing context to these other LG-aware entities if/when the LGS detects that the criteria defined in the subscription has been met.

Step 1a: An LGS sends a request to an 3rd Party Location Server to either share or request context with the 3rd Party Location Server. This context may include but is not limited to one or more of the elements defined in Table 12.

Step 1b: A 3rd Party Location Server receives and processes the request and either returns a response to the LGS confirming that the 3rd Party Location Server received the context information or returns context information to the LGS.

Step 2a: An LGS may send a request to a communication network to either share or request context. This context may include but is not limited to one or more of the elements defined in Table 12.

Step 2b: A CN receives and processes the request and returns a response to the LGS confirming that the CN received the context information or returns context information to the LGS.

Step 3a: An LGS may send a request to an LGC to either share or request context. This context may include but is not limited to one or more of the elements defined in Table 12.

Step 3b: The LGC receives and processes the request and returns a response to the LGS confirming that it received the context information or returns context information to the LGS.

Step 4a: An LGS may send a request to another LGS to either share or request context. This context may include but is not limited to one or more of the elements defined in Table 12.

Step 4b: The other LGS receives and processes the request and returns a response to the LGS confirming that it received the context information or returns context information to the LGS.

Step 5a: An LGS may send a request to an AS to either share or request context. This context may include but is not limited to one or more of the elements defined in Table 12.

Step 5b: The AS receives and processes the request and returns a response to the LGS confirming that it received the context information or returns context information to the LGS.

LGC Initiated LG Context Sharing

Figure 10:
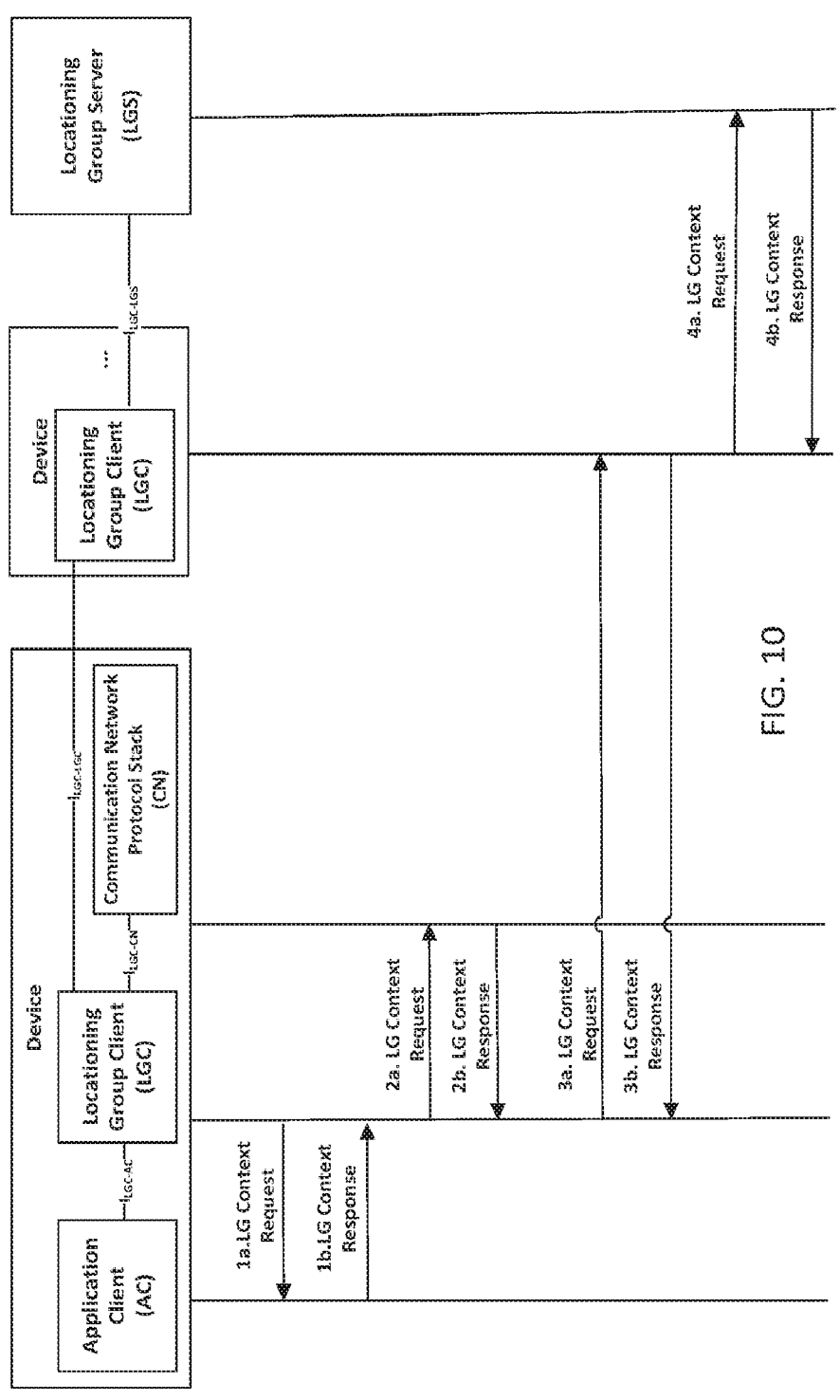
FIG. 10 shows an example of LGC Initiated LG Context Sharing.

As illustrated in FIG. 10, an LGC may exchange context information defined in Table 12 with other LG-aware entities in the system. The context may be shared or requested by the LGC initiating a request to these other LG-aware entities. Alternatively (not illustrated in FIG. 10), an LGC may subscribe to other LG-aware entities regarding context that the LGC is interested in, and receive LG notifications from these other LG-aware entities containing context if/when criteria defined within the subscription has been met. Conversely, an LGC may also receive LG subscriptions from other LG-aware entities regarding context they are interested in receiving from the LGC. The LGC can in turn send LG notifications containing context to these other LG-aware entities if/when the LGC detects that the criteria defined in the subscription has been met.

Step 1a: An LGC sends a request to an AC to either share or request LG context. This context may include but is not limited to one or more of the elements defined in Table 12.

Step 1b: An AC receives and processes the request and returns a response to the LGC confirming that the AC received the context information or returns context information to the LGC.

Step 2a: An LGC may send a request to a communication network protocol stack (CN) on the same device to either share or request context. This context may include but is not limited to one or more of the elements defined in Table 12.

Step 2b: An CN receives and processes the request and returns a response to the LGC confirming that the CN received the context information or returns context information to the LGC.

Step 3a: An LGC may send a request to another LGC on a different device to either share or request context. This context may include but is not limited to one or more of the elements defined in Table 12.

Step 3b: The LGC on the different device receives and processes the request and returns a response to the LGC confirming that it received the context information or returns context information to the LGC.

Step 4a: An LGC may send a request to an LGS to either share or request context. This context may include but is not limited to one or more of the elements defined in Table 12.

Step 4b: The LGS receives and processes the request and returns a response to the LGC confirming that it received the context information or returns context information to the LGC.

AC Initiated LG Context Sharing

Figure 11:
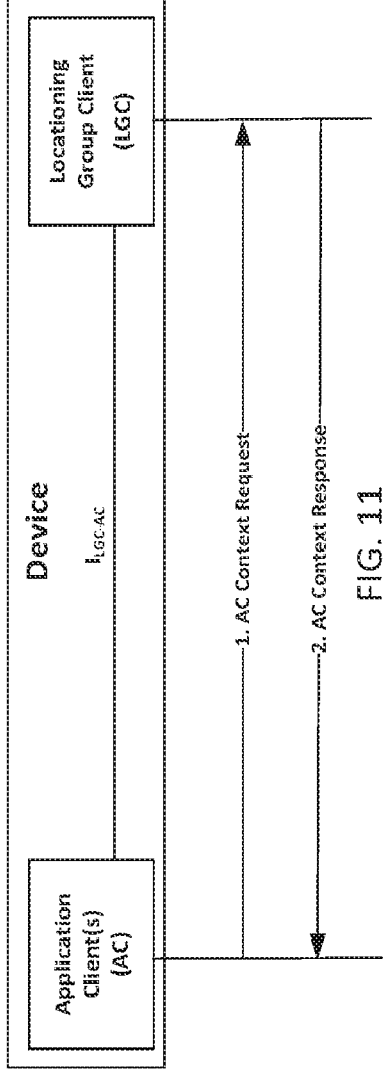
FIG. 11 shows an example of AC Initiated LG Context Sharing.

As illustrated in FIG. 11, an AC may exchange context information defined in Table 12 with an LGC. The L context may be shared or requested by the AC initiating a request to an LGC. Alternatively (not illustrated in FIG. 11), an AC may subscribe to an LGC regarding context that the AC is interested in, and receive LG notifications from an LGC containing context if/when criteria defined within the subscription has been met.

Step 1: An AC may send a request to an LGC to either share or request context. This LG context may include but is not limited to one or more of the elements defined in Table 12. The LGC may factor this information into its decision on whether to initiate an LG operation on behalf of the AC. For example, adding the device that the AC and LGC are hosted on to an LG that meets the LG requirements of the AC.

Step 2: If the LGC receives context information from the AC, the LGC may immediately process the context information to determine whether the LGC needs to perform an LG operation as a result. In addition, the LGC may store the context information such that the LGC may factor this information into future LG operations that it performs on behalf of the AC.

AS Initiated LG Context Sharing

Figure 12:
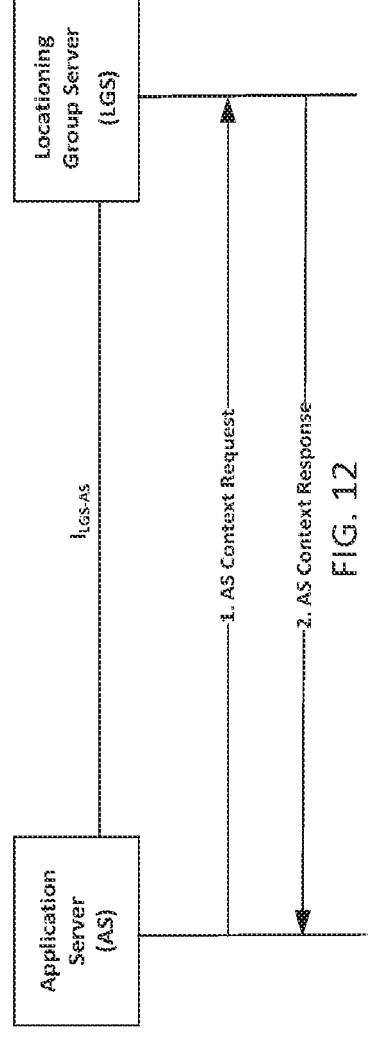
FIG. 12 shows an example of AS Initiated LG Context Sharing.

As illustrated in FIG. 12, an AS may exchange LG context information defined in Table 12 with an LGS. The context may be shared or requested by the AS initiating a request to an LGS. Alternatively (not illustrated in FIG. 12), an AS may subscribe to an LGS regarding context that the AS is interested in, and receive LG notifications from an LGS containing context if/when criteria defined within the subscription has been met.

Step 1: An AS may send a request to an LGS to either share or request context. This context may include but is not limited to one or more of the elements defined in Table 12. The LGS may factor this information into its decision on whether to initiate an LG operation on behalf of an AS and the devices it interacts with.

Step 2: If the LGS receives context information from the AS, the LGS may immediately process the context information to determine whether the LGS needs to perform an LG operation as a result. In addition, the LGS may store the context information such that the LGS may factor this information into future LG operations that it performs on behalf of the AS.

CN Initiated LG Context Sharing

Figure 13:
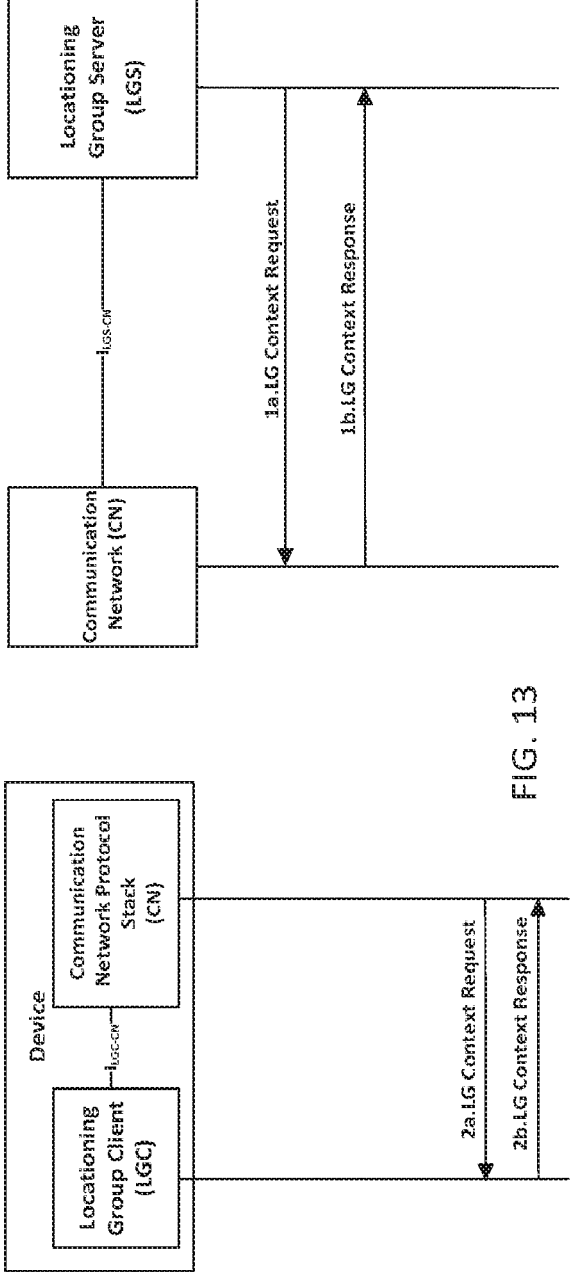
FIG. 13 shows an example of CN Initiated LG Context Sharing.

As illustrated in FIG. 13, an CN may exchange context information defined in Table 12 with another LG-aware entity such as an LGS or LGC. The context may be shared or requested by the CN initiating a request to an LG-aware entity. Alternatively (not illustrated in FIG. 13), a CN may subscribe to an LG-aware entity regarding context that the CN is interested in, and receive LG notifications from the entity containing context if/when criteria defined within the subscription has been met.

Step 1a: A CN sends a request to an LGS to either share or request context. This context may include but is not limited to one or more of the elements defined in Table 12.

Step 1b: An LGS receives and processes the request and either returns a response to the CN confirming that the LGS received the context information or returns context information to the CN.

Step 2a: A CN protocol stack may send a request to an LGC to either share or request context. This context may include but is not limited to one or more of the elements defined in Table 12.

Step 2b: An LGC receives and processes the request and returns a response to the CN protocol stack confirming that the LGC received the context information or returns context information to the CN protocol stack.

Locationing Group Discovery

LGS Initiated LG Discovery

Figure 14:
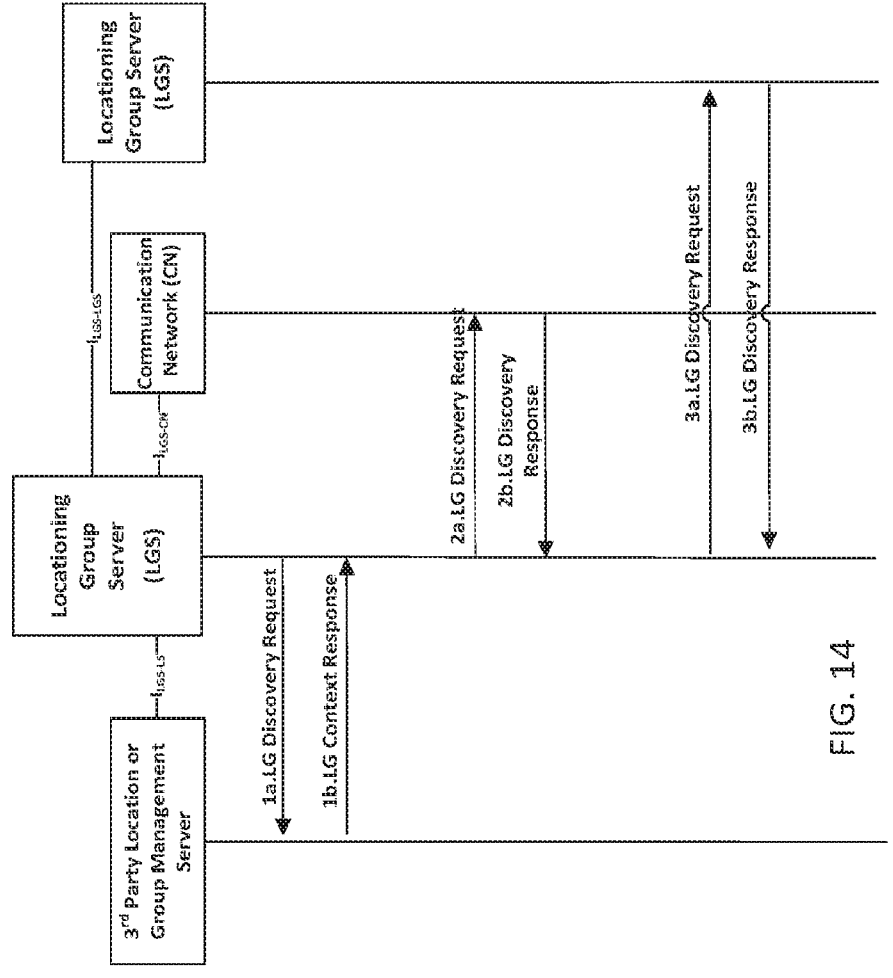
FIG. 14 shows an example of LGS Initiated LG Discovery.

An LGS may receive LG discovery requests from other LG-aware entities in the system. An LGS may also trigger an LG discovery operation itself while performing other LG operations. For example, to determine whether creation of a new LG is required or not. When performing an LG discovery operation, the LGS may use LG context information that it stores locally for tracking existing LG groups, and/or the LGS may issue one or more LG discovery requests to LG-aware entities in the system as illustrated in FIG. 14.

Step 1a: An LGS sends an LG discovery request to a 3rd Party Location or Group Management Server to discover available LGs. The request is issued via the ILGS-LS reference point and may contain information as defined in Table 10.

Step 1b: The 3rd Party Location Server receives and processes the request and returns a response containing LG discovery information. The response is issued via the ILGS-LS reference point and may contain information as defined in Table 10.

Step 2a: An LGS sends an LG discovery request to a CN to discover available LGs. The request is issued via the ILGS-CN reference point and may contain information as defined in Table 7.

Step 2b: The CN receives and processes the request and returns a response containing LG discovery information. The response is issued via the ILGS-CN reference point and may contain information as defined in Table 7.

Step 3a: An LGS may send a request to another LGS to discover available LGs. The request is issued via the ILGS-LGS reference point and may contain information as defined in Table 9.

Step 3b: The LGS receives and processes the request and returns a response containing LG discovery information. The response is issued via the ILGS-LGS reference point and may contain information as defined in Table 9.

LGC Initiated LG Discovery

An LGC may receive and forward LG discovery requests it receives from one LG-aware entity (e.g., an AC) to another LG-Aware entity in the system (e.g., An LGS or another LGC). An LGC may also trigger an LG discovery operation itself while performing other LG operations. For example, to determine whether creation of a new LG is required or not. When performing an LG discovery operation, the LGC may use LG context information that it stores locally for tracking existing LG groups, and/or the LGC may issue one or more LG discovery requests to LG-aware entities in the system to access context regarding other LGs that the LGC is unaware of but that may exist. For example, an LGC may issue an LG discovery operation to an LGS via the ILGC-LGS reference point.

Figure 15:
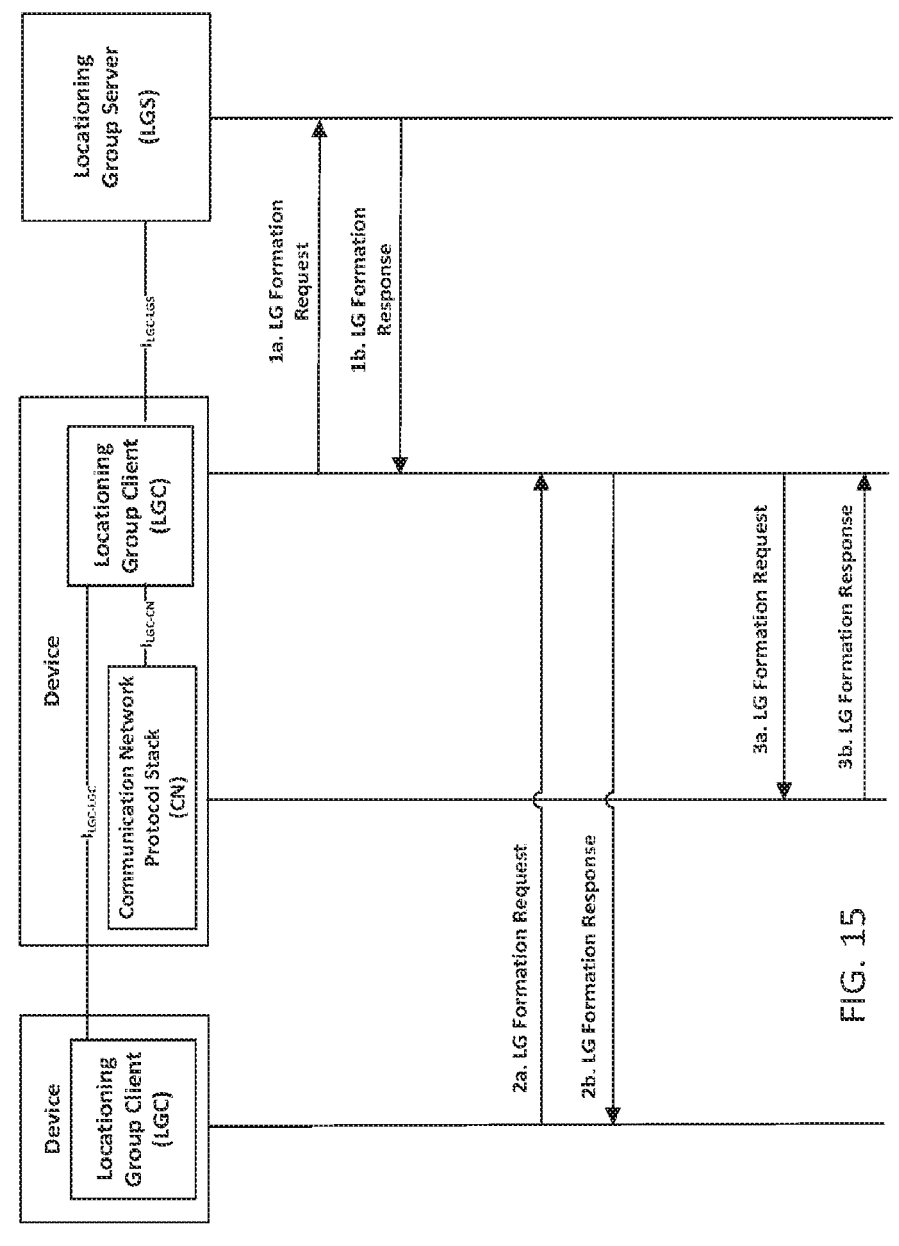
FIG. 15 shows an example of LGC Initiated LG Formation.

When forming an LG, an LGC may coordinate with other entities in the system as illustrated in FIG. 15.

Step 1a: An LGC may send a request to an LGS to request the LGS perform an LG discovery operation on behalf of the LGC. The determination of whether to issue the request to the LGS may be based on the LG policies configured at the LGC and/or whether the LGC has the capability to discovery an LG itself or not. The request is issued via the ILGC-LGS reference point and may contain information as defined in Table 2.

Step 1b: The LGS receives and processes the request and returns a response to the LGC containing the LG discovery results. The response is issued via the ILGC-LGS reference point and may contain information as defined in Table 2.

Step 2a: A first LGC may send a request to a second LGC to discover LGs on behalf of the first LGC. The determination of whether to issue the request to the second LGC may be based on the LG policies configured at the first LGC and/or whether the first LGC has the capability to discover LGs itself or not. The request is issued via the ILGC-LGC reference point and may contain information as defined in Table 3.

Step 2b: The second LGC receives and processes the request and returns a response to the first LGC containing LG discovery results. The response is issued via the ILGC-LGC reference point and may contain information as defined in Table 3.

Step 3a: An LGC may send a request to a communication network protocol stack on the local device to leverage device group discovery functionality supported by the CN. The request is issued via the ILGC-CN reference point and may contain information as defined in Table 4.

Step 3b: A CN protocol stack receives and processes the request and returns a response to the LGC containing device group related information. The response is issued via the ILGC-CN reference point and may contain information as defined in Table 4.

AC Initiated LG Discovery

Figure 16:
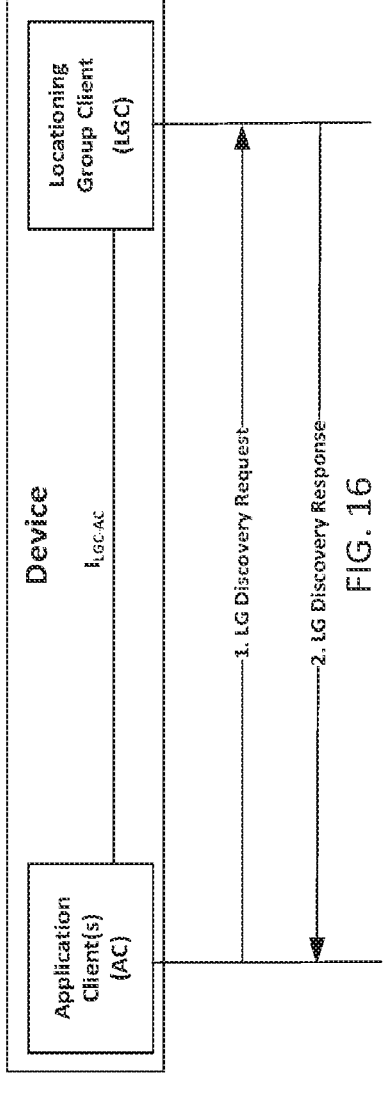
FIG. 16 shows an example of AC Initiated LG Discovery.

As illustrated in FIG. 16, an AC may issue an LG discovery request to an LGC hosted on the same device as the AC and receive an LG discovery response via the ILGC-AC reference point. The LG discovery operation performed by the AC may contain information as defined in Table 1.

Step 1: An AC may send a request to an LGC to discover available LGs. This LG discovery request may contain LG discovery criteria defined by the AC and that take into account context information such as but not limited to the information defined in Table 12. The LGC may factor this information into the LG discovery operation it performs on behalf of the AC.

Step 2: The LGC processes the LG discovery request and returns any LGs it discovers, and which meets the defined LG discovery criteria defined by the AC. When processing the LG discovery request, the LGC may forward the request to other LG-aware entities in the system (e.g., an LGS).

AS Initiated LG Discovery

Figure 17:
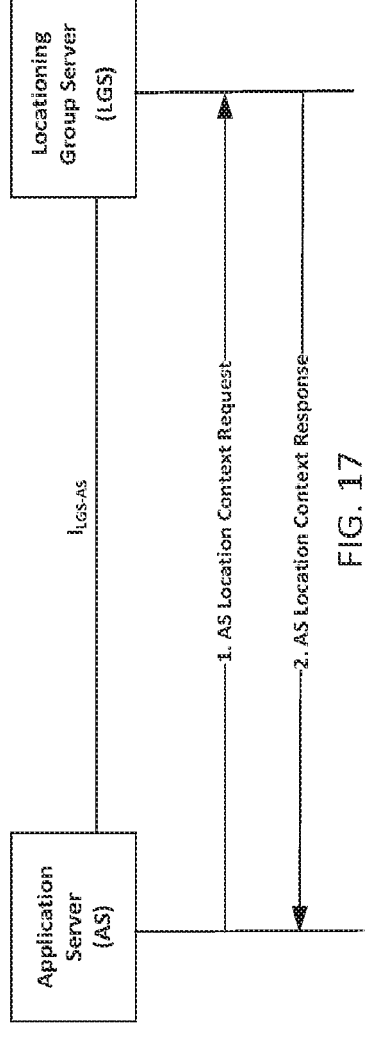
FIG. 17 shows an example of AS Initiated LG Discovery.

As illustrated in FIG. 17, an AS may issue an LG discovery request to an LGS and receive an LG discovery response via the ILGS-AS reference point. The LG discovery request and response performed may contain information as defined in Table 6.

Step 1: An AS may send a request to an LGS to discover available LGs. This LG discovery request may contain LG discovery criteria defined by the AS and that take into account context information such as but not limited to the information defined in Table 12. The LGS may factor this information into the LG discovery operation it performs on behalf of the AS.

Step 2: The LGS processes the LG discovery request and returns any LGs it discovers, and which meets the defined LG discovery criteria defined by the AS. When processing the LG discovery request, the LGS may forward the request to other LG-aware entities in the system (e.g., other LGSs).

Locationing Group Formation/Disbandment

LGS Initiated LG Formation/Disbandment

An LGS may receive LG formation or disbandment requests from other LG-aware entities in the system. An LGS may also trigger an LG formation or disbandment operation itself. An LGS may support the capability to analyze context (defined in Table 12) that it locally collects and stores as well as receives from other LG-aware entities in the system. An LGS may compare this context against LG policies (defined in Table 13). Based on this comparison, an LGS may determine if/when the formation or disbandment of an LG is required. An LGS may then trigger the formation or disbandment of an LG group.

Since an LGS may be privy to context information from various entities in the system (e.g., devices, ACs, ASs, LGCs, other LGSs, CN, LGMF, 3rd party location and group management servers), the LGS may support the capability to aggregate this information and make an LG formation or disbandment decision. This decision may be optimized based on the context information collected and processed from all these entities. For example, if there are multiple devices located in proximity to one another and/or moving along the same route, and these devices host ACs that require locationing functionality and the locationing requirements of the ACs are similar (e.g., location reporting frequency, location precision, etc.), then the LGS, with possible coordination and assistance from one or more other LG-aware entities in the system, may decide to initiate the formation of an LG consisting of these devices. Likewise if there are one or more ASs that require tracking the location of one or more of the devices that are in proximity of one another and the location requirements of the ASs are similar, then the LGS, with possible coordination and assistance from one or more other LG-aware entities in the system, may decide to initiate the formation of an LG consisting of these devices.

Figure 18:
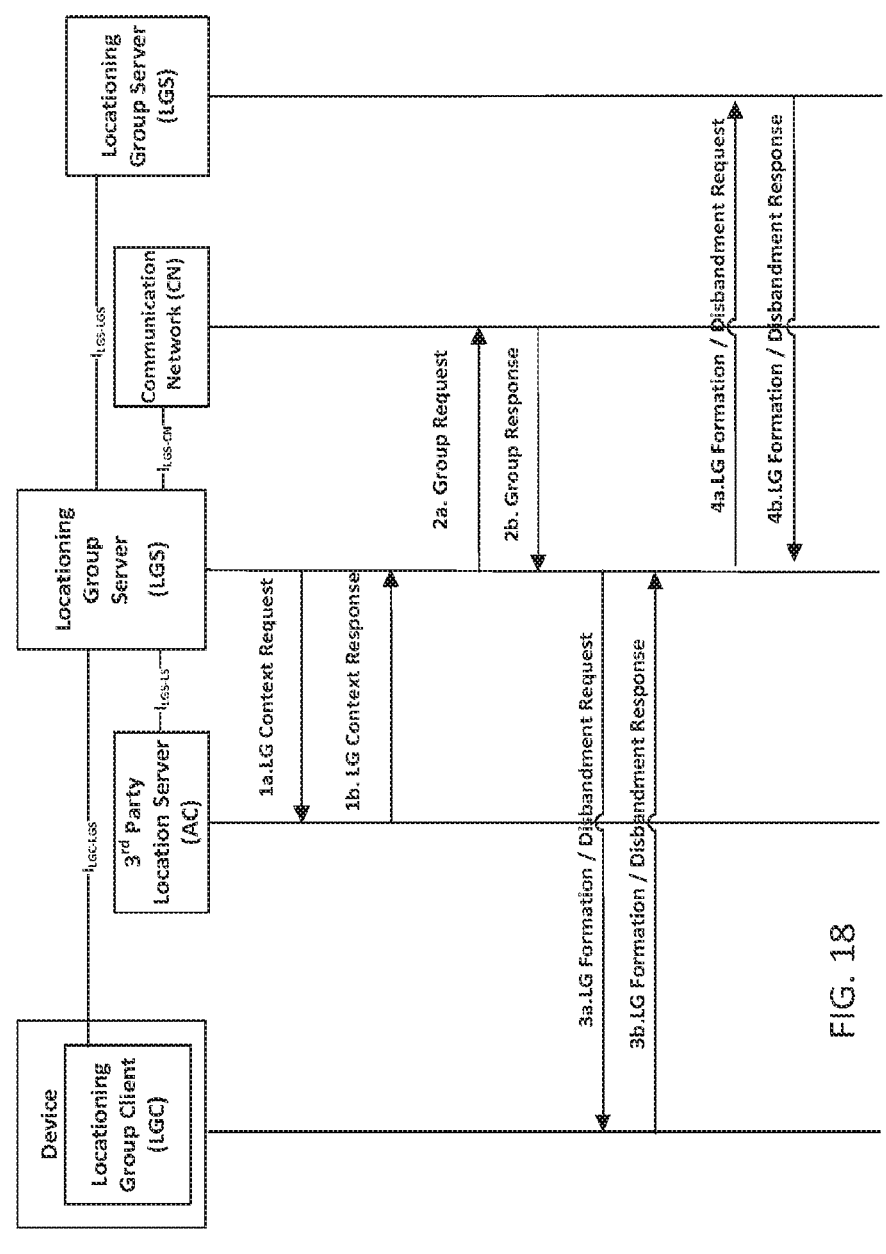
FIG. 18 shows an example of LGS Initiated LG Formation/Disbandment.

When forming or disbanding an LG, an LGS may coordinate with other entities in the system as illustrated in FIG. 18.

Step 1a: An LGS may send a request to an 3rd Party Location Server to collect location information for devices to determine which devices are in proximity/range of one another and that make the best candidates as members of an LG. The request is issued via the ILGS-LS reference point and may contain information as defined in Table 10

Step 1b: A 3rd Party Location Server receives and processes the request and returns a response to the LGS. The response is issued via the ILGS-LS reference point and may contain information as defined in Table 10.

Step 2a: An LGS may send a request to a communication network to collect location information for devices such as which devices are in proximity/range of one another and that make the best candidates as members of an LG. An LGS may also send a request to a communication network to leverage device group management functionality supported by the CN. The requests may be issued via the ILGS-CN reference point and may contain information as defined in Table 7. For example, the CN may support functionality for forming a group of devices which the LGS can leverage and extend with additional higher-level LG functionality. Some examples of additional functionality that an LGS can provide that may not be supported by CN group management functionality may include:

selecting the devices to be included in the group based on LG context defined in Table 12, selecting the devices to be included in the group based on AC context defined in Table 12, selecting the devices to be included in the group based on AS context defined in Table 12, selecting the devices to be included in the group based on Device context defined in Table 12, selecting a leader of the LG based context information captured in Table 12

Step 2b: A CN receives and processes the request and returns a response to the LGS containing device locationing or group related information. The response is issued via the ILGS-CN reference point and may contain information as defined in Table 7.

Step 3a: An LGS may send a request to an LGC to form or disband a group. The request is issued via the ILGC-LGS reference point and may contain information as defined in Table 2. When an LGC receives the request, it may perform local LG formation or disbandment operations such as but not limited to joining or leaving an IP broadcast or multicast group associated with the LG, notifying one or more ACs of the LG formation or disbandment, notifying other LGCs of the LG formation or disbandment (e.g., if LGC is the LG leader).

Step 3b: The LGC receives and processes the request and returns a response to the LGS confirming that it received and processed the LG formation or disbandment request. The response is issued via ILGC-LGS reference point and may contain information as defined in Table 2.

Step 4a: An LGS may send a request to another LGS to form or disband a group. The request is issued via the ILGS-LGS reference point and may contain information as defined in Table 9.

Step 4b: The other LGS receives and processes the request and returns a response to the LGS confirming that it received and processed the LG formation or disbandment request. The response is issued via ILGS-LGS reference point and may contain information as defined in Table 9.

Step 5a: An LGS may send a request to an AS to form or disband a group. The request is issued via the ILGC-LGS reference point and may contain information as defined in Table 2.

Step 5b: The AS receives and processes the request and returns a response to the LGS confirming that it received and processed the LG formation or disbandment request. The response is issued via ILGS-AS reference point and may contain information as defined in Table 6.

LGC Initiated LG Formation/Disbandment

An LGC may receive LG formation or disbandment requests from other LG-aware entities in the system. An LGC may also trigger an LG formation or disbandment operation itself. An LGC may support the capability to analyze context (defined in Table 12) that it locally collects and stores as well as receives from other LG-aware entities in the system. An LGC may compare this context against LG policies (defined in Table 13). Based on this comparison, an LGC may determine if/when an LG formation or disbandment is required. An LGC may then trigger the formation or disbandment of an LG group.

Since an LGC may be privy to context information from various entities in the system (e.g., devices, ACs, LGSs, other LGCs, CN, LGMF), the LGC may support the capability to aggregate this information and determine when to form or disband an LG. The decision to form or disband an LG may be based on the context information that the LGC collects and processes from all these entities. Since an LGC may be privy to locationing requirements and context information of multiple ACs hosted on the same device as the LGC, the LGC may support the capability to aggregate this information to make an LG formation and disbandment decision that is optimized across all the ACs on the device. An LGC may also support coordinating with other LGCs hosted on other devices (e.g., in local proximity). If the ACs requiring locationing functionality on the local device have similar locationing requirements as each other and similar locationing requirements as ACs on other devices in the vicinity and/or moving along the same route, then the LGC (with possible coordination with one or more other LG-aware entities) may initiate the formation of an LG that includes the device hosting the LGC and other devices in its proximity.

Figure 19:
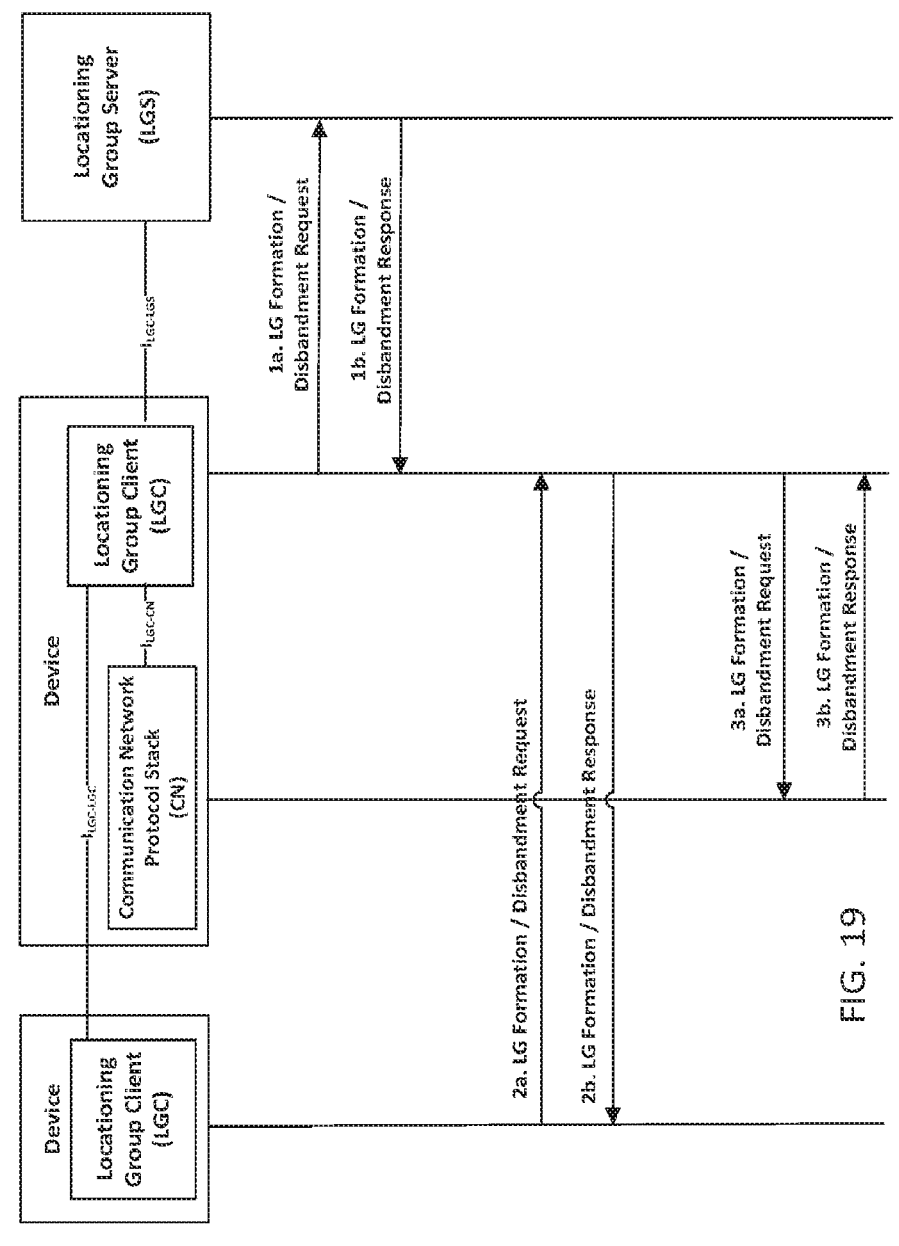
FIG. 19 shows an example of LGC Initiated LG Formation/Disbandment.

When forming or disbanding an LG, an LGC may coordinate with other entities in the system as illustrated in FIG. 19.

Step 1a: An LGC may send a request to an LGS to request the LGS to form or disband an LG on behalf of the LGC. The determination of whether to issue the request to the LGS may be based on the LG policies configured at the LGC and/or whether the LGC has the capability to form or disband an LG itself or not. The request is issued via the ILGC-LGS reference point and may contain information as defined in Table 2.

Step 1b: The LGS receives and processes the request and returns a response to the LGC confirming that it received and performed the request to form or disband an LG. The response is issued via the ILGC-LGS reference point and may contain information as defined in Table 2.

Step 2a: A first LGC may send a request to a second LGC to form or disband an LG on behalf of the first LGC. The determination of whether to issue the request to the second LGC may be based on the LG policies configured at the first LGC and/or whether the first LGC has the capability to form or disband an LG itself or not. The request is issued via the ILGC-LGC reference point and may contain information as defined in Table 3.

Step 2b: The second LGC receives and processes the request and returns a response to the first LGC confirming that it received and performed the request to form or disband an LG. The response is issued via the ILGC-LGC reference point and may contain information as defined in Table 3.

Step 3a: An LGC may send a request to a communication network protocol stack on the local device to collect location information for the local device and/or other devices in range/proximity to the local device. An LGC may also send a request to a communication network protocol stack to leverage device group management functionality supported by the CN. The requests are issued via the ILGC-CN reference point and may contain information as defined in Table 4. For example, the CN protocol stack may support functionality for forming or disbanding a group of devices in the proximity which the LGC can leverage and extend with additional higher-level LG functionality. Some examples of additional functionality that an LGC can provide that may not be supported by CN protocol stack group management functionality may include:

selecting the devices to be included in the group based on LG context defined in Table 12, selecting the devices to be included in the group based on AC context defined in Table 12, selecting the devices to be included in the group based on Device context defined in Table 12, selecting a leader of the LG based context information captured in Table 12

Step 3b: A CN protocol stack receives and processes the request and returns a response to the LGC containing device locationing or group related information. The response is issued via the ILGC-CN reference point and may contain information as defined in Table 4.

AC Initiated LG Formation/Disbandment

Figure 20:
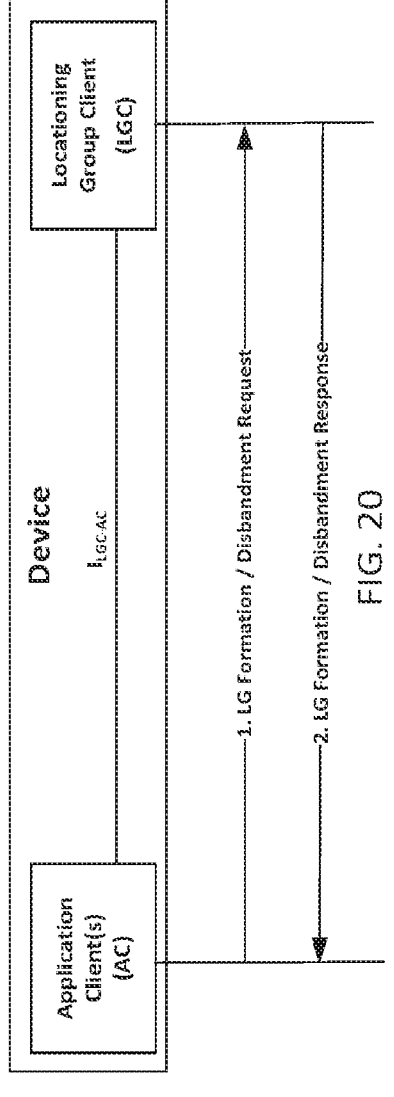
FIG. 20 shows an example of AC Initiated LG Formation/Disbandment.

As illustrated in FIG. 20, an AC may issue an LG formation or disbandment request to an LGC hosted on same device as the AC and receive an LG formation or disbandment response via the ILGC-AC reference point. The LG formation or disbandment operation performed by the AC may contain information as defined in Table 1.

Step 1: An AC may send a request to an LGC to form or disband an LG. This LG formation or disbandment request may contain LG formation or disbandment criteria defined by the AC and that take into account context information such as but not limited to the information defined in Table 12. The LGC may factor this information into the LG formation or disbandment operation it performs on behalf of the AC.

Step 2: The LGC processes the LG formation or disbandment request and returns the LG context information, as defined in Table 12, for the formed or disbanded LG which meets the defined LG formation or disbandment criteria defined by the AC. When processing the LG formation or disbandment request, the LGC may forward the request to other LG-aware entities in the system (e.g., an LGS).

AS Initiated LG Formation/Disbandment

Figure 21:
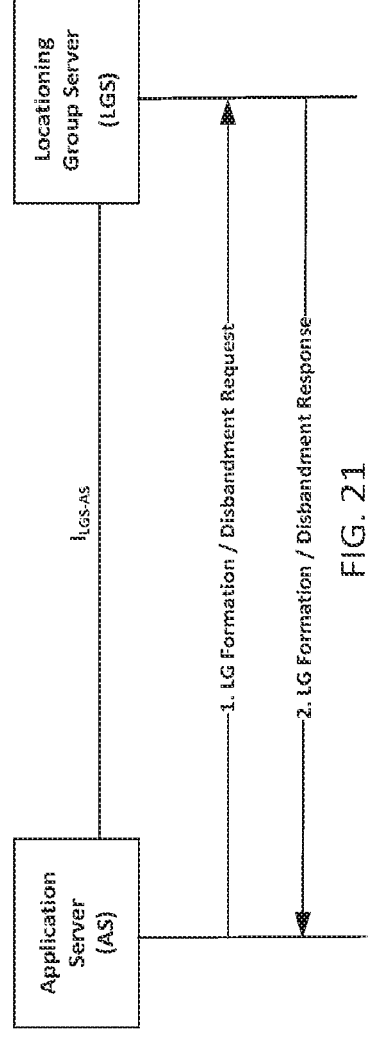
FIG. 21 shows an example of AS Initiated LG Formation/Disbandment.

As illustrated in FIG. 21, an AS may issue an LG formation or disbandment request to an LGS and receive an LG formation or disbandment response via the ILGS-AS reference point. The LG request and response performed may contain information as defined in Table 6.

Step 1: An AS may send a request to an LGS to form or disband an LG. This LG formation or disbandment request may contain LG formation or disbandment criteria defined by the AS and that take into account context information such as but not limited to the information defined in Table 12. The LGS may factor this information into the LG formation operation it performs on behalf of the AS.

Step 2: The LGS processes the LG formation or disbandment request and returns the LG context information, as defined in Table 12, for the newly formed or disbanded LG which meets the defined LG formation or disbandment criteria defined by the AS. When processing the LG formation or disbandment request, the LGS may forward the request to other LG-aware entities in the system (e.g., an LGS).

CN Initiated LG Formation/Disbandment

A CN may trigger an LG formation or disbandment operation. A CN may support the capability to analyze CN and device context (defined in Table 12) that it locally collects and stores as well as receives from other LG-aware entities in the system. A CN may analyze this context and determine if/when an LG formation or disbandment is required. An CN may then trigger the formation or disbandment of an LG group.

Figure 22:
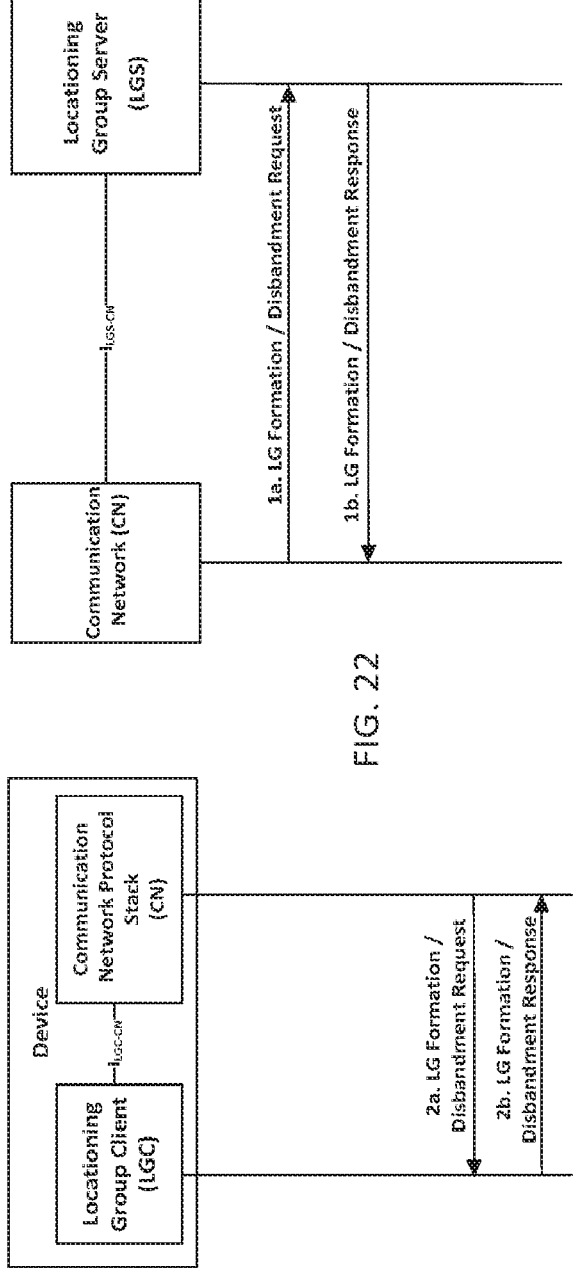
FIG. 22 shows an example of CN Initiated LG Formation/Disbandment.

When forming or disbanding an LG, a CN may coordinate with other entities in the system as illustrated in FIG. 22.

Step 1a: A CN may send a request to an LGS to form or disband an LG. This LG formation or disbandment request may contain LG formation or disbandment criteria defined by the CN and that take into account context information such as but not limited to the information defined in Table 12. The LGS may factor this information into the LG formation or disbandment operation it performs on behalf of the CN.

Step 1b: The LGS processes the LG formation or disbandment request and returns the LG context information, as defined in Table 12, for the newly formed or disbanded LG which meets the defined LG formation or disbandment criteria defined by the CN. When processing the request, the LGS may forward the request to other LG-aware entities in the system (e.g., an LGS).

Step 2a: A CN may send a request to an LGC to form or disband an LG. This request may contain LG formation or disbandment criteria defined by the CN and that take into account context information such as but not limited to the information defined in Table 12. The LGC may factor this information into the LG formation or disbandment operation it performs on behalf of the CN.

Step 2b: The LGC processes the LG formation or disbandment request and returns the LG context information, as defined in Table 12, for the newly formed or disbanded LG which meets the defined LG formation or disbandment criteria defined by the CN. When processing the request, the LGC may forward the request to other LG-aware entities in the system (e.g., an LGS).

Locationing Group Member Addition/Removal

LGS Initiated LG Member Addition/Removal

An LGS may receive LG member addition or removal requests from other LG-aware entities in the system. An LGS may also trigger an LG member addition or removal operation itself. An LGS may support the capability to analyze context (defined in Table 12) that it locally collects and stores as well as receives from other LG-aware entities in the system. An LGS may compare this context against LG policies (defined in Table 13). Based on this comparison, an LGS may determine if/when the addition or removal of a member to an LG is required. An LGS may then trigger and perform the operation.

Since an LGS may be privy to context information from various entities in the system (e.g., devices, ACs, ASs, LGCs, other LGSs, CN, LGMF, 3rd party location and group management servers), the LGS may support the capability to aggregate this information and make an LG member addition or removal decision. This decision may be optimized based on the context information collected and processed from all these entities. For example, if there are multiple devices located in proximity to one another and/or moving along the same route, and these devices host ACs that require locationing functionality, or there are one or more ASs that require tracking the location of one or more of the devices, then the LGS, with possible coordination and assistance from one or more other LG-aware entities in the system, may decide to initiate the addition or removal of a member to or from an LG.

Figure 23:
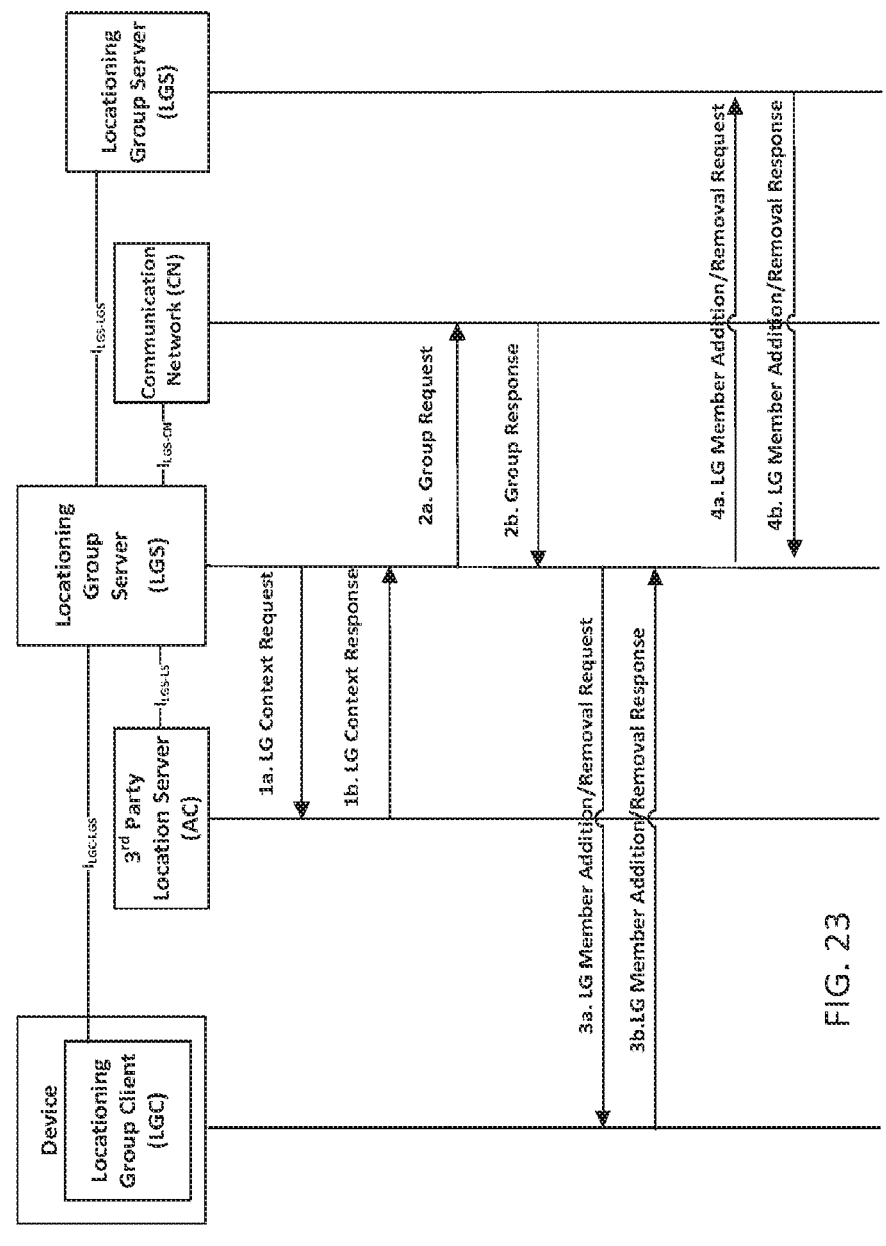
FIG. 23 shows an example of LGS Initiated LG Member Addition/Removal.

When adding or removing an LG member, an LGS may coordinate with other entities in the system as illustrated in FIG. 23.

Step 1a: An LGS may send a request to an 3rd Party Location Server to collect location information for devices to determine which devices are in proximity/range of one another and that make the best candidates as members of an LG. The request is issued via the ILGS-LS reference point and may contain information as defined in Table 10

Step 1b: A 3rd Party Location Server receives and processes the request and returns a response to the LGS. The response is issued via the ILGS-LS reference point and may contain information as defined in Table 10.

Step 2a: An LGS may send a request to a communication network to collect location information for devices such as which devices are in proximity/range of one another and that make the best candidates as members of an LG. An LGS may also send a request to a communication network to leverage device group management functionality supported by the CN. The requests are issued via the ILGS-CN reference point and may contain information as defined in Table 7. For example, the CN may support functionality for adding or removing a member device from a group of devices which the LGS can leverage and extend with additional higher-level LG functionality. Some examples of additional functionality that an LGS can provide that may not be supported by CN group management functionality may include:

selecting the devices to be added or removed from a group based on LG context defined in Table 12, selecting the devices to be added or removed from a group based on AC context defined in Table 12, selecting the devices to be added or removed from a group based on AS context defined in Table 12, selecting the devices to be added or removed from a group based on Device context defined in Table 12, selecting a leader of the LG when a device is added or removed from an LG based context information captured in Table 12

Step 2b: A CN receives and processes the request and returns a response to the LGS containing device locationing or group related information. The response is issued via the ILGS-CN reference point and may contain information as defined in Table 7.

Step 3a: An LGS may send a request to an LGC to add or remove a member from an LG. The request is issued via the ILGC-LGS reference point and may contain information as defined in Table 2.

Step 3b: The LGC receives and processes the request and returns a response to the LGS confirming that it received and processed the LG member addition or removal request. The response is issued via ILGC-LGS reference point and may contain information as defined in Table 2. When processing the request, if the LGC is associated with the device that is being added or removed from the LG, then the LGC may perform operations such as notifying ACs on the device that the device has been added or removed from the LG, joining or leaving a multicast or broadcast group, or start or stop listening for multicast or broadcast messages for the LG. When processing the request, if the LGC is not associated with the device that is being added or removed from the LG, then the LGC may forward the request to another LGC that either is associated with the device that is being added or removed or is able to forward it to that device.

Step 4a: An LGS may send a request to another LGS to add or remove a member of an LG. The request is issued via the ILGS-LGS reference point and may contain information as defined in Table 9.

Step 4b: The other LGS receives and processes the request and returns a response to the LGS confirming that it received and processed the LG request to add or remove a member. The response is issued via ILGS-LGS reference point and may contain information as defined in Table 9.

Step 5a: An LGS may send a request to an AS to add or remove a member of an LG. The request is issued via the ILGC-LGS reference point and may contain information as defined in Table 2.

Step 5b: The AS receives and processes the request and returns a response to the LGS confirming that it received and processed the LG member addition or removal request. The response is issued via ILGS-AS reference point and may contain information as defined in Table 6.

LGC Initiated LG Member Addition/Removal

An LGC may receive LG member addition or removal requests from other LG-aware entities in the system. An LGC may also trigger an LG member addition or removal operation itself. An LGC may support the capability to analyze context (defined in Table 12) that it locally collects and stores as well as receives from other LG-aware entities in the system. An LGC may compare this context against LG policies (defined in Table 13). Based on this comparison, an LGC may determine if/when an LG member addition or removal is required. An LGC may then trigger the formation of an LG group.

Since an LGC may be privy to context information from various entities in the system (e.g., devices, ACs, LGSs, other LGCs, CN, LGMF), the LGC may support the capability to aggregate this information and determine when to add or remove a member of an LG. The decision to add or remove a member of an LG may be based on the LG context information that the LGC collects and processes from all these entities. Since an LGC may be privy to locationing requirements and context information of multiple ACs hosted on the same device as the LGC, the LGC may support the capability to aggregate this information to make an LG formation decision that is optimized across all the ACs on the device. An LGC may also support coordinating with other LGCs hosted on other devices (e.g., in local proximity). If the ACs requiring locationing functionality on the local device have similar locationing requirements as each other and similar locationing requirements as ACs on other devices in the vicinity and/or moving along the same route, then the LGC (with possible coordination with one or more other LG-aware entities) may initiate the member addition or removal of an LG that includes the device hosting the LGC and other devices in its proximity.

Figure 24:
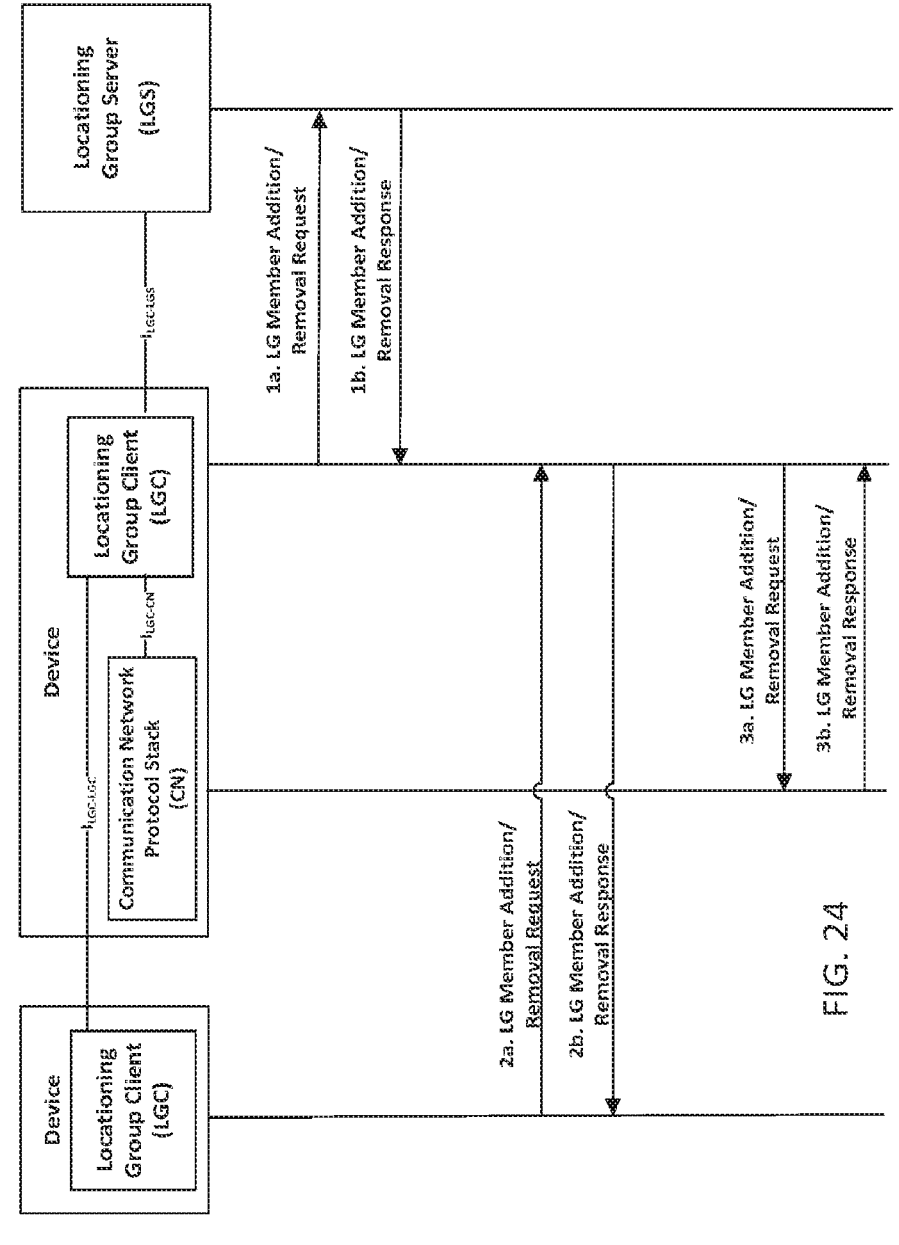
FIG. 24 shows an example of LGC Initiated LG Member Addition/Removal.

When adding or removing a member of an LG, an LGC may coordinate with other entities in the system as illustrated in FIG. 24.

Step 1a: An LGC may send a request to an LGS to request the LGS add or remove a member for an LG on behalf of the LGC. The determination of whether to issue the request to the LGS may be based on the LG policies configured at the LGC and/or whether the LGC has the capability to form an LG itself or not. The request is issued via the ILGC-LGS reference point and may contain information as defined in Table 2.

Step 1b: The LGS receives and processes the request and returns a response to the LGC confirming that it received and performed the request. The response is issued via the ILGC-LGS reference point and may contain information as defined in Table 2. When processing the response, if the LGC is associated with the device that is being added or removed from the LG, then the LGC may perform operations such as notifying ACs on the device that the device has been added or removed from the LG, joining or leaving a multicast or broadcast group, or start or stop listening for multicast or broadcast messages for the LG. When processing the response, if the LGC is not associated with the device that is being added or removed from the LG, then the LGC may forward the request to another LGC that either is associated with the device that is being added or removed or is able to forward it to that device.

Step 2a: A first LGC may send a request to a second LGC to add or remove a member for an LG on behalf of the first LGC. The determination of whether to issue the request to the second LGC may be based on the LG policies configured at the first LGC and/or whether the first LGC has the capability to add or remove a member for an LG itself or not. The request is issued via the ILGC-LGC reference point and may contain information as defined in Table 3.

Step 2b: The second LGC receives and processes the request and returns a response to the first LGC confirming that it received and performed the request. Note, the processing of the request may involve the second LGC sending a request (not illustrated in FIG. 24) to an LGS or another LGC to add or remove the member. The response is issued via the ILGC-LGC reference point and may contain information as defined in Table 3. When receiving the response, if the LGC is associated with the device that is being added or removed from the LG, then the LGC may perform operations such as notifying ACs on the device that the device has been added or removed from the LG, joining or leaving a multicast or broadcast group, or start or stop listening for multicast or broadcast messages for the LG. When processing the request, if the LGC is not associated with the device that is being added or removed from the LG, then the LGC may forward the request to another LGC that either is associated with the device that is being added or removed or is able to forward it to that device.

Step 3a: An LGC may send a request to a communication network protocol stack on the local device to collect location information for the local device and/or other devices in range/proximity to the local device. An LGC may also send a request to a communication network protocol stack to leverage device group management functionality supported by the CN. The requests are issued via the ILGC-CN reference point and may contain information as defined in Table 4. For example, the CN protocol stack may support functionality for adding or removing a member of a group of devices in the proximity which the LGC can leverage and extend with additional higher-level LG functionality. Some examples of additional functionality that an LGC can provide that may not be supported by CN protocol stack group management functionality may include:

selecting the devices to be added or removed in the group based on LG context defined in Table 12, selecting the devices to be added or removed in the group based on AC context defined in Table 12, selecting the devices to be added or removed in the group based on Device context defined in Table 12, selecting a leader of the LG based context information captured in Table 12

Step 3b: A CN protocol stack receives and processes the request and returns a response to the LGC containing device locationing or group related information. The response is issued via the ILGC-CN reference point and may contain information as defined in Table 4.

AC Initiated LG Member Addition/Removal

Figure 25:
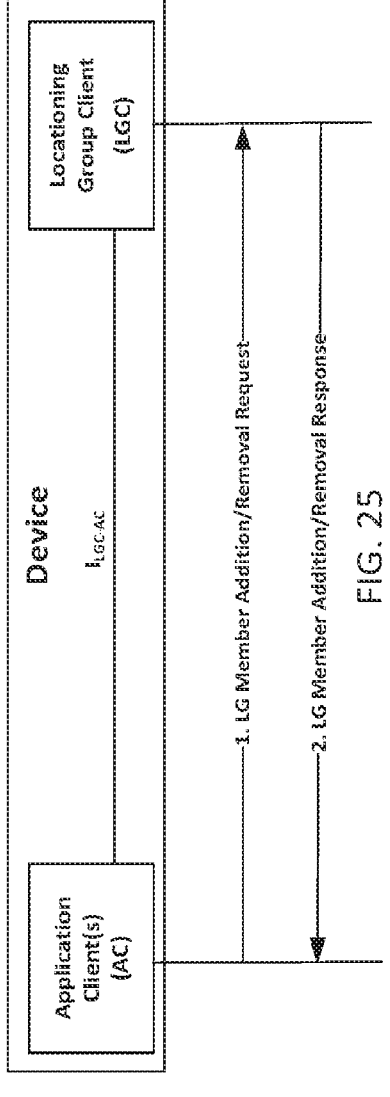
FIG. 25 shows an example of AC Initiated LG Member Addition/Removal.

As illustrated in FIG. 25, an AC may issue an LG member addition or removal request to an LGC hosted on the same device as the AC and receive an LG member addition or removal response via the ILGC-AC reference point. The LG member addition or removal operation performed by the AC may contain information as defined in Table 1.

Step 1: An AC may send a request to an LGC to add or remove a member for an LG. This LG member removal or addition request may contain LG member addition or removal criteria defined by the AC and that take into account context information such as but not limited to the information defined in Table 12. The LGC may factor this information into the LG member addition or removal operation it performs on behalf of the AC.

Step 2: The LGC processes the LG member addition or removal request and returns the LG context information, as defined in Table 12, for the updated LG which meets the defined LG member addition or removal criteria defined by the AC. When processing the LG member addition or removal request, the LGC may forward the request to other LG-aware entities in the system (e.g., an LGS).

AS Initiated LG Member Addition/Removal

Figure 26:
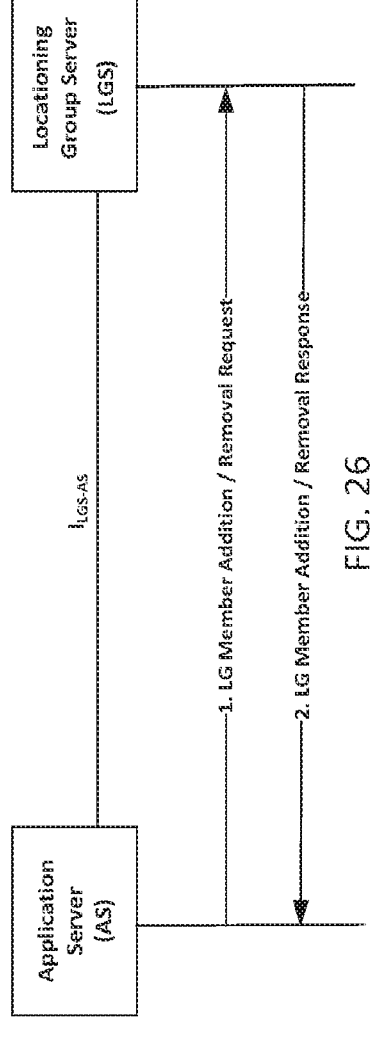
FIG. 26 shows an example of AS Initiated LG Member Addition/Removal.

As illustrated in FIG. 26, an AS may issue an LG member addition or removal request for an LGS and receive an LG member addition or removal response via the ILGS-AS reference point. The LG member or removal request and response performed may contain information as defined in Table 6.

Step 1: An AS may send a request to an LGS to add or remove a member of the LG. This LG member addition or removal request may contain LG member addition or removal criteria defined by the AS and that take into account context information such as but not limited to the information defined in Table 12. The LGS may factor this information into the LG member addition or removal operation it performs on behalf of the AS.

Step 2: The LGS processes the LG member addition or removal request and returns the LG context information, as defined in Table 12, for the updated LG which meets the defined LG member addition or removal criteria defined by the AS. When processing the LG member addition or removal request, the LGS may forward the request to other LG-aware entities in the system (e.g., an LGS).

CN Initiated LG Member Addition/Removal

A CN may trigger an LG member or addition or removal LG operation. A CN may support the capability to analyze CN and device context (defined in Table 12) that it locally collects and stores as well as receives from other LG-aware entities in the system. A CN may analyze this context and determine if/when an LG member addition or removal operation is required. An CN may then trigger the member addition or removal for the LG group.

Figure 27:
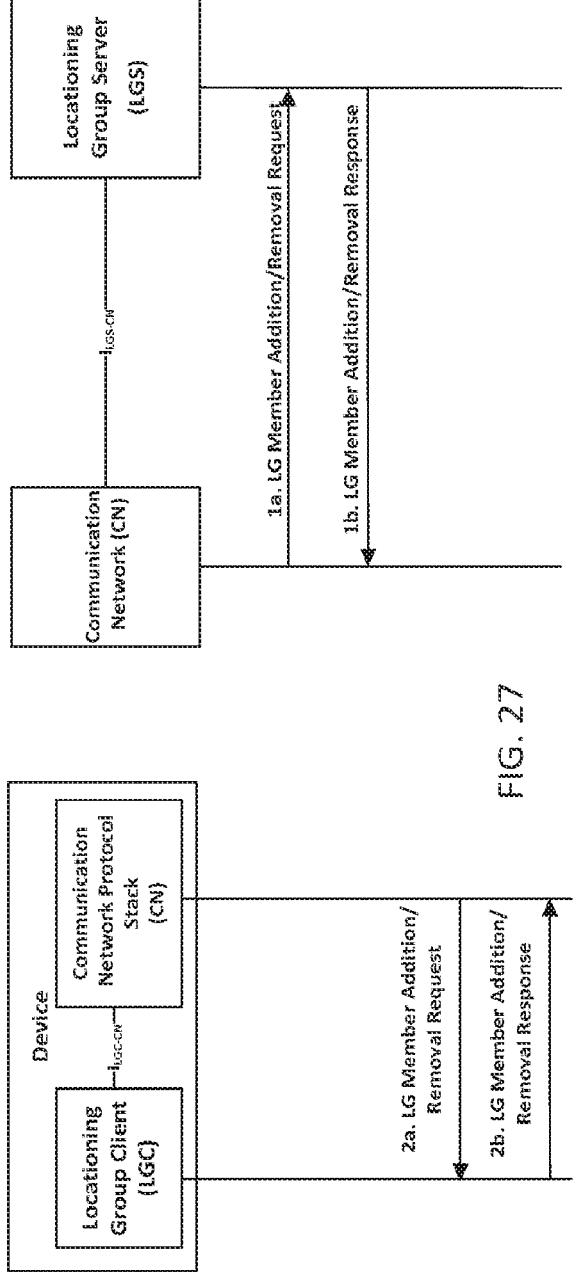
FIG. 27 shows an example of CN Initiated LG Member Addition/Removal.

When adding or removing a member for an LG, a CN may coordinate with other entities in the system as illustrated in FIG. 27.

Step 1a: A CN may send a request to an LGS to add or remove a member for an LG. This LG member or addition request may contain LG member addition or removal criteria defined by the CN and that take into account context information such as but not limited to the information defined in Table 12. The LGS may factor this information into the LG member addition or removal operation it performs on behalf of the CN.

Step 1b: The LGS processes the LG member addition or removal request and returns the LG context information, as defined in Table 12, for the updated LG which meets the defined LG member addition or removal criteria defined by the CN. When processing the LG member addition or removal request, the LGS may forward the request to other LG-aware entities in the system (e.g., an LGS).

Step 2a: A CN may send a request to an LGC to add or remove a member for an LG. This LG request may contain LG member addition or removal criteria defined by the CN and that take into account context information such as but not limited to the information defined in Table 12. The LGC may factor this information into the LG member addition or removal operation it performs on behalf of the CN.

Step 2b: The LGC processes the LG member addition or removal request and returns the LG context information, as defined in Table 12, for the updated LG which meets the defined LG member addition or removal criteria defined by the CN. When processing the LG request, the LGC may forward the request to other LG-aware entities in the system (e.g., an LGS).

Locationing Group Leader Management

LGS Initiated LG Leader Management

An LGS may receive requests to perform an LG leader management operation from other LG-aware entities in the system. An LG leader management operation may include but is not limited to assigning a designated member device as the leader of an LG such that the location of that device is used as the location of the LG, or an operation to switch the leader of an LG from one device to another device.

An LGS may also trigger an LG leader management operation itself. An LGS may support the capability to analyze LG context (defined in Table 12) that it locally collects and stores as well as receives from other LG-aware entities in the system. An LGS may compare this context against LG policies (defined in Table 13). Based on this comparison, an LGS may determine if/when performing an LG leader management operation is required. An LGS may then trigger and perform the LG leader operation.

Since an LGS may be privy to LG context information from various entities in the system (e.g., devices, ACs, ASs, LGCs, other LGSs, CN, LGMF, 3rd party location and group management servers), the LGS may support the capability to aggregate this information and make an LG leader management operation decision. This decision may be optimized based on the LG context information collected and processed from all these entities. For example, if there is one device that is more centrally located amongst the member devices in the LG, or there is a device that has more resources (e.g., battery or processing resources) and is deemed more capable and suited to serve as an LG leader, then the LGS, with possible coordination and assistance from one or more other LG-aware entities in the system, may decide to initiate selection and configuration of a device as leader of an LG. Likewise, as conditions and status of the member devices change such as devices are added or removed from an LG or devices move and their locations change with respect to one another, or the resources of devices changes (e.g., battery level of lead devices becomes low), then the LGS, with possible coordination and assistance from one or more other LG-aware entities in the system, may decide to initiate a re-selection and re-configuration of a different device as leader of an LG.

Figure 28:
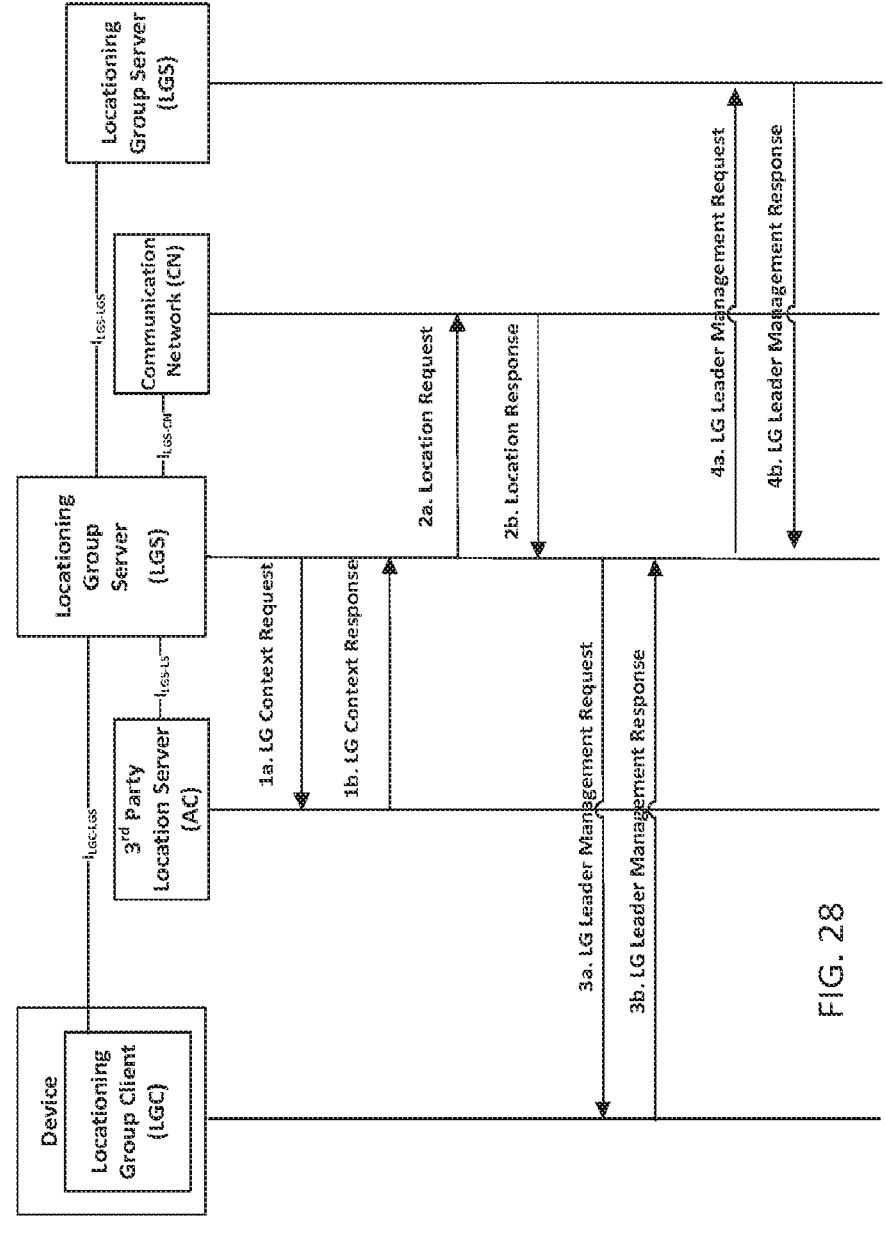
FIG. 28 shows an example of LGS Initiated LG Leader Management.

When performing an LG leader management operation, an LGS may coordinate with other entities in the system as illustrated in FIG. 28.

Step 1a: An LGS may send a request to an 3rd Party Location Server to collect location information for devices to determine which devices are in proximity/range of one another and that make the best candidates to be the leader of an LG. The request is issued via the ILGS-LS reference point and may contain information as defined in Table 10

Step 1b: A 3rd Party Location Server receives and processes the request and returns a response to the LGS. The response is issued via the ILGS-LS reference point and may contain information as defined in Table 10.

Step 2a: An LGS may send a request to a CN to collect location information for devices such as which devices are in proximity/range of one another and that make the best candidates to be leader of an LG. An LGS may communicate the device that it selects to be leader of an LG such that the CN can use this information to selectively collect location information for just the leader device in the group and not the other devices in a group. This can allow the CN to reduce overhead and congestion in the CN by reducing the overhead with tracking all the location of devices in a group. A CN can also support functionality to notify an LGS if/when the leader leaves the group or is no longer the most centrally located device in the group. This information can assist the LGS with determining if/when switching the leader role to a new device is needed. If/when switching the leader role to a new member device in the LG, the LGS can send a request to the CN to perform this switch. The CN can in turn enable location tracking of the new leader device in the LG and disabling the location tracking of the old leader device.

Step 2b: A CN receives and processes the request and returns a response to the LGS containing device locationing or group related information. The response is issued via the ILGS-CN reference point and may contain information as defined in Table 7.

Step 3a: An LGS may send a notification to an LGC to inform it of an LG leader management operation that was performed. The request is issued via the ILGC-LGS reference point and may contain information as defined in Table 2. In another embodiment, an LGS may send request to an LGC for the LGC to perform an LG leader management operation.

Step 3b: The LGC receives and processes the request and returns a response to the LGS confirming that it received and processed the LG member addition or removal request. The response is issued via ILGC-LGS reference point and may contain information as defined in Table 2. When processing this request, an LGC can perform operations such as enabling or disabling location reporting from one or more ACs based on whether the LGC's device has been selected to function as the leader of the LG.

Step 4a: A first LGS may send a request to a second LGS to perform an LG leader management operation on an LG. For example, the second LGS may be functioning as the managing LGS of an LG and therefore may be better suited to perform an LG leader management operation on an LG. The request is issued via the ILGS-LGS reference point and may contain information as defined in Table 9.

Step 4b: The second LGS receives and processes the request and returns a response to the LGS confirming that it received and processed the LG leader management operation. The response is issued via ILGS-LGS reference point and may contain information as defined in Table 9.

Step 5a: An LGS may send a request to an AS to notify the AS that an LG leader management operation was performed. The request is issued via the ILGC-LGS reference point and may contain information as defined in Table 2.

Step 5b: The AS receives and processes the request and returns a response to the LGS confirming that it received and processed the notification. The response is issued via ILGS-AS reference point and may contain information as defined in Table 6. When processing this request, an AS can perform operations such as enabling or disabling location reporting from one or more ACs hosted on member devices based on whether the devices have been selected to function as the leader of the LG.

LGC Initiated LG Leader Management

An LGC may receive LG leader management operation requests from other LG-aware entities in the system. An LGC may also trigger an LG leader management operation itself. An LGC may support the capability to analyze context (defined in Table 12) that it locally collects and stores as well as receives from other LG-aware entities in the system. An LGC may compare this context against LG policies (defined in Table 13). Based on this comparison, an LGC may determine if/when an LG leader management operation is required. An LGC may then trigger the leader management operation.

Since an LGC may be privy to LG context information from various entities in the system (e.g., devices, ACs, LGSs, other LGCs, CN, LGMF), the LGC may support the capability to aggregate this information and determine when to trigger a leader management operation on an LG such as assign a device as leader or switch the leader of an LG to another member device. The decision to perform a leader management operation on an LG may be based on the context information that the LGC collects and processes from all these entities. Since an LGC may be privy to device and AC context information for the device on which the LGC is hosted, the LGC may support the capability to aggregate this information and to trigger an LG leader management operation.

Figure 29:
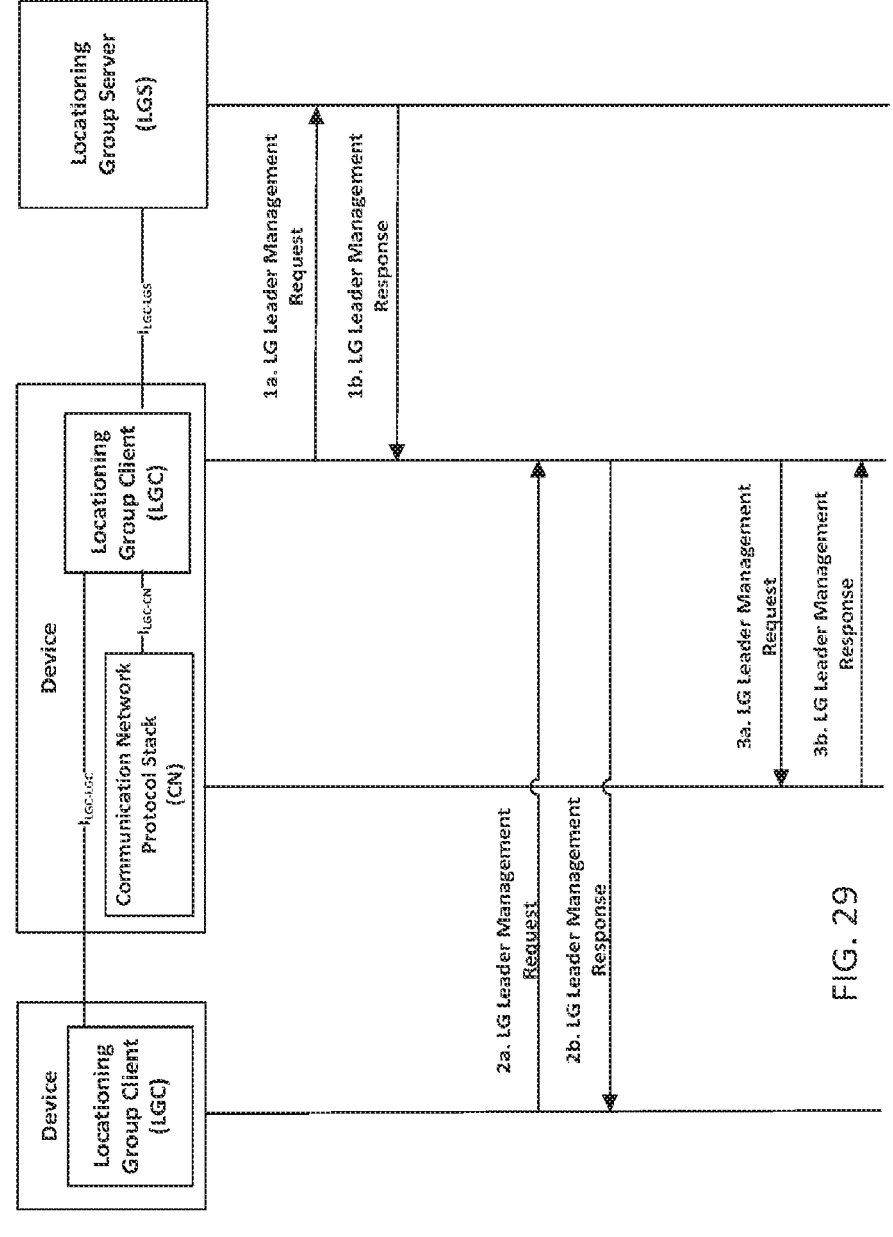
FIG. 29 shows an example of LGC Initiated LG Leader Management.

When performing an LG leader management operation, an LGC may coordinate with other entities in the system as illustrated in FIG. 29.

Step 1a: An LGC may send a request to an LGS to request the LGS to perform an LG leader management operation on behalf of the LGC. The determination of whether to issue the request to the LGS may be based on the LG policies configured at the LGC and/or whether the LGC has the capability to perform an LG leader management operation itself or not. The request is issued via the ILGC-LGS reference point and may contain information as defined in Table 2.

Step 1b: The LGS receives and processes the request and returns a response to the LGC confirming that it received and performed the request. The response is issued via the ILGC-LGS reference point and may contain information as defined in Table 2.

Step 2a: A first LGC may send a request to a second LGC to either collect information that can be used to make decisions on whether to perform an LG leader management operation or to request that the second LGC perform a leader management operation on behalf of the first LGC. For example, an LGC may request ranging information from each LGC hosted on devices in its proximity and that are members of an LG. Based on this ranging information, an LGC can determine whether the device it is hosted on is the most centrally located in the LG and therefore the best candidate to serve as leader of the LG. If it is not, the LGC can initiate a request to another LGC to request that it perform an LG leader management operation to become leader of the LG since it is the most centrally located device in the LG. The determination of whether to issue the request to other LGCs may be based on the LG policies configured at the first LGC and/or whether the first LGC has the capability to perform an LG leader management operation. The request is issued via the ILGC-LGC reference point and may contain information as defined in Table 3.

Step 2b: The second LGC receives and processes the request and returns a response to the first LGC confirming that it received and performed the request. The response is issued via the ILGC-LGC reference point and may contain information as defined in Table 3.

Step 3a: An LGC may send a request to a communication network protocol stack on the local device to collect location information for the local device and/or other devices in range/proximity to the local device. The requests are issued via the ILGC-CN reference point and may contain information as defined in Table 4. For example, the CN protocol stack may support functionality for determining the proximity/range of the device hosting the LGC with respect to one or more other devices hosting other LGCs. Based on this ranging information, the LGC can determine whether or not it should perform an LG leader management operation to request that its device be assigned the LG leader role or another member device (e.g., that is more centrally located in the LG based on the ranging information of all the member devices).

Step 3b: A CN protocol stack receives and processes the request and returns a response to the LGC containing device locationing or group related information. The response is issued via the ILGC-CN reference point and may contain information as defined in Table 4.

AC Initiated LG Leader Management

Figure 30:
FIG. 30 shows an example of AC Initiated LG Member Leader Management.

As illustrated in FIG. 30, an AC may issue an LG leader management request to an LGC hosted on the same device as the AC and receive an LG leader management response via the ILGC-AC reference point. The LG leader management operation performed by the AC may contain information as defined in Table 1.

Step 1: An AC may send a request to an LGC to perform a leader management operation for an LG. This LG request may contain LG leader management operation criteria defined by the AC and that take into account context information such as but not limited to the information defined in Table 12. The LGC may factor this information into the LG leader management operation it performs on behalf of the AC.

Step 2: The LGC processes the LG leader management request and returns the LG context information, as defined in Table 12, for the updated LG which meets the defined LG leader management criteria defined by the AC. When processing the LG leader management request, the LGC may forward the request to other LG-aware entities in the system (e.g., an LGS).

AS Initiated LG Leader Management

Figure 31:
FIG. 31 shows an example of AS Initiated LG Leader Management.

As illustrated in FIG. 31, an AS may issue an LG leader management request for an LGS and receive an LG leader management response via the ILGS-AS reference point. The LG leader management request and response performed may contain information as defined in Table 6.

Step 1: An AS may send a request to an LGS to perform a leader management operation on an LG. This LG request may contain LG leader management criteria defined by the AS and that take into account context information such as but not limited to the information defined in Table 12. The LGS may factor this information into the LG leader management operation it performs on behalf of the AS.

Step 2: The LGS processes the LG leader management request and returns the LG context information, as defined in Table 12, for the updated LG which it performed the leader management operation for. When processing the LG leader management request, the LGS may forward the request to other LG-aware entities in the system (e.g., an LGS).

CN Initiated LG Leader Management

A CN may trigger an LG leader management operation. A CN may support the capability to analyze CN and device context (defined in Table 12) that it locally collects and stores as well as receives from other LG-aware entities in the system. A CN may analyze this context and determine if/when an LG leader management operation is required. An CN may then trigger the leader management operation for the LG.

Figure 32:
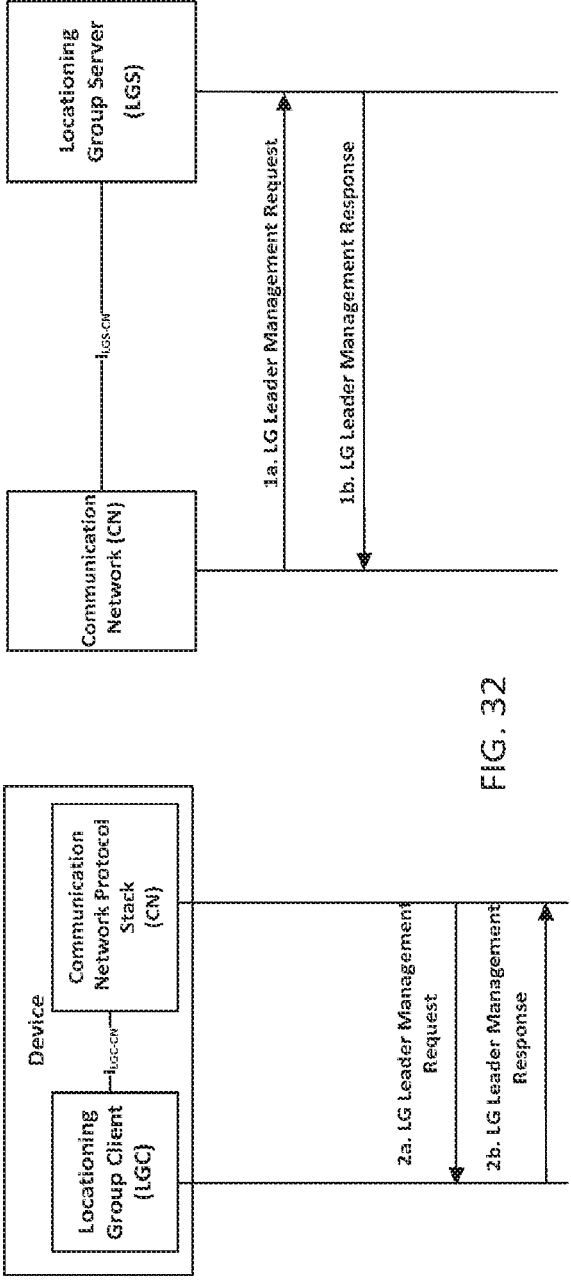
FIG. 32 shows an example of CN Initiated Leader Management.

When performing an LG leader management operation, a CN may coordinate with other entities in the system as illustrated in FIG. 32.

Step 1a: A CN may send a request to an LGS to perform a leader management operation on an LG. This LG leader management operation may contain LG leader management operation criteria defined by the CN and that take into account context information such as but not limited to the information defined in Table 12. The LGS may factor this information into the LG leader management operation it performs on behalf of the CN.

Step 1b: The LGS processes the LG leader management operation request and returns the LG context information, as defined in Table 12, for the updated LG upon which the leader management operation is performed. When processing the LG leader management operation request, the LGS may forward the request to other LG-aware entities in the system (e.g., an LGS).

Step 2a: A CN protocol stack may send a request to an LGC to perform a leader management operation for an LG. This LG request may contain LG leader management operation criteria defined by the CN protocol stack and that take into account context information such as but not limited to the information defined in Table 12. The LGC may factor this information into the LG leader management operation it performs on behalf of the CN protocol stack.

Step 2b: The LGC processes the LG leader management operation request and returns the LG context information, as defined in Table 12, for the updated LG which meets the defined LG member addition or removal criteria defined by the CN protocol stack. When processing the LG request, the LGC may forward the request to other LG-aware entities in the system (e.g., an LGS).

Locationing Group Reference Points

ILGC-AC Reference Point

Figure 33:
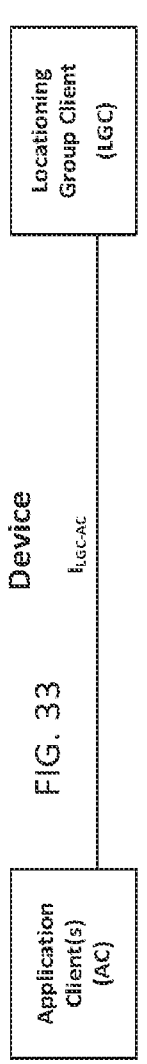
FIG. 33 shows an example of an ILGC-AC Reference Point.

As illustrated in FIG. 33, an LGC may support a reference point (ILGC-AC) to interface with ACs hosted on the device. Via ILGC-AC an LGC may support various types of LG operations between itself and the ACs such as but not limited to those described in Table 1.

TABLE 1

| $I_{LGC-AC}$ Operations | | |
|---|---|---|
| Operation | Description | Parameters |
| AC Registration Request | An AC may send this request to an LGC to perform a 1-way or 2-way authentication handshake with the LGC. An AC may also share AC and/or LG context information with the LGC during registration. Alternatively, the AC may skip the registration and simply rely on the operations defined in this table to interface with an LGC. | AC identifier (Table 10) AC credential as defined (Table 10) AC or LG context (Table 11) |
| AC Registration Response | An LGC may return this response to the AC to indicate whether the requested AC registration was completed successfully or not. | AC registration result AC LG policies (Table 12) LGC context (Table 11) |
| LG Context Request | A request to share LG context between an AC and LGC. | AC or LGC identifier (Table 10) AC or LG context (Table 11) |
| LG Context Response | A response that is returned to an LG context request. | Status indicator AC, LG or LGC context (Table 11) |
| LG Operation Request | A request that is sent to request that an LG operation be performed. For example, a request to join or leave an LG, or a request to become the leader of an LG. | AC or LGC identifier (Table 10) LG identifier (Table 10) LG operation to perform (Table 11) LG leader preferences (Table 11) LG context (Table 11) |
| LG Operation Response | A response returned to an LG operation request. | LG identifier (Table 10) LG operation result (Table 11) LG context (Table 11) |
| LG Subscription Request | A request to create or update an LG subscription. | LG subscription context (Table 11) |
| LG Subscription Response | A response that indicates whether the LG subscription was created or updated successfully or not. | LG Subscription Identifier (Table 10) Status indicator of whether the LG subscription was created or updated |
| LG Notification Request | A LG notification to initiate an LG operation or to share LG context. For example, an LG notification request to an AC to notify it that an LG operation has occurred. | LG Subscription Identifier (Table 10) LG operation(s) (Table 11) LG operation result (Table 11) |
| LG Notification | A response to indicate whether an LG notification was received and processed. For | Status indicator whether notification was received |

TABLE 1-continued

| $I_{LGC-AC}$ Operations | | |
|---|---|---|
| Operation | Description | Parameters |
| Response | example, LG operation was initiated, or LG context was successfully received. | and processed. |
| LG Subscription Delete Request | Request to delete an LG subscription such that LG notifications are no longer generated. | AC identifier (Table 10) LG Subscription Identifier (Table 10) |
| LG Subscription Delete Response | A response to indicate whether the LG subscription was deleted successfully or not. | Status indicator whether subscription was deleted |

15

ILGC-LGS Reference Point

Figure 34:
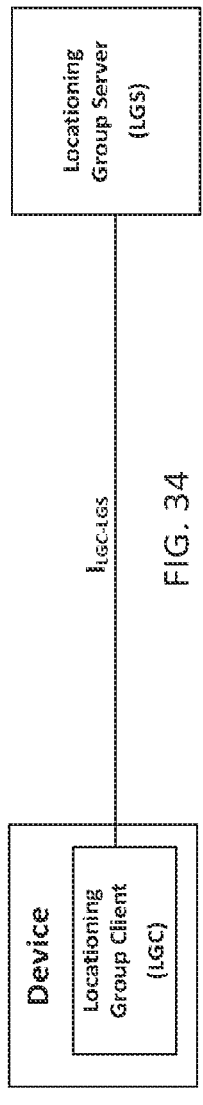
FIG. 34 shows an example of ILGC-LGS Functionality.

As illustrated in FIG. 34, an LGC may support a reference point (ILGC-LGS) to communicate with one or more LGSs in the system. Via ILGC-LGS an LGC may support various types of LG operations between itself and an LGS such as but not limited to those described in Table 2. For example, an LGC may support the capability to interface to an LGS to share information about ACs with the LGS such that the LGS can assist the LGC with performing LG operations on behalf of the ACs.

TABLE 2

| $I_{LGC-LGS}$ Operations | | |
|---|---|---|
| Operation | Description | Parameters |
| LGC Registration Request | An LGC may send this request to an LGS to perform a 1-way or 2-way authentication handshake with the LGS. An LGC may also share AC, LG and/or LGC context information with the LGS. Alternatively, the LGC may skip the registration and simply rely on the operations defined in this table to interface with an LGS. | LGC identifier (Table 10) LGC credential (Table 10) IDs of ACs associated with LGC (Table 10) AC, LG or LGC context (Table 11) |
| LGC Registration Response | An LGS may return this response to the LGC to indicate whether the requested LG registration was completed successfully or not. | LGC registration result LGC policies (Table 12) LGS context (Table 11) |
| LG Context Request | A request to exchange LG context between an LGS and LGC. LG context may be locally stored and/or factored into LG decisions and operations. For example, the LGS may factor this context into its determination of if/when to form or disband an LG or if/when to add or remove a device to an LG. | LGC or LGS identifier (Table 10) IDs of ACs associated with LGC (Table 10) AC, LG, LGC or LGS context (Table 11) |
| LG Context Response | Response is returned to indicate that reception of LG context information. | Status indicator AC, LG, LGC or LGS context (Table 11) |
| LG Discovery Request | A request exchanged between an LGC and LGS to perform an LG discovery operation. For example, a query to see if an LG exists that meets a specified set of criteria. | LGC or LGS identifier (Table 10) LG discovery criteria (Table 11) |
| LG Discovery Response | Response indicating LG discovery results. | Operation status LG operation result (Table 11) |
| LG Operation Request | A request to perform an LG operation. | LGC or LGS identifier (Table 10) LG identifier (Table 10) AC identifiers (Table 10) AC types (Table 10) AC context (Table 11) LG operation to perform (Table 11) LG leader preferences (Table 11) Criteria that must be met to perform LG operation (Table 11) |

TABLE 2-continued

| $I_{LGC\text{-}LGS}$ Operations | | |
|---|---|---|
| Operation | Description | Parameters |
| LG Operation Response | This response is retuned to indicate whether the requested LG operation was completed successfully or not. | LG identifier (Table 10) LG operation result (Table 11) LG context (Table 11) |
| LG Subscription Request | A request to subscribe to receive LG notifications if/when the LG criteria defined within the request have been met. The request includes LG notification criteria which define what conditions LG notifications are generated. | LGC or LGS identifier (Table 10) LG subscription context (Table 11) |
| LG Subscription Response | A response returned to indicate whether the LG subscription was created or updated successfully or not. | LG Subscription Identifier (Table 10) Status indicator of whether the LG subscription was created or updated |
| LG Notification Request | A request to notify LG subscription criteria have been met (e.g. an LG operation has been performed). | LG subscription identifier (Table 10) LG notification context (Table 11) |
| LG Notification Response | A response that is sent to indicate whether an LG notification was received and processed including any LG operations specified in the notification. | Status indicator whether notification was received and processed |
| LG Subscription Delete Request | A request to delete an LG subscription. | LGC or LGS identifier (Table 10) LG subscription identifier (Table 10) |
| LG Subscription Delete Response | A response to indicate whether the LG subscription was deleted successfully or not. | Status indicator whether subscription was deleted |

ILGC-LGC Reference Point

Figure 35:
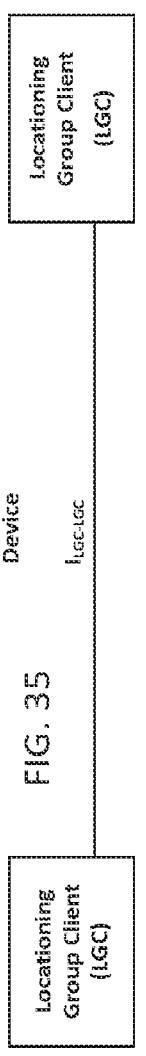
FIG. 35 shows an example of ILGC-LGC Functionality.

As illustrated in FIG. 35, an LGC may support a reference point (ILGC-LGC) to communicate with other LGCs in the system. Via ILGC-LGC an LGC may support various types of LG operations between itself and another LGC such as but not limited to those described in Table 3. For example, to discover other LGs within the system.

TABLE 3

| $I_{LGC\text{-}LGC}$ Operations | | |
|---|---|---|
| Operation | Description | Parameters |
| LGC Registration Request | A first LGC may send this request to a second LGC to perform a 1-way or 2-way authentication handshake with the second LGC. The first LGC may also share AC, LG and/or LGC context information with the second LGC. Alternatively, the first LGC may skip the registration and simply rely on the operations defined in this table to interface with another LGC. | LGC identifier (Table 10) LGC credential (Table 10) AC, LG, LGC context (Table 11) |
| LGC Registration Response | The second LGC may return this response to the first LGC to indicate whether the requested LGC registration was completed successfully or not. | LGC registration result (Table 10) AC, LG or LGC context (Table 11) |
| LG Context Request | A request exchanged between LGCs to share AC, LGC or LG context. | LGC identifier (Table 10) AC, LG, LGC context (Table 11) |
| LG Context Response | A response that is returned to indicate an LG context request was received and processed. | Status indicator AC, LG, LGC context (Table 11) |
| LG Discovery Request | A first LGC may send this request to a second LGC to explicitly request that the second LGC perform an LG discovery operation. For example, a query to see if an LG exists that meets a specified set of criteria. | LGC identifier (Table 10) LG discovery criteria (Table 11) |

TABLE 3-continued $I_{LGC\text{-}LGC}$ Operations

| Operation | Description | Parameters |
|---|---|---|
| LG Discovery Response | The second LGC returns this response to the first LGC to indicate the LG discovery results. | LG operation result (Table 11) |
| LG Operation Request | A first LGC may send this request to a second LGC to explicitly request that the second LGC perform an LG operation. | LGC identifier (Table 10) LG identifier (Table 10) AC identifiers (Table 10) AC types (Table 10) AC context (Table 11) LG operation to perform (Table 11) LG leader preferences (Table 11) Criteria that must be met to perform LG operation (Table 11) |
| LG Operation Response | The second LGC returns this response to the first LGC to indicate whether the requested LG operation was completed successfully or not. | LG identifier (Table 10) LG operation result (Table 11) LG context (Table 11) |
| LG Subscription Request | A first LGC sends this request to a second LGC to create or update an LGC subscription. An LGC subscription is used by a first LGC to subscribe to a second LGC to receive notifications from the second LGC. | LG subscription context (Table 11) |
| LG Subscription Response | The second LGC returns this response to the first LGC to indicate whether the LGC subscription was created or updated successfully or not. | LG Subscription Identifier (Table 10) Status indicator of whether the LG subscription was created or updated |
| LG Notification Request | An LGC may send LG notification request to another LGC to notify it that an LG operation has occurred, to trigger an LGC to perform an LG related operation or to share LG context information with another LGC. | LG Subscription Identifier (Table 10) LG notification context (Table 11) |
| LG Notification Response | An LGC that receives an LG notification sends this response to the LGC that initiated the LG notification to indicate whether it received and processed the LG notification. | Status indicator whether notification was received and processed by the LGC |
| LG Subscription Delete Request | A first LGC sends this request to delete an LG subscription from a second LGC such that it no longer receives LG notifications from the second LGC. | LGC identifier (Table 10) LG Subscription Identifier (Table 10) |
| LG Subscription Delete Response | The second LGC returns this response to the first LGC to indicate whether the LGC subscription was deleted successfully or not. | Status indicator whether subscription was deleted by the LGC |

ILGC-CN Reference Point

Figure 36:
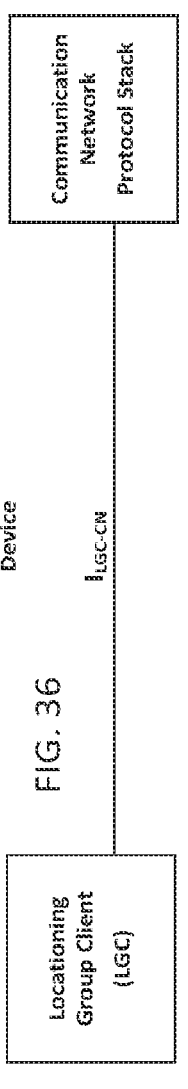
FIG. 36 shows an example of ILGC-CN Functionality.

As illustrated in FIG. 36, an LGC may support a reference point (ILGC-CN) to communicate with a communication network (e.g., 3GPP) protocol stack that is hosted on the same device as the LGC. Via ILGC-CN, an LGC may support initiating various types of LG operations as shown in Table 4 and exchanging LG centric information via the communication network protocol stack. The communication network protocol stack in turn connects the device hosting the LGC to a communication network such that the LGC can interface to LGSs, LGMFs and other LGCs in the system.

TABLE 4

$I_{LGC-CN}$ Operations

| Operation | Description | Parameters |
|---|---|---|
| Device Location Request | An LGC may issue this request to the Communication Network Protocol Stack to obtain location information for the local device hosting the LGC or for the location of other device(s) hosting other LGC(s). The LGC may specify the identifier(s) of location servers in the system that the Communication Network Protocol Stack is to contact to obtain this location. | device identifier (Table 10) location server identifier(s) (Table 10) |
| Device Location Response | A communication network protocol stack returns this response to an LGC containing location information that the communication network protocol stack receives from a location server in the communication network or from a local location sensor on the device (e.g. GPS) | Device LG context (Table 11) |
| CN Subscription Request | An LGC may issue this request to subscribe to the communication network protocol stack and receive notifications regarding location information (i.e. location reports) that the communication network protocol stack receives from the communication network or from a local location sensor (e.g. GPS). | Callback URI to receive location notifications Location criteria that define if/when an LGC is interested in receiving location notifications from the communication network protocol stack and the contents of these notifications: Device identifier(s) Range/distance threshold (e.g. range from peer devices) Geo boundary (e.g. polygon coordinates) A time duration that the device must remain in the same location A number of devices that must be in the same range as one another. |
| CN Subscription Response | A communication network protocol stack returns this response to the LGC to indicate whether the CN subscription was created or updated successfully or not. | Location subscription Identifier which can be used by the LGC to associate location notifications to this subscription as well as to perform future updates or delete this subscription. Status indicator of whether the location subscription was created or updated |
| CN Notification Request | A communication network protocol stack may issue this request to an LGC to notify it of location information that the communication network protocol stack receives from the communication network or from a local location sensor (e.g. GPS). | CN subscription identifier Device identifier(s) Device LG context (Table 11) Location event that has occurred Device has entered/ left specified geo-boundary of interest Device has crossed a specified range/ distance criterion |
| CN Notification Response | An LGC sends this response to the communication network protocol stack to indicate whether it received and processed the location notification. | Status indicator whether notification was received and processed by the LGC |
| Group Operation Request | An LGC may issue this request to the Communication Network Protocol Stack to perform a group management operation related to a group of devices in order to assist the LGC in managing an LG. The LGC may specify the identifier(s) of group management | Device identifiers Type of group operation: Discovery device groups Form a device group Disband a device group |

TABLE 4-continued $I_{LGC\text{-}CN}$ Operations

| Operation | Description | Parameters |
|---|---|---|
| | functions in the system that the Communication Network Protocol Stack is to contact to perform the group operation. | Join a device group Leave a device group |
| Group Operation Response | A Communication Network Protocol Stack returns this response to the LGC to indicate whether the LG operation was completed successfully or not. | Group identifier Group context information Number of members Member device identifiers |

ILGC-LGMF Reference Point

Figure 37:
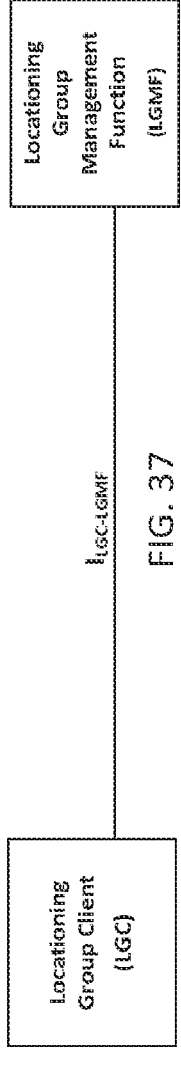
FIG. 37 shows an example of ILGC-LGMF Functionality.

As illustrated in FIG. 37, an LGC may support a reference point (ILGC-LGMF) to communicate with a Locationing Group Management Function (LGMF) in the system. An LGC may interface to an LGMF to be bootstrapped with configuration information and LGC policies that contain rules that an LGC uses to make LG management decisions. Via ILGC-LGMF an LGC may support various types of LG operations between itself and an LGMF such as but not limited to those described in Table 5.

TABLE 4

$I_{LGS\text{-}AS}$ Operations

| Operation | Description | Parameters |
|---|---|---|
| AS Registration Request | An AS may send this request to an LGS to perform a 1-way or 2-way authentication handshake with the LGS. An AS may also share AS and/or LG context information with the LGS. Alternatively, the AS may skip the registration and simply rely on the operations defined in this table to interface with an LGS. | AS identifier (Table 10) AS Credential (Table 10) AS or LG context (Table 11) |
| AC Registration Response | An LGS may return this response to the AS to indicate whether the requested AS registration was completed successfully or not. | AS registration result AS policies (Table 12) LGS context (Table 11) |
| Location Context Request | A request exchanged between and AS and LGS to share LG related context. | AS or LGS identifier (Table 10) AS, LG or LGS context (Table 11) |
| Location Context Response | A response returned to share or indicate location context information was received. | Status indicator AS, LG or LGS context (Table 11) |
| LG Operation Request | A request sent to performs an LG operation. | AS or LGS identifier (Table 10) AS type Device identifier(s) (Table 10) Device type(s) AC identifier(s) (Table 10) AC type(s) LGC identifier(s) (Table 10) LG identifier (Table 10) LG operation to perform (Table 11). LG leader preferences (Table 11) Criteria that must be met to perform LG operation as defined in (Table 11) |
| LG Operation Response | A response returned to indicate whether the LG operation was completed successfully or not. | LG operation result (Table 11) LG identifier (Table 10) |
| LG Subscription Request | A request to create or update an LG subscription. An LG subscription is used to subscribe to receive LG notifications if/when LG criteria have been met. | LG subscription context (Table 11) |
| LG Subscription | A response returned to indicate whether the LG subscription was created or updated | LG Subscription Identifier (Table 10) |

52

TABLE 4-continued

| $I_{LGS-AS}$ Operations | | |
| --- | --- | --- |
| Operation | Description | Parameters |
| Response | successfully or not. | Status indicator of whether the LG subscription was created or updated |
| LG Notification Request | A request to notify LG subscription criteria have been met e.g. an LG operation has been performed) or to request that the AS perform a specified LG operation. | LGS Subscription Identifier (Table 10) LG notification context (Table 11) |
| LG Notification Response | A response that is sent to indicate whether an LG notification was received and processed including any LG operations specified in the notification. | Status indicator whether notification was received and processed by the AS |
| LG Subscription Delete Request | A request to delete an LG subscription. | AS identifier (Table 10) LG Subscription Identifier (Table 10) |
| LG Subscription Delete Response | A response to indicate whether the LG subscription was deleted successfully or not. | Status indicator whether subscription was deleted |

ILGS-AS Reference Point

Figure 38:
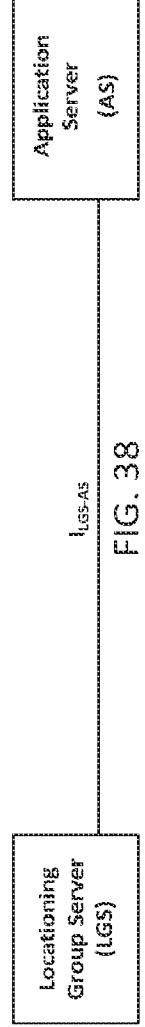
FIG. 38 shows an example of ILGS-AS Functionality.

As illustrated in FIG. 38, an LGS may support a reference point (ILGS-AS) to communicate with Application Servers (AS) in the system. Via ILGS-AS, an LGS may support various types of LG centric operations between itself and ASs such as but not limited to those proposed in Table 6.

TABLE 5

| $I_{LGS-CN}$ Operations | | |
| --- | --- | --- |
| Operation | Description | Parameters |
| Device Location Request | An LGS may issue this request to the Communication Network to obtain location information for one or more devices. The LGS may specify the identifier(s) of location servers in the system that the Communication Network Protocol Stack is to contact to obtain this location. | device identifier(s) (Table 10) location server identifier(s) (Table 10) |
| Device Location Response | A communication network may return this response to an LGS containing location information that the communication network receives from a location server in the communication network. | Device LG context (Table 11) |
| CN Subscription Request | An LGS may issue this request to subscribe to the communication network and receive notifications regarding location information (change in location reports) that the communication network receives from location server(s) | Callback URI to receive location notifications Location criteria that define if/when an LGS is interested in receiving location notifications from the communication network protocol stack and the contents of these notifications: Device identifier(s) Range/distance threshold (e.g. range from peer devices) Geo boundary (e.g. polygon coordinates) |
| CN Subscription Response | A communication network returns this response to the LGS to indicate whether the CN subscription was created or updated successfully or not. | Location subscription Identifier which can be used by the LGS to associate location notifications to this subscription as well as to perform future updates or delete this subscription. Status indicator of whether the location subscription was created or updated |
| CN Notification Request | A communication network may issue this request to an LGS to notify it of location information that the communication | CN subscription identifier Device identifier(s) (Table 10) |

TABLE 5-continued

| $I_{LGS\text{-}CN}$ Operations | | |
| --- | --- | --- |
| Operation | Description | Parameters |
| | network receives from location servers in the communication network. | Device LG context (Table 11) Location event that has occurred Device has entered/ left specified geo-boundary of interest Device has crossed a specified range/ distance criterion |
| CN Notification Response | An LGS sends this response to the communication network to indicate whether it received and processed the location notification. | Status indicator whether notification was received and processed by the LGS |
| Group Operation Request | An LGS may issue this request to the communication network to perform a group management operation related to a group of devices in order to assist the LGS in managing an LG. The LGS may specify the identifier(s) of group management functions in the system that the Communication Network is to contact to perform the group operation. | Device identifiers (Table 10) Type of group operation: Discovery device groups Form a device group Disband a device group Join a device group Leave a device group |
| Group Operation Response | A communication network returns this response to the LGS to indicate whether the LG operation was completed successfully or not. | Group identifier Group context information Number of members Member device identifiers |

ILGS-CN Reference Point

Figure 39:
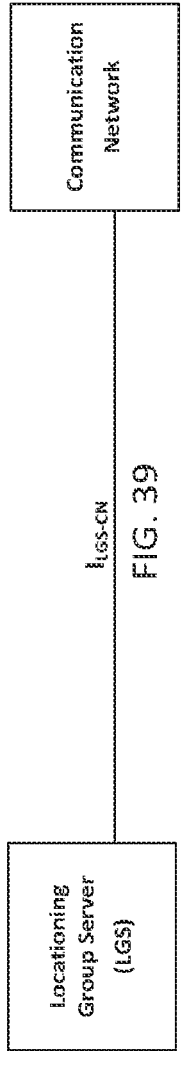
FIG. 39 shows an example of ILGS-CN Functionality.

As illustrated in FIG. 39, an LGS may support a reference point (ILGS-CN) to communicate with a Communication Network (e.g., 3GPP) and its respective functions (e.g., NEF). Via ILGS-CN an LGS may support initiating various types of LG centric operations such as but not limited to those proposed in Table 7 and exchanging LG centric information with a Communication Network. For example, an LGS may send a request to a 3GPP Network to have group together a set of devices in proximity to one another such that they can perform group-based locationing.

TABLE 6

| $I_{LGS\text{-}LGMF}$ Operations | | |
| --- | --- | --- |
| Operation | Description | Parameters |
| LGS Configuration Request | An LGS may issue this request to bootstrap itself with configuration information that that the LGMF provides and which the LGS requires to communicate with other entities in the system. | LGS identifier (Table 10) LGS credential (Table 10) LGS context (Table 11) Type(s) of requested LGS policies (Table 12) Preferred LGS policy settings (Table 12) |
| LGS Configuration Response | An LGMF returns this response to the LGS to indicate whether the configuration request was completed successfully or not. | Configuration status LGS identifier (Table 10) LGS credential (Table 10) LGC identifiers, credentials and/or addresses that are authorized to connect to the LGS (Table 10) LGS policies (Table 12) |
| LG Subscription Request | An LGS may send this request to an LGMF to create or update an LG subscription. This subscription is used by an LGS to subscribe to an LGMF and receive notifications if/when the LGMF determines that it needs | Callback URI to receive LGMF notifications LGMF criteria that define if/when an LGS is interested in receiving LGMF |

TABLE 6-continued

| | $I_{LGS\text{-}LGMF}$ Operations | |
|---|---|---|
| Operation | Description | Parameters |
| | to share LGMF centric information or status with the LGS. | notifications from LGMF and the contents of these notifications: Type of LGMF event: Change in availability status of an LGC another LGS, or another entity in the system such as a Location Server or Group Management Server. Change in LGS configuration settings Change in LGS policy settings |
| LG Subscription Response | An LGMF returns this response to the LGS to indicate whether the subscription was created or updated successfully or not. | LG subscription Identifier (Table 10) Status indicator of whether the LGMF subscription was created or updated |
| LG Notification Request | An LGMF may issue this request to an LGS to notify it of changes in LGS configuration settings or LGS policies. | LG subscription identifier (Table 10) LGS identifier (Table 10) Updated LGS Configuration settings Updated LGS policies (Table 12) |
| LG Notification Response | An LGS sends this response to the LGMF to indicate whether it received and processed the notification. | Status indicator whether notification was received and processed by the LGS |

ILGS-LGMF Reference Point

Figure 40:
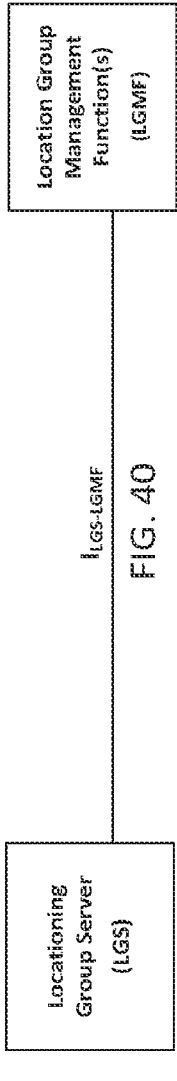
FIG. 40 shows an example of ILGS-LGMF Functionality.

As illustrated in FIG. 40, an LGS may support a reference point (ILGS-LGMF) to communicate with Locationing Group Management Functions (LGMF) in the system. LGMFs in the system may have responsibility for managing LGSs deployed in the system. For example, the installation/de-installation, activation/de-activation, configuration/re-configuration of LGSs hosted on cloud and edge nodes within the system. Via ILGS-LGMF, an LGS may support communicating with LGMFs to assist with the management of LGs and performing operations such as but not limited to those proposed in Table 8. For example, an LGS may support the capability to interface to an LGMF to be configured with LGS policies that contain rules that an LGS uses to manage LGs in the system.

TABLE 7

| | $I_{LGS\text{-}LGS}$ Operations | |
|---|---|---|
| Operation | Description | Parameters |
| LGS Registration Request | A first LGS may send this request to a second LGS to a perform 1-way or 2-way authentication handshake with the second LGS. The first LGS may also share AC and/or LG context information with the second LGS. Alternatively, the first LGS may skip the registration and simply rely on the operations defined in this table to interface with another LGS. | LGS identifier (Table 10) LGS credential (Table 10) AC or LG context (Table 11) LGS context (Table 11) |
| LGS Registration Response | The second LGS may return this response to the first LGS to indicate whether the requested LGS registration was completed successfully or not. | LGS registration result LGS context (Table 11) |
| LG Context Request | An LGS may send this request to a second LGS to share LG context. | LGS identifier (Table 10) AC, LG or LGS context (Table 11) |
| LG Context Response | The second LGS returns this response to the first LGS to indicate that it received the LG context information. | Status indicator |
| LG Discovery Request | A first LGS may send this request to a second LGS to explicitly request that the second LGS perform an LG discovery operation. For | LGS identifier (Table 10) LG discovery criteria |

TABLE 7-continued

| $I_{LGS\text{-}LGS}$ Operations | | |
|---|---|---|
| Operation | Description | Parameters |
| | example, a query to see if an LG exists that meets a specified set of criteria. | (Table 11) |
| LG Discovery Response | The second LGS returns this response to the first LGS to indicate the LG discovery results. | LG Operation result (Table 11) |
| LG Subscription Request | A first LGS sends this request to a second LGS to create or update an LGS subscription. An LG subscription is used by a first LGS to subscribe to a second LGS to receive notifications if/when the second LGS determines that it needs to share LG centric information or status. | LG subscription context (Table 11) |
| LG Subscription Response | The second LGS returns this response to the first LGS to indicate whether the LG subscription was created or updated successfully or not. | LG Subscription Identifier (Table 10) Status indicator of whether the LGS subscription was created or updated |
| LG Notification Request | An LGS may send LG notification request to another LGS to notify it that an LG operation has occurred, to trigger an LGS to perform an LG related operation or to share LG context information with another LGS. | LG notification context (Table 11) |
| LG Notification Response | An LGS that receives an LG notification sends this response to the LGS that initiated the LG notification to indicate whether it received and processed the LG notification. | Status indicator whether notification was received and processed by the LGS |
| LG Subscription Delete Request | A first LGS sends this request to delete an LG subscription from a second LGS such that it no longer receives LG notifications from the second LGS. | LGS identifier (Table 10) LG Subscription Identifier (Table 10) |
| LG Subscription Delete Response | The second LGS returns this response to the first LGS to indicate whether the LG subscription was deleted successfully or not. | Status indicator whether subscription was deleted by the LGS |

ILGS-LGS Reference Point

Figure 41:
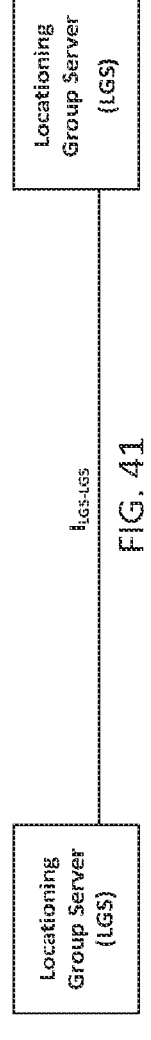
FIG. 41 shows an example of ILGS-LGS Functionality.

As illustrated in FIG. 41, an LGS may support a reference point (ILGS-LGS) to communicate with other LGSs in the system. Via ILGS-LGS an LGS may support initiating various types of LG centric operations to another LGS such as but not limited to those proposed in Table 9. For example, to discover LGs within the system.

TABLE 8

| $I_{LGS\text{-}LS}$ Operations | | |
|---|---|---|
| Operation | Description | Parameters |
| LG Context Request | An LGS and a 3rd Party Location or Group Management Server may exchange this request to share or request LG context with one another. | LS, LGS identifier (Table 10) AC, LG, LGS context (Table 11) |
| LG Context Response | This response is returned indicate that LG context information was received or to share LG context. | Status indicator AC, LG, LGS context (Table 11) |
| LG Discovery Request | A request exchanged to perform an LG discovery operation. For example, a query to see if an LG exists that meets a specified set of criteria. | LS, LGS identifier (Table 10) LG discovery criteria (Table 11) |
| LG Discovery Response | Response indicating LG discovery results. | Operation result (Table 11) |
| LG Subscription Request | A request to subscribe to receive LG notifications if/when the LG criteria defined within the request have been met. The request includes LG notification criteria which define what conditions LG notifications are generated. | LG subscription context (Table 11) |
| LG Subscription Response | A response returned to indicate whether the LG subscription was created or updated successfully or not. | LG Subscription Identifier (Table 10) Status indicator of whether the LGS |

TABLE 8-continued

| $I_{LGS-LS}$ Operations | | |
|---|---|---|
| Operation | Description | Parameters |
| | | subscription was created or updated |
| LG Notification Request | A request to notify LG subscription criteria have been met (e.g. an LG operation has been performed). | LG notification context (Table 11) |
| LG Notification Response | A response that is sent to indicate whether an LG notification was received and processed including any LG operations specified in the notification. | Status indicator whether notification was received and processed |
| LG Subscription Delete Request | A request to delete an LG subscription. | LGS identifier (Table 10) LG Subscription Identifier (Table 10) |
| LG Subscription Delete Response | A response to indicate whether the LG subscription was deleted successfully or not. | Status indicator whether subscription was deleted |

ILGS-LS Reference Point

Figure 42:
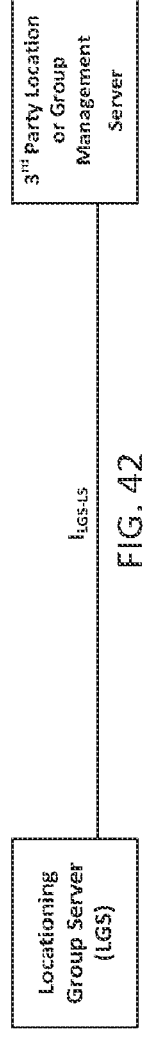
FIG. 42 shows an example of ILGS-LS Functionality.

As illustrated in FIG. 42, an LGS may support a reference point (ILGS-LS) to communicate with Location Servers and/or Group Management Servers in the system. Via ILGS-LS an LGS may support initiating various types of LG centric operations such as but not limited to those proposed in Table 10. For example, to discover LGs within the system.

Locationing Group Metadata

LG-aware entities in the system (e.g., LGC, LGS, LGMF, AC, AS, CN, 3rd party location and group management servers) may share various types of LG metadata with one another over the LG reference points described herein. This may include LG identifiers, credentials, context and policies.

TABLE 9

| LG Identifiers and Credentials | |
|---|---|
| Metadata | Description |
| LG Identifier | A unique identifier of a Locationing Group |
| LG subscription identifier | A unique identifier of an LG subscription that a subscriber can use to update or delete the subscription as well as associate LG notifications that are received from another LG-aware entity. |
| LGC Identifier | A unique identifier that is pre-provisioned or bootstrapped to an LGC to enable the LGC to be uniquely identified in the system. |
| LGC Credential | A credential used by an LGC to authenticate with an AC, LGMF, LGS or another LGC. |
| LGS Identifier | A unique identifier that is pre-provisioned or bootstrapped to an LGS to enable the LGS to be uniquely identified in the system. |
| LGS Credential | A credential used by an LGS to authenticate with an AS, LGMF, LGC or another LGS. |
| LGMF Identifier | A unique identifier that is pre-provisioned or bootstrapped to an LGMF to enable the LGMF to be uniquely identified in the system. |
| LGMF Credential | A credential used by an LGMF to authenticate with an LGS, LGC or another LGMF. |
| Device Identifier | A unique identifier that is pre-provisioned or bootstrapped to a device to enable the device to be uniquely identified in the system. |
| Device Credential | A credential used by a device to authenticate with other entities in the system. |
| AC Identifier | A unique identifier that is pre-provisioned or bootstrapped to an AC to enable the AC to be uniquely identified in the system. |
| AC Credential | A credential used by an AC to authenticate with an LGC. |
| AS Identifier | A unique identifier that is pre-provisioned or bootstrapped to an AS to enable the AS to be uniquely identified in the system. |
| AS Credential | A credential used by an AS to authenticate with an LGS. |
| Location Server Identifier | A unique identifier of a location server in the system. |
| Group Management Server Identifier | A unique identifier of a group management server in the system. |

Locationing Group Identifiers and Credentials

TABLE 10

LG Context

| Metadata | Description |
| --- | --- |
| LG context | Information that is associated with an existing LG or an LG that is a candidate for formation. Information may include but is not limited to the following:<br>LG state or status<br>LG member device identifiers<br>LG identifier<br>General location of the LG (e.g. building, train, bus)<br>Precise locations of individual member devices<br>Past, current or planned/predicted locations or routes of member devices<br>Range info for each LG member device (e.g. proximal distances between member devices)<br>Information regarding the lead device in an LG and whose location represents the location of the LG. The information may include but is not limited to identity, location, range, device status (e.g. battery level), willingness to be leader, how frequently the lead device is able to report its location, and with what precision the lead device is able to report its location<br>Rate of how often location is reported for the LG. Multiple value may be included, for example one value that is used by the leader and another value that is used by members who are not the leader.<br>AC instances or types of ACs hosted on member devices<br>AS instance or type of AS responsible for initiating the formation of the LG<br>Authorization rules defining the LG operations that can be performed by LG-aware entities on the LG<br>max/min numbers of LG members<br>Allowed locations/routes of the LG<br>LG lifetime information such as LG creation time, expiration time, time last updated<br>LG history information such as operations performed on the LG, locations of the LG, members that have joined or left the LG, change in LG leadership, locations/ranges/routes of individual member devices in LG |
| LG Operation types | The different types of operations performed on LGs such as but not limited to the following:<br>Discover LGs<br>Form an LG<br>Disband an LG<br>Disband an LG<br>Join an LG (i.e. add a member)<br>Leave an LG (i.e. remove a member)<br>Leader management (i.e. assign/re-assign LG leader) |
| LG operation result | Result of an LG operation that is performed. The result may include but is not limited to a status indicating whether the LG operation was performed successfully or not, a list of discovered LGs, and context information of the applicable LG(s). |
| LG discovery criteria | Criteria used to query and find LGs of interest that may include but is not limited to any of the LG context information defined in this paper |
| LG subscription context | Context information for an LG subscription that may include but is not limited to a callback URI to receive LG notifications, criteria for receiving LG notifications such any conditions based on LG context information (e.g. number of LG members in a group exceeds a specified threshold), or an event based on an LG operation that is performed (e.g. LG formed or disbanded, LG member added or removed, change in LG leader, change in location of LG, etc.). |
| LG notification context | May contain LG context, a list of results of one or more LG operations that were performed or a list of one or more LG operations for the recipient of the LG notification to perform. |
| AC context | Information that is determined by or tracked by an AC and that has relevance to an existing LG or that has relevance to performing an LG operation by an LG-aware entity. The information may include but is not limited to:<br>current location or route of the device hosting the AC<br>historical location or route of the device hosting the AC<br>planned/anticipated location or route of the device hosting the AC<br>required location reporting rate of the AC<br>required location reporting latency of the AC<br>required location reporting precision of the AC<br>duration of time an LG is required by the AC<br>AC determined criteria that must be met to perform an LG operation:<br>Schedule of when to perform LG operation |

TABLE 10-continued

LG Context

| Metadata | Description |
|---|---|
| | Location that device must be in to perform operation |
| | Max range/distance from peer devices to perform LG operation |
| | Min number of peer devices to perform LG operation |
| | Type(s) of peer devices or ACs on peer devices required to perform LG operation |
| | Preferences for becoming the leader of an LG such as leader role required, leader role preferred, leader role not preferred, unable to perform leader role |
| AS context | Information that is determined by or tracked by an AS having relevance to an existing LG or that has relevance to performing an LG operation by an LG-aware entity. The information may include but is not limited to: |
| | identifiers of devices the AS is interesting in tracking the location of, |
| | locationing or routing history of an AS or the devices the AS is tracking, |
| | planned/anticipated locations or routes of devices that the AS is tracking |
| | required location reporting rate of the devices that the AS is interesting in tracking |
| | required location reporting latency of the devices that the AS is interesting in tracking |
| | required location reporting precision of the devices that the AS is interesting in tracking |
| | AS determined criteria that must be met to perform an LG operation: |
| | Schedule of when to perform LG operation |
| | Location that device must be in to perform operation |
| | Max range/distance from peer devices to perform LG operation |
| | Min number of peer devices to perform LG operation |
| | Type(s) of peer devices or ACs on peer devices required to perform LG operation |
| | Preferences for leader of an LG such as leader role required, leader role preferred, leader role not preferred, unable to perform leader role |
| LGC context | Information that is determined by or tracked by an LGC that may include but is not limited to: |
| | the types of LG operations supported by the LGC, |
| | the availability schedule of the LGC, |
| | history regarding the LG operations performed by the LGC |
| | ACs registered to the LGC |
| | LGC policies |
| LGS Context | Information that is determined by or tracked by an LGS that may include but is not limited to: |
| | the types of LG operations supported by the LGS, |
| | the availability schedule of the LGS, |
| | history regarding the LG operations performed by the LGS |
| | LGCs registered to the LGS |
| | LGS policies |
| Device LG context | Device information having relevance to an existing LG or that has relevance to performing an LG operation by an LG-aware entity. The information may include but is not limited to: |
| | Geo-location of device |
| | Network location of device (e.g. cell ID) |
| | Relative location of device with respect to another device |
| | Preferences for becoming the leader of an LG such as leader role required, leader role preferred, leader role not preferred, unable to perform leader role |
| Communication Network LG context | Communication network information having relevance to an existing LG or that has relevance to performing an LG operation by an LG-aware entity. The information may include but is not limited to: |
| | Device location information that is tracked and reported |
| | Information concerning groups of devices (e.g. member devices, location of group) |
| | the status of a communication network (e.g. congestion levels) which can be used to trigger LG operations (e.g. the formation of LGs to remedy congestion issues in the communication network |

Locationing Group Context

TABLE 11

LG Policies

| Rule | Description |
| --- | --- |
| Permitted LG operations | Defines a list of one or more operations that an LG-aware entity may perform if/when all the criteria defined for this specific LG policy rule have been met. The types of LG operation may include but are not limited to the following:<br>Discover LGs<br>Form a new LG<br>Disband an existing LG<br>Add member device(s) to an existing LG<br>Remove member device(s) from an existing LG<br>Assign a device as a leader of an LG such that the location of this device is used to represent the location of all devices in the LG<br>Switch the leader of an LG from one device to another device |

LG Operation Criteria

| Rule | Description |
| --- | --- |
| Applicable LG entities | Defines a list of one or more applicable LG-aware entities that can initiate the LG operation. |
| Applicable devices | Defines a list of one or more device instances, device types, devices having required capabilities (e.g. devices supporting a specified feature), devices with certain status (e.g. devices with battery level exceeding a defined threshold) that the LG operation may be performed upon |
| Applicable ACs | Defines a list of one or more AC instances or AC types that must be hosted on a device in order for LG operation to be performed on the device |
| Applicable users | Defines a list of one or more users of an AC or types of users of an AC that must be using a device in order for LG operation to be performed on the device |
| Applicable locations | Defines a list of one or more locations (e.g. geographical or network regions, zones, domains etc.) that a device must reside in for the LG operation to be performed on the device. Furthermore, the policy indicates what happens when the device enters or leaves the applicable location.<br>For example, the policy may indicate that the LGC on the device should deregister from the LG when it is not in the applicable location for a certain length of time, or the policy may indicate that the LGC will be implicitly removed from the LG by the LGS if the LGC is found to be outside of the applicable location for a certain length of time |
| Applicable LG device routes | Defines a list of one or more applicable routes (e.g. vehicles traveling on certain roadways) that device must be on for the LG operation to be performed |
| Min devices | Defines a minimum threshold number of devices that must meet the all the criteria defined by this rule in order for the LG operation to be performed. |
| Max devices | Defines a maximum threshold number of devices that the LG operation can be performed upon. |
| Max range | Defines a maximum range (e.g. distance) between devices that must not be exceeded for the LG operation to be performed on the devices. The policy may further define the LGC's actions when the LGC is found to be outside of the maximum range. For example, the LGC may be configured to notify the LGS so that the LGS should decide what actions to take into account for the Max Range violation (i.e. which device to remove form the group). Alternatively, the LGC may be authorized to notify the LGS that it is leaving the LG or to command the other LGC that it should leave the LG. |
| Max Speed | Defines a maximum speed for the LGC in order for the LGC to be able to join and stay in the LG. The policy may indicate that the device should deregister from the LG when its speed is above the Max Speed, or the policy may indicate that the LGC will be implicitly removed from the LG by the LGS if the LGC is found to be above the Mas Speed for a certain length of time. |
| Min Speed | Defines a minimum speed for the LGC in order for the LGC to be able to join and stay in the LG. The policy may indicate that the device should deregister from the LG when its speed is below the Min Speed, or the policy may indicate that the LGC will be implicitly removed from the LG by the LGS if the LGC is found to be below the Min Speed for a certain length of time. |
| LG leader selection criteria | Defines LG leader selection criteria applicable when the LG operation is to select/re-select an LG leader. LG leader selection criteria may include but are not limited to the following:<br>Required set of capabilities of a device to become a leader<br>Presence of a particular type of AC that must be on a device for it to become leader<br>Required location and/or range of device with respect to other devices in the LG for it to become leader and/or maintain leader role<br>Consent from device, AC or user for device to be assigned leader<br>Device settings or context (e.g. battery level) for device to be assigned leader<br>Accessibility (network, security, etc.) of device to other member devices in the group |

TABLE 11-continued

| LG Policies | |
| --- | --- |
| Rule | Description |
| LG schedules | Defines time windows when the LG operations can be performed. LG Schedules may also indicate when group members can communicate with each other directly or via the network. |

Locationing Group Policies

LG policies may apply to any LG-aware entities in the system (e.g., LGCs, LGSs, ACs, ASs, LGMFs, etc.) and are used to control the initiation or execution of LG operations by LG-aware entities. See Table 13—LG Policies.

TABLE 12

| 3GPP SA6 SEAL Reference Point Applicability | |
| --- | --- |
| Reference Point | SA6 SEAL Reference Points |
| $I_{LGC\text{-}AC}$ | LM-C, GM-C |
| $I_{LGC\text{-}LGS}$ | LM-UU, GM-UU |
| $I_{LGC\text{-}LGC}$ | LM-PC5, GM-PC5 |
| $I_{LGC\text{-}CN}$ | Possible new reference point |
| $I_{LGC\text{-}LGMF}$ | LM-UU, GM-UU |
| $I_{LGS\text{-}AS}$ | LM-S, GM-S |
| $I_{LGS\text{-}CN}$ | T8 |
| $I_{LGS\text{-}LGMF}$ | Possible new reference point |
| $I_{LGS\text{-}LGS}$ | Possible new reference point |
| $I_{LGS\text{-}LS}$ | Possible new reference point |

EMBODIMENTS

The Locationing Group (LG) ideas defined herein may be applicable to several service layer technologies such as but not limited to 3GPP SA6 (e.g., 3GPP TS 23.286 v16.4.0; 3GPP TR 23.764, v17.0; 3GPP TS 23.558, v1.1.0; and 3GPP TS 23.434 V16.5.0), oneM2M (e.g. oneM2M TS-0026, v4.2.0), and LWM2M (e.g., OMA LWM2M, v1.1). According to some aspects, a service layer may include a service supporting capabilities through a set of Application Programming Interfaces (APIs). The service may be provided as a middleware for IoT services, the middleware service may be a layer located on top of network protocol stacks, and/or the service layer may be defined according to ETSI/oneM2M standards.

3GPP SA6 SEAL Embodiment

Figure 43:
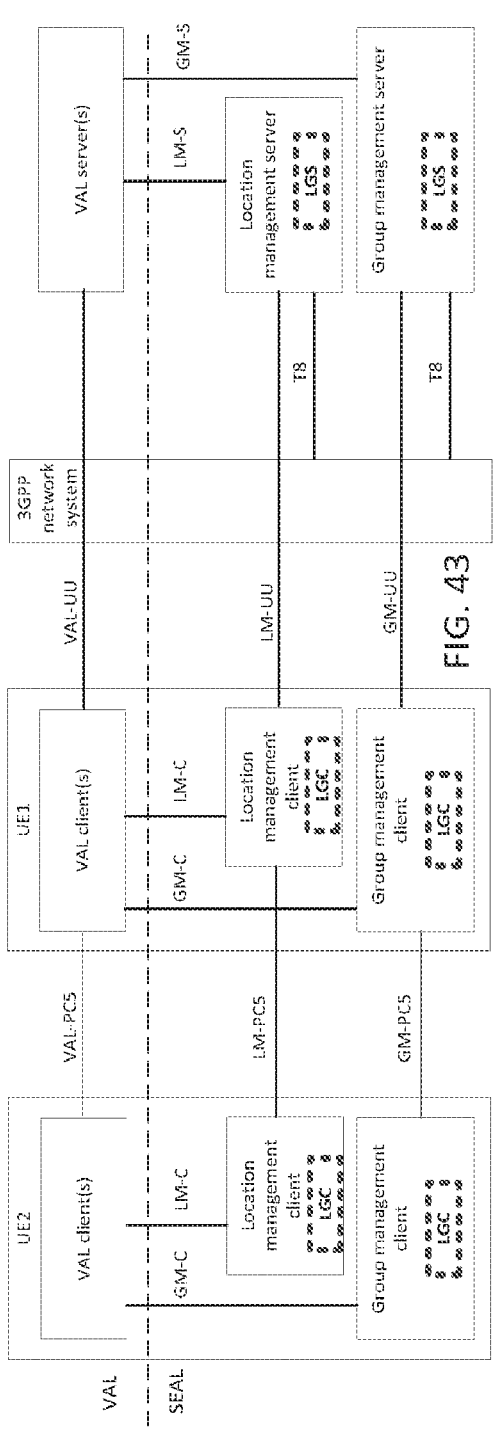
FIG. 43 shows an example of a 3GPP SA6 SEAL Embodiment.

FIG. 43 illustrates an embodiment of how the functionality defined herein may be realized in the 3GPP SA6 defined Service Enabler Architecture Layer for Verticals (SEAL) (e.g., 3GPP TS 23.434 V16.5.0).

The defined LGC functionality may be realized as new functionality within the existing Location Management Client or Group Management Client. Alternatively, the LGC may be realized as a new standalone function of a UE (not illustrated in FIG. 43). In this case, new reference points may be defined to support interaction with the new standalone LGC.

The defined LGS functionality may be realized as new functionality of a Location Management Server or Group Management Server. Alternatively, the LGS may be realized as a new standalone function within the system (not illustrated in FIG. 43). New reference points may also be defined to support interaction between a new standalone the LGS and an EAS, Location Management Server, Group Management Server, a UE and/or a 3GPP Core Network.

Table 14 provides an embodiment of how the reference points of the SA6 SEAL architecture could be aligned and enhanced with the functionality defined for each of the respective reference points defined herein.

TABLE 13

| 3GPP SA6 EDGEAPP Reference Point Applicability | |
| --- | --- |
| Reference Point | SA6 EDGEAPP Reference Points |
| $I_{LGC\text{-}AC}$ | EDGE-5, EDGE-14(new) |
| $I_{LGC\text{-}LGS}$ | EDGE-1, EDGE-13(new) |
| $I_{LGC\text{-}LGC}$ | Possible new reference point |
| $I_{LGC\text{-}CN}$ | EDGE-16 (new) |
| $I_{LGC\text{-}LGMF}$ | EDGE-4 |
| $I_{LGS\text{-}AS}$ | EDGE-3, EDGE-10(new) |
| $I_{LGS\text{-}CN}$ | EDGE-2, EDGE-12(new) |
| $I_{LGS\text{-}LGMF}$ | EDGE-6 |
| $I_{LGS\text{-}LGS}$ | EDGE-9 |
| $I_{LGS\text{-}LS}$ | Possible new reference point |

3GPP SA6 EDGEAPP Embodiment

Figure 44:
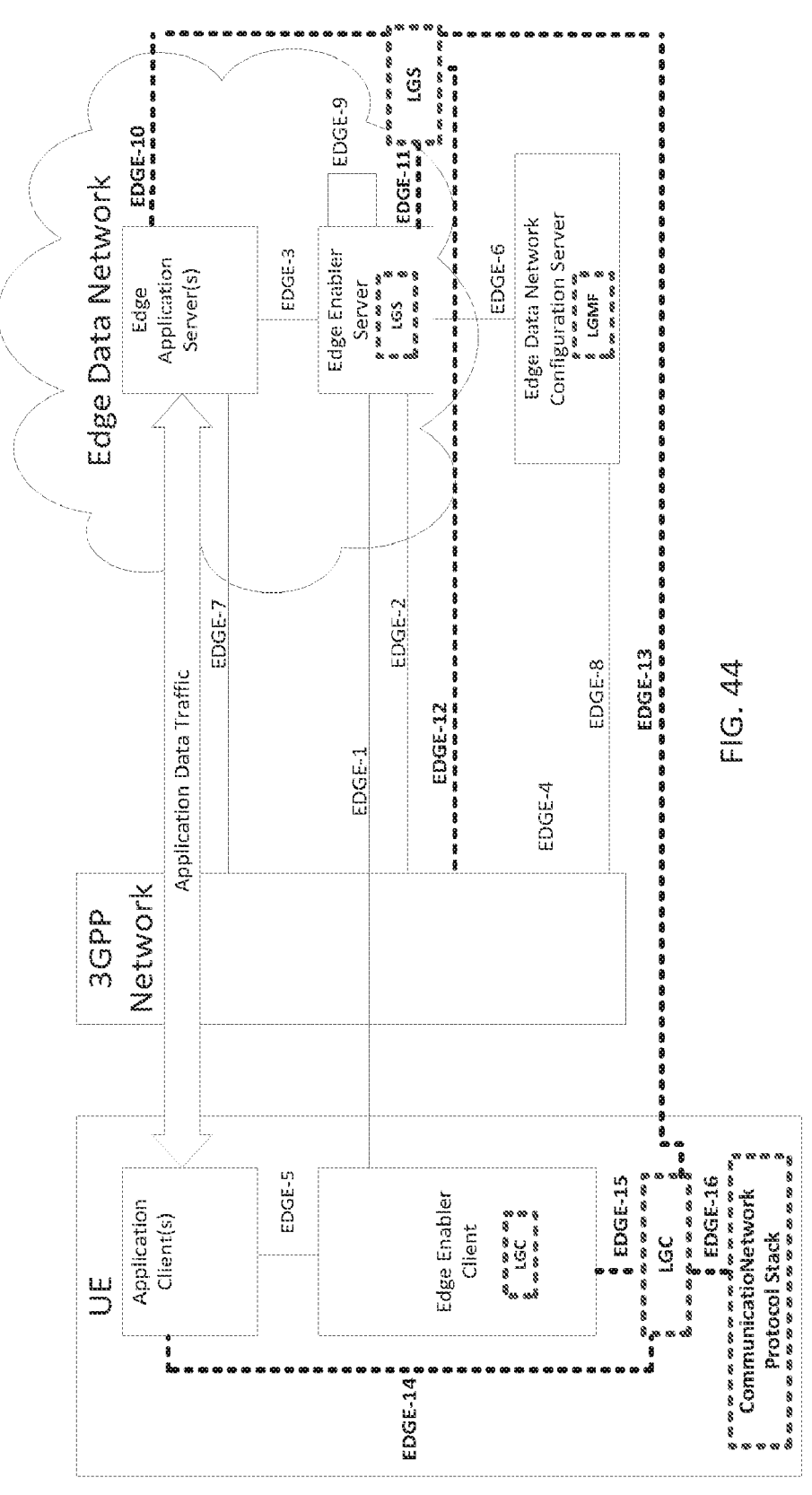
FIG. 44 shows an example of a 3GPP SA6 EDGEAPP Embodiment.

FIG. 44 illustrates an embodiment of how the functionality defined herein may be realized in the 3GPP SA6 defined architecture for enabling edge applications (e.g., 3GPP TS 23.558, v1.1.0).

The defined LGC functionality may be realized as new functionality within the existing Edge Enabler Client function. Alternatively, the LGC may be realized as a new standalone function of a UE. In this case, new reference points (e.g., Edge-13 and Edge-14) may be defined to support interaction with the new standalone LGC.

The defined LGS functionality may be realized as new functionality of an Edge Enabler Server or Edge Data Network Configuration Server functions. Alternatively, the LGS may be realized as a new standalone function within the system. This new standalone function may be deployed in the cloud or at the edge of the network. New reference points may also be defined to support interaction between a new standalone the LGS and an EAS, Edge Enabler Server, Edge Data Network Configuration Server, a UE and/or a 3GPP Core Network.

Table 15 provides an embodiment of how the reference points of the SA6 EDGEAPP architecture could be aligned and enhanced with the functionality defined for each of the respective reference points defined herein.

TABLE 14

| 3GPP SA6 V2X Reference Point Applicability | |
| --- | --- |
| Reference Point | SA6 V2X Reference Points |
| $I_{LGC\text{-}AC}$ | Vc, SEAL-C |
| $I_{LGC\text{-}LGS}$ | V1-AE, SEAL-UU |
| $I_{LGC\text{-}LGC}$ | V5-AE, SEAL-PC5 |
| $I_{LGC\text{-}CN}$ | V6-LGC (New) |
| $I_{LGC\text{-}LGMF}$ | Possible new reference point |

TABLE 14-continued

| 3GPP SA6 V2X Reference Point Applicability | |
|---|---|
| Reference Point | SA6 V2X Reference Points |
| $I_{LGS\text{-}AS}$ | Vs |
| $I_{LGS\text{-}CN}$ | T8, V2, Rx, xMB-C, xMB-U, MB2-C, MB2-U |
| $I_{LGS\text{-}LGMF}$ | Possible new reference point |
| $I_{LGS\text{-}LGS}$ | VAE-E |
| $I_{LGS\text{-}LS}$ | Possible new reference point |

3GPP SA6 V2X Embodiment

Figure 45:
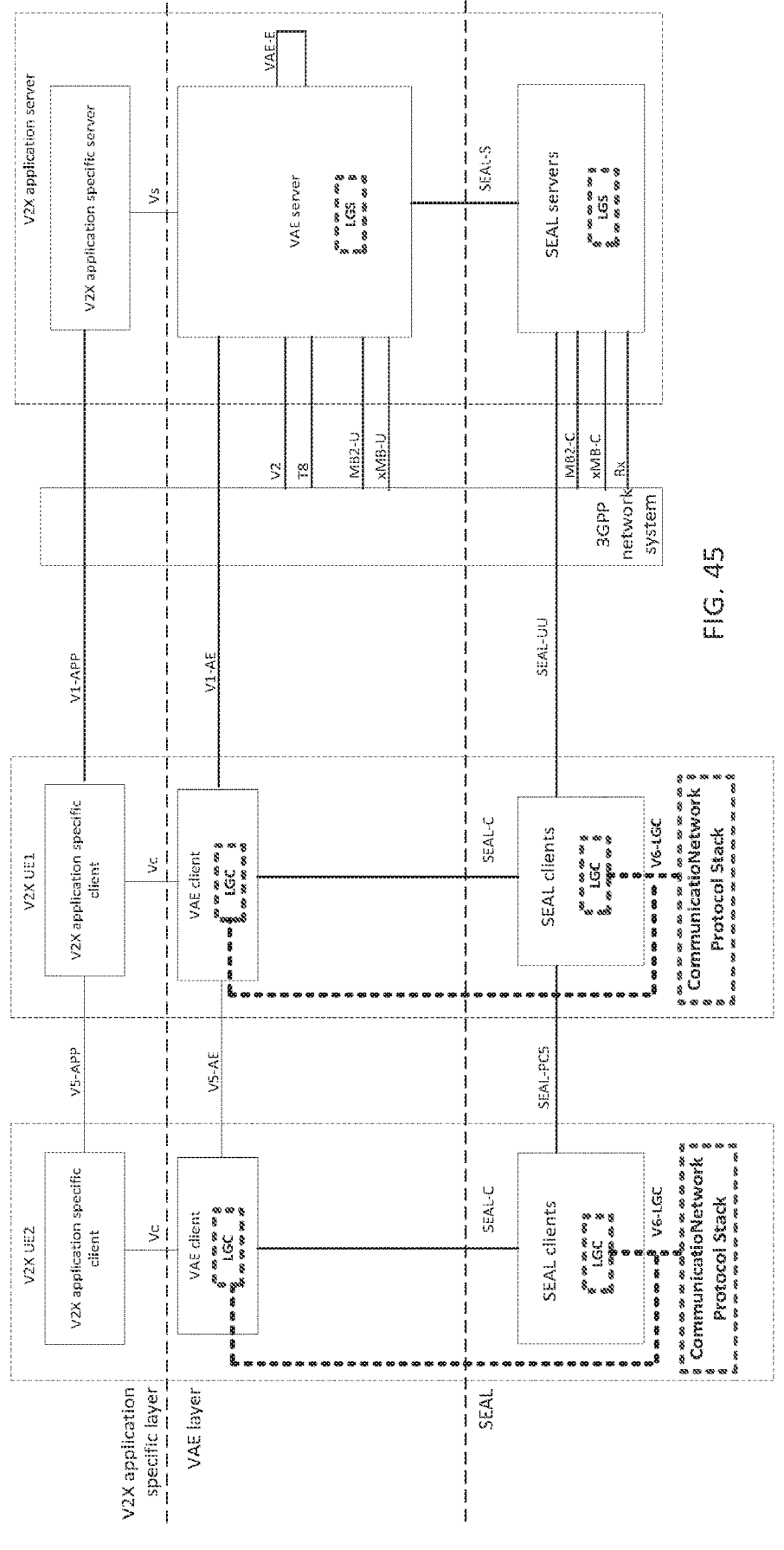
FIG. 45 shows an example of a 3GPP SA6 V2X Embodiment.

FIG. 45 illustrates an embodiment of how the functionality defined herein may be realized in the 3GPP SA6 V2X Architecture (e.g., 3GPP TS 23.286 v16.4.0 and 3GPP TR 23.764, v17.0.0).

The defined LGC functionality may be realized as new functionality added to the existing VAE Client and/or SEAL Client functions hosted on a UE. Alternatively, the LGC may be realized as a new standalone function of a UE (not illustrated in FIG. 45). In this case, new reference points may be defined to support interaction with the new standalone LGC.

The defined LGS functionality may be realized as new functionality added to the existing V2X Application Enabler (VAE) Server. Alternatively, the LGS may be realized as a new standalone function within the system (not illustrated in FIG. 45). This new standalone function may be deployed in the cloud or at the edge of the network. In this case, new reference points may be defined to support interaction with the new standalone LGS.

Table 16 provides an embodiment of how the reference points of the SA6 V2X architecture could be aligned and enhanced with the functionality defined for each of the respective reference points herein.

TABLE 15

| 3GPP SA6 Mission Critical Reference Point Applicability | |
|---|---|
| Reference Point | SA6 Mission Critical Reference Points |
| $I_{LGC\text{-}AC}$ | Possible new reference point |
| $I_{LGC\text{-}LGS}$ | CSC-2, CSC-14 |
| $I_{LGC\text{-}LGC}$ | Possible new reference point |
| $I_{LGC\text{-}CN}$ | Possible new reference point |
| $I_{LGC\text{-}LGMF}$ | CSC-4, Possible new reference point |
| $I_{LGS\text{-}AS}$ | CSC-3 |
| $I_{LGS\text{-}CN}$ | Possible new reference point |
| $I_{LGS\text{-}LGMF}$ | Possible new reference point |
| $I_{LGS\text{-}LGS}$ | Possible new reference point |
| $I_{LGS\text{-}LS}$ | CSC-2/3/5/7/14/15/16/19/23 |

3GPP SA6 Mission Critical Embodiment

Figure 46:
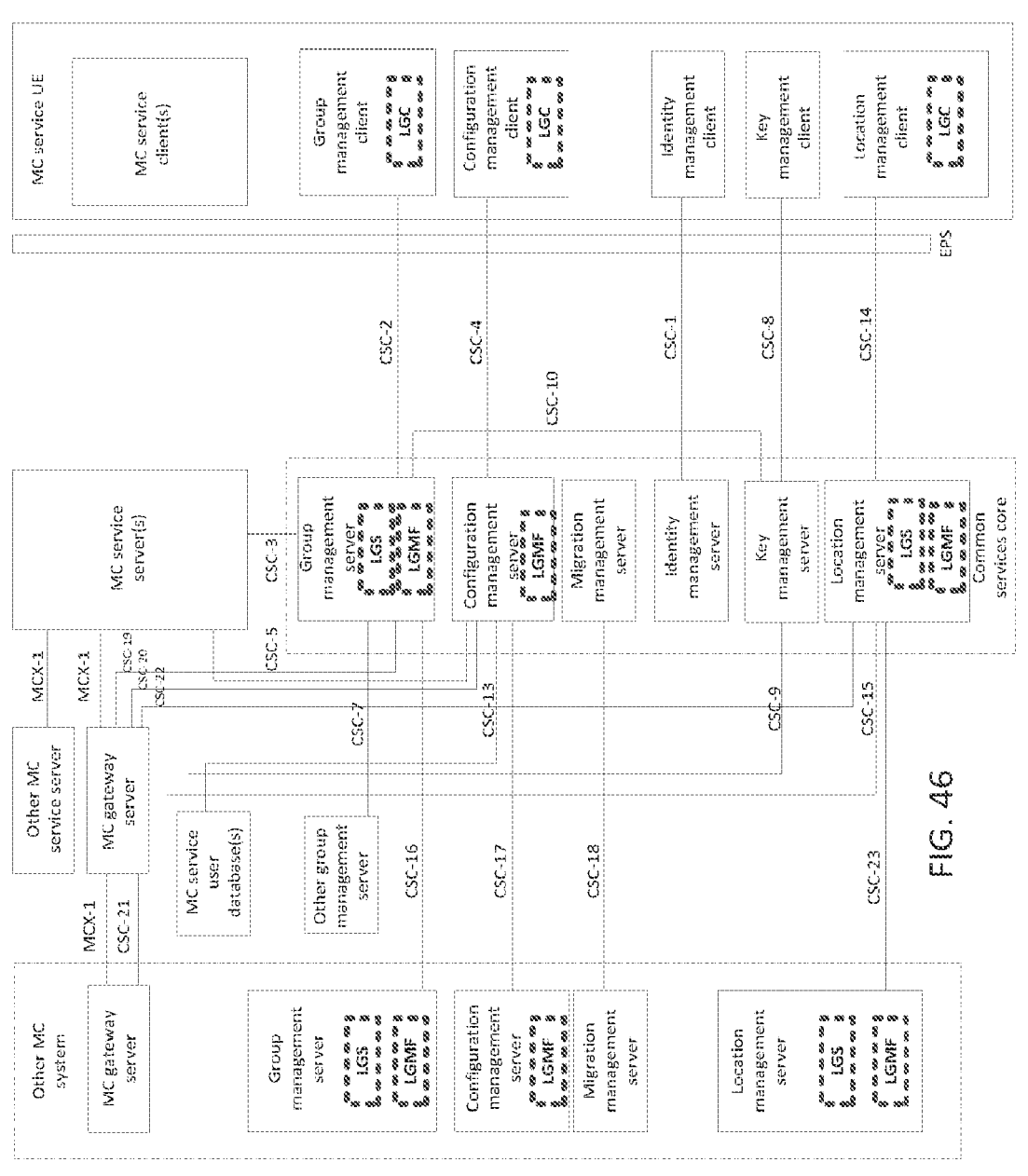
FIG. 46 shows an example of a 3GPP SA6 Mission Critical Embodiment.

FIG. 46 illustrates an embodiment of how the functionality defined herein may be realized in the 3GPP SA6 Mission Critical Architecture (e.g., 3GPP TR 23.744 v17.1.0).

The defined LGC functionality may be realized as new functionality added to the existing Location Management Client, Group Management Client and/or Configuration Management Client on a UE. Alternatively, the LGC may be realized as a new standalone function of a UE (not illustrated in FIG. 46). In this case, new reference points may be defined to support interaction with the new standalone LGC.

The defined LGS functionality may be realized as new functionality added to the existing Location Management Server and/or Group Management Server. Alternatively, the LGS may be realized as a new standalone function within the system (not illustrated in FIG. 46). This new standalone function may be deployed in the cloud or at the edge of the network. In this case, new reference points may be defined to support interaction with the new standalone LGS.

The defined LGMF functionality may be realized as new functionality added to the existing Location Management Server, Group Management Server and/or Configuration Management Server. Alternatively, the LGMF may be realized as a new standalone function within the system (not illustrated in FIG. 46). This new standalone function may be deployed in the cloud or at the edge of the network. In this case, new reference points may be defined to support interaction with the new standalone LGMF.

Table 17 provides an embodiment of how the reference points of the SA6 Mission Critical architecture could be aligned and enhanced with the functionality defined for each of the respective reference points herein.

TABLE 16

| oneM2M Reference Point Applicability | |
|---|---|
| Reference Point | oneM2M Reference Points |
| $I_{LGC\text{-}AC}$ | Mca |
| $I_{LGC\text{-}LGS}$ | Mcc |
| $I_{LGC\text{-}LGC}$ | Mcc |
| $I_{LGC\text{-}CN}$ | Mcn |
| $I_{LGC\text{-}LGMF}$ | Mcc, Mca or possible new reference point |
| $I_{LGS\text{-}AS}$ | Mca |
| $I_{LGS\text{-}CN}$ | Mcn |
| $I_{LGS\text{-}LGMF}$ | Mcc, Mca or possible new reference point |
| $I_{LGS\text{-}LGS}$ | Mcc, Mcc' |
| $I_{LGS\text{-}LS}$ | Mca, Mcn | oneM2M Embodiment

Figure 47:
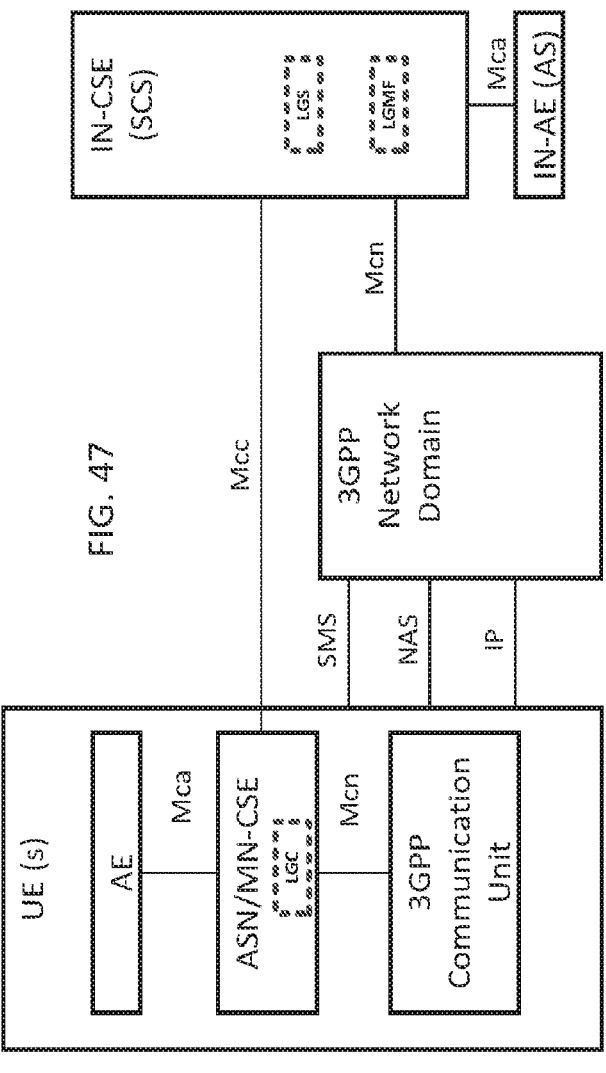
FIG. 47 shows an example of a oneM2M Embodiment.

FIG. 47 illustrates an embodiment of how the functionality defined herein may be realized in the oneM2M Architecture (e.g., oneM2M TS-0026, v4.2.0).

The defined LGC functionality may be realized as new functionality added to the existing oneM2M ASN/MN-CSE hosted on a UE. The defined LGS functionality may be realized as new functionality added to the existing oneM2M IN-CSE. The defined LGMF functionality may be realized as new functionality added to the existing oneM2M IN-CSE. Alternatively, the LGMF may be realized as a new standalone function within the system (not illustrated in FIG. 47). In this case, new reference points may be defined to support interaction with the new standalone LGMF.

Table 18 provides an embodiment of how the reference points of the SA6 EDGEAPP architecture could be aligned and enhanced with the functionality defined for each of the respective reference points herein.

LWM2M Embodiment

Figure 48:
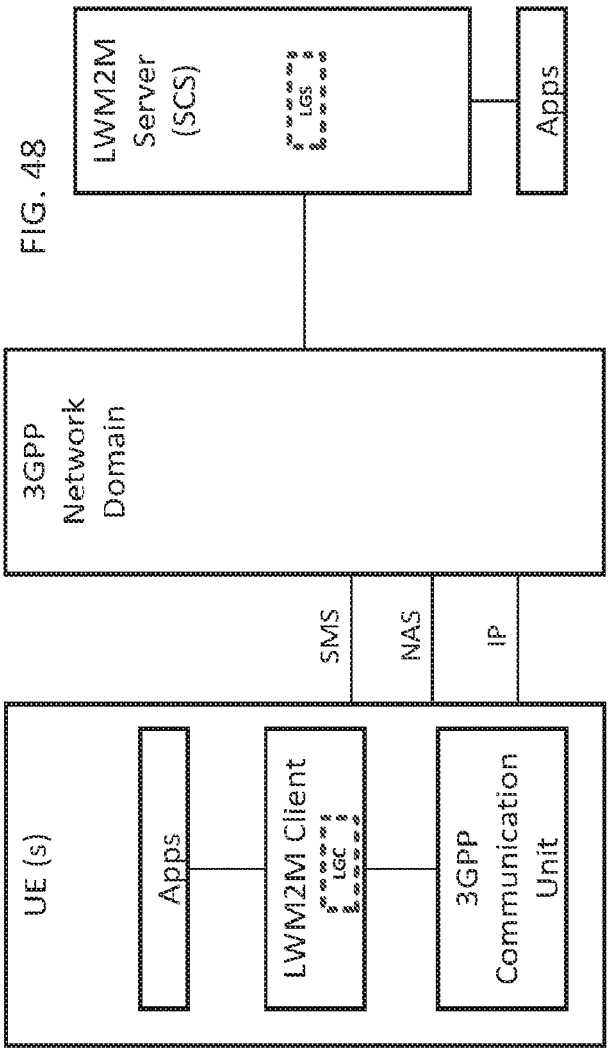
FIG. 48 shows an example of an LWM2M Embodiment.

FIG. 48 illustrates an embodiment of how the functionality defined herein may be realized in the OMA LWM2M Architecture (e.g., OMA LWM2M, v1.1).

The LGC defined functionality may be realized as new functionality added to the existing LWM2M Client hosted on a UE. The LGS defined functionality may be realized as new functionality added to the existing LWM2M Server function. The defined LGMF functionality may be realized as new functionality added to the existing LWM2M Server. Alternatively, the LGMF may be realized as a new standalone function within the system (not illustrated in FIG. 48).

In this case, new reference points may be defined to support interaction with the new standalone LGMF.

Locationing Group Protocol Embodiment

Each of the reference points defined herein may support the exchange of LG operational messages between each of the applicable entities in the system. The collection of these messages may form a protocol that is used to enable the exchange and performing of LG operations throughout the system.

In one embodiment, an LG protocol can be realized as a client/server messaging protocol where LGCs and LGSs can function in the role of a client and/or a server to exchange LG request and response messages with each other as well as other entities in the system (e.g., LGMF). For example, the information elements of the LG request and response protocol messages can be encapsulated and carried within the payloads of existing client/server protocols such HTTP, COAP or Web Sockets.

In another embodiment, these LG information elements can be encapsulated and carried within lower level protocols such as TCP or UDP without the use of higher layer protocols such as HTTP, COAP or Web Sockets.

In yet another embodiment, the LG requests and responses can be encapsulated and carried within publish/subscribe messaging protocols. For example, an entity in the system (e.g., LGS or another entity) can support message broker functionality. This broker functionality can be used by the LGC and LGS to exchange LG requests and responses with one another and/or other entities in the system (e.g., LGMF). This exchange can be facilitated by each entity subscribing to the message broker to receive messages from other entities. Likewise, each entity can publish messages to the message broker that target other entities. The information elements of the LG request and response protocol messages can be encapsulated and carried within the payloads of existing publish/subscribe protocols such MQTT or AMQP.

In yet another embodiment, user-defined content-aware operation information elements may be embedded within other protocols such as PC5 protocols for direct communication between LGCs.

GUI

Figure 49:
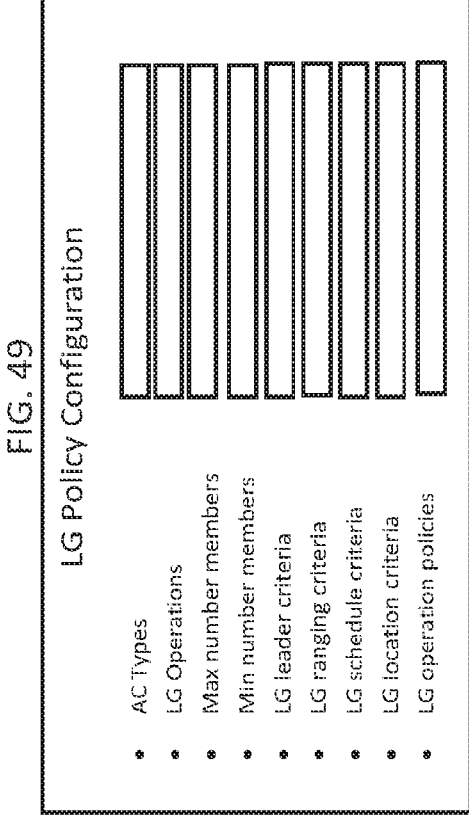
FIG. 49 shows an example of a GUI for Configuring LG Policies.

FIG. 49 shows an example GUI that may be used by a person who is operating a cellular device to configure LG policy settings associated with the cellular device. These policies may be used by the proposed LGC and/or LGS functionality defined herein.

Figure 50A:
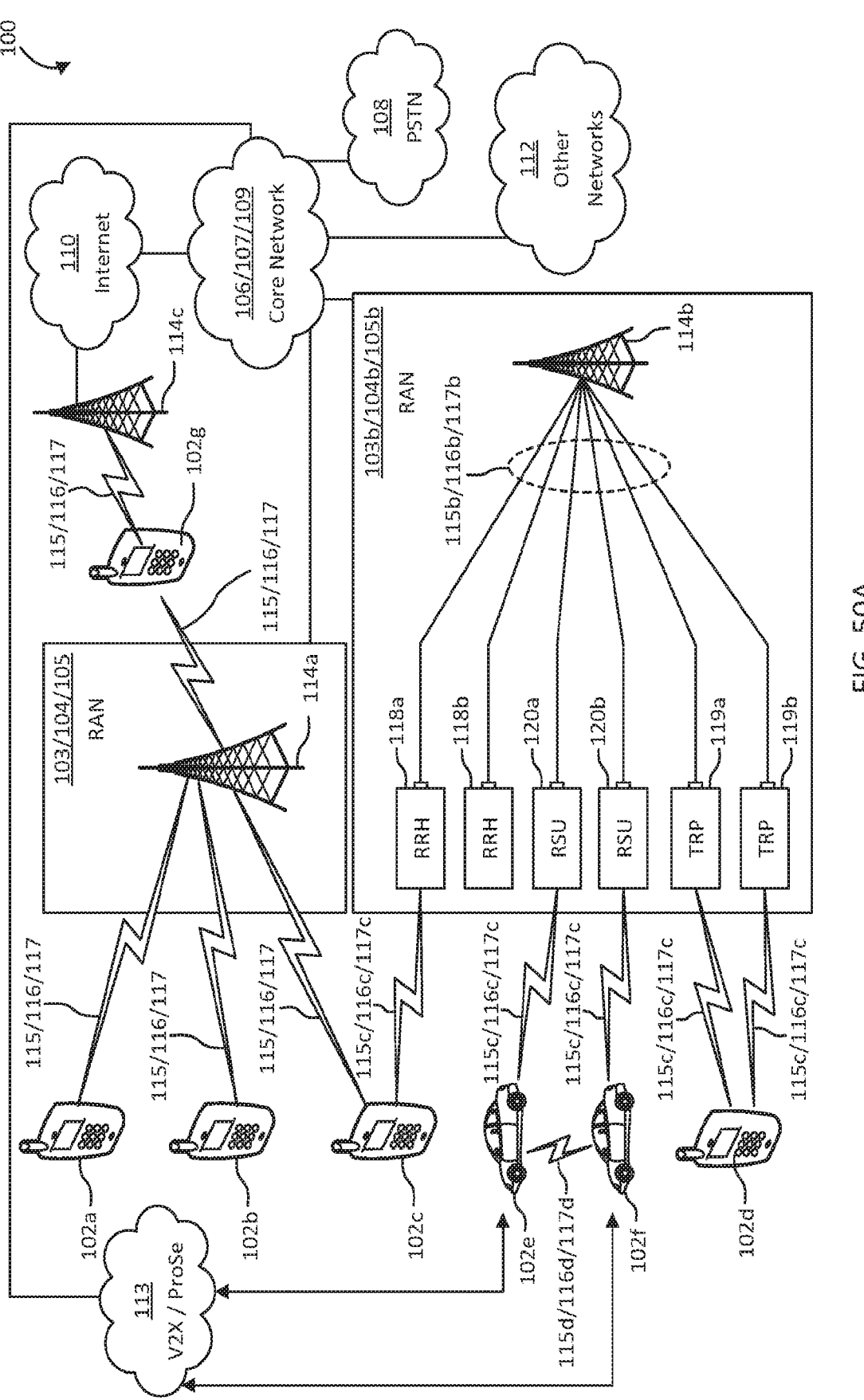
FIG. 50A shows an example communications system in which the methods and apparatuses described and claimed herein may be embodied.

FIG. 50A illustrates one embodiment of an example communications system 100 in which the methods and apparatuses described and claimed herein may be embodied. As shown, the example communications system 100 may include wireless transmit/receive units (WTRUs) 102*a*, 102*b*, 102*c*, 102*d*, 102*e*, 102*f*, and/or 102*g* (which generally or collectively may be referred to as WTRU 102), a radio access network (RAN) 103/104/105/103*b*/104*b*/105*b*, a core network 106/107/109, a public switched telephone network (PSTN) 108, the Internet 110, other networks 112, and V2X server (or ProSe function and server) 113, though it will be appreciated that the disclosed embodiments contemplate any number of WTRUs, base stations, networks, and/or network elements. Each of the WTRUs 102*a*, 102*b*, 102*c*, 102*d*, 102*e*, 102*f*, 102*g* may be any type of apparatus or device configured to operate and/or communicate in a wireless environment. Although each WTRU 102*a*, 102*b*, 102*c*, 102*d*, 102*e*, 102*f*, 102*g* is depicted in FIGS. 50A-50E as a hand-held wireless communications apparatus, it is understood that with the wide variety of use cases contemplated for 5G wireless communications, each WTRU may comprise or be embodied in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, truck, train, or airplane, and the like.

The communications system 100 may also include a base station 114*a* and a base station 114*b*. Base stations 114*a* may be any type of device configured to wirelessly interface with at least one of the WTRUs 102*a*, 102*b*, 102*c* to facilitate access to one or more communication networks, such as the core network 106/107/109, the Internet 110, and/or the other networks 112. Base stations 114*b* may be any type of device configured to wiredly and/or wirelessly interface with at least one of the RRHs (Remote Radio Heads) 118*a*, 118*b*, TRPs (Transmission and Reception Points) 119*a*, 119*b*, and/or RSUs (Roadside Units) 120*a* and 120*b* to facilitate access to one or more communication networks, such as the core network 106/107/109, the Internet 110, the other networks 112, and/or V2X server (or ProSe function and server) 113. RRHs 118*a*, 118*b* may be any type of device configured to wirelessly interface with at least one of the WTRU 102*c*, to facilitate access to one or more communication networks, such as the core network 106/107/109, the Internet 110, and/or the other networks 112. TRPs 119*a*, 119*b* may be any type of device configured to wirelessly interface with at least one of the WTRU 102*d*, to facilitate access to one or more communication networks, such as the core network 106/107/109, the Internet 110, and/or the other networks 112. RSUs 120*a* and 120*b* may be any type of device configured to wirelessly interface with at least one of the WTRU 102*e* or 102*f*, to facilitate access to one or more communication networks, such as the core network 106/107/109, the Internet 110, the other networks 112, and/or V2X server (or ProSe function and server) 113. By way of example, the base stations 114*a*, 114*b* may be a base transceiver station (BTS), a Node-B, an eNode B, a Home Node B, a Home eNode B, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 103/104/105, which may also include other base stations and/or network elements (not shown), such as a base station controller (BSC), a radio network controller (RNC), relay nodes, etc. The base station 114*b* may be part of the RAN 103*b*/104*b*/105*b*, which may also include other base stations and/or network elements (not shown), such as a base station controller (BSC), a radio network controller (RNC), relay nodes, etc. The base station 114*a* may be configured to transmit and/or receive wireless signals within a particular geographic region, which may be referred to as a cell (not shown). The base station 114*b* may be configured to transmit and/or receive wired and/or wireless signals within a particular geographic region, which may be referred to as a cell (not shown). The cell may further be divided into cell sectors. For example, the cell associated with the base station 114*a* may be divided into three sectors. Thus, in an embodiment, the base station 114*a* may include three transceivers, e.g., one for each sector of the cell. In an embodiment, the base station 114a may employ multiple-input multiple output (MIMO) technology and, therefore, may utilize multiple transceivers for each sector of the cell.

The base stations 114a may communicate with one or more of the WTRUs 102a, 102b, 102c over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b, TRPs 119a, 119b, and/or RSUs 120a and 120b, over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable radio access technology (RAT).

The RRHs 118a, 118b, TRPs 119a, 119b and/or RSUs 120a, 120b, may communicate with one or more of the WTRUs 102c, 102d, 102e, 102f over an air interface 115c/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT).

The WTRUs 102a, 102b, 102c, 102d, 102e, 102f, and/or 102g may communicate with one another over an air interface 115d/116d/117d (not shown in the figures), which may be any suitable wireless communication link (e.g., radio frequency (RF), microwave, infrared (IR), ultraviolet (UV), visible light, cmWave, mmWave, etc.). The air interface 115d/116d/117d may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b, TRPs 119a, 119b and RSUs 120a, 120b, in the RAN 103b/104b/105b and the WTRUs 102c, 102d, 102e, 102f, may implement a radio technology such as Universal Mobile Telecommunications System (UMTS) Terrestrial Radio Access (UTRA), which may establish the air interface 115/116/117 or 115c/116c/117c respectively using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c, or RRHs 118a, 118b, TRPs 119a, 119b, and/or RSUs 120a, 120b, in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) and/or LTE-Advanced (LTE-A). In the future, the air interface 115/116/117 may implement 3GPP NR technology. The LTE and LTE-A technology includes LTE D2D and V2X technologies and interface (such as Sidelink communications, etc.) The 3GPP NR technology includes NR V2X technologies and interface (such as Sidelink communications, etc.)

In an embodiment, the base station 114a in the RAN 103/104/105 and the WTRUs 102a, 102b, 102c, or RRHs 118a, 118b, TRPs 119a, 119b and/or RSUs 120a, 120b, in the RAN 103b/104b/105b and the WTRUs 102c, 102d, 102e, 102f may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 50A may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114c and the WTRUs 102e, may implement a radio technology such as IEEE 802.11 to establish a wireless local area network (WLAN). In an embodiment, the base station 114c and the WTRUs 102d, may implement a radio technology such as IEEE 802.15 to establish a wireless personal area network (WPAN). In yet another embodiment, the base station 114c and the WTRUs 102e, may utilize a cellular-based RAT (e.g., WCDMA, CDMA2000, GSM, LTE, LTE-A, etc.) to establish a picocell or femtocell. As illustrated in FIG. 50A, the base station 114b may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication.

Although not illustrated in FIG. 50A, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d, 102e to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 and/or RAN 103b/104b/105b or a different RAT.

Some or all of the WTRUs 102a, 102b, 102c, 102d in the communications system 100 may include multi-mode capabilities, e.g., the WTRUs 102a, 102b, 102c, 102d, and 102e may include multiple transceivers for communicating with different wireless networks over different wireless links. For example, the WTRU 102e illustrated in FIG. 50A may be configured to communicate with the base station 114a, which may employ a cellular-based radio technology, and with the base station 114c, which may employ an IEEE 802 radio technology.

Figure 50B:
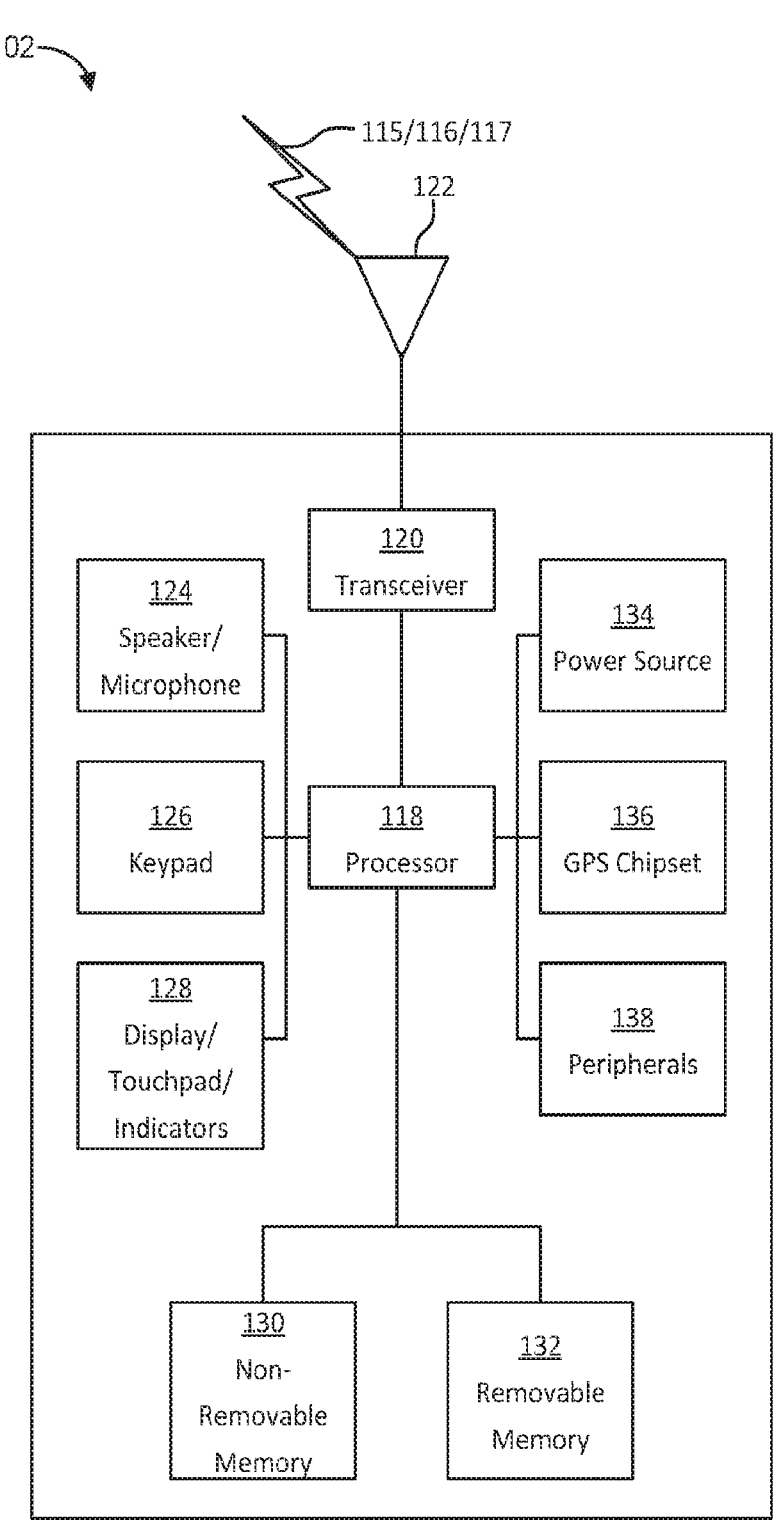
FIG. 50B is a block diagram of an example apparatus or device configured for wireless communications.

FIG. 50B is a block diagram of an example apparatus or device configured for wireless communications in accordance with the embodiments illustrated herein, such as for example, a WTRU 102. As illustrated in FIG. 50B, the example WTRU 102 may include a processor 118, a transceiver 120, a transmit/receive element 122, a speaker/microphone 124, a keypad 113, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 50B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 50B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 50B as a single element, the WTRU 102 may include any number of transmit/receive elements 122.

More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit). The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The WTRU 102 may connect to other components, modules, or systems of such apparatuses or devices via one or more interconnect interfaces, such as an interconnect interface that may comprise one of the peripherals 138.

Figure 50C:
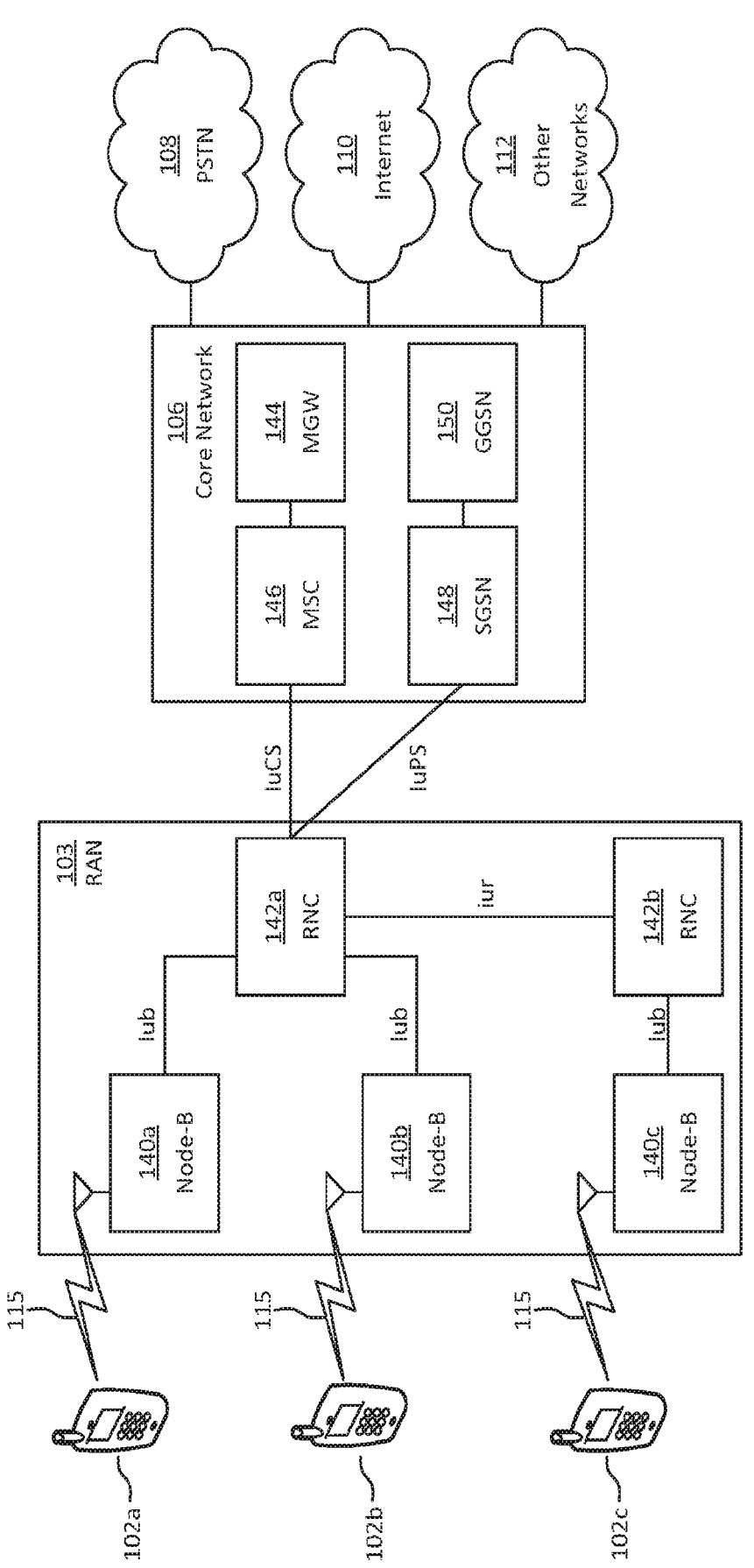
FIG. 50C is a system diagram of an example radio access network (RAN) and core network.

FIG. 50C is a system diagram of the RAN 103 and the core network 106 according to an embodiment. As noted above, the RAN 103 may employ a UTRA radio technology to communicate with the WTRUs 102a, 102b, and 102c over the air interface 115. The RAN 103 may also be in communication with the core network 106. As illustrated in FIG. 50C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As illustrated in FIG. 50C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro-diversity, security functions, data encryption, and the like.

The core network 106 illustrated in FIG. 50C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 50D:
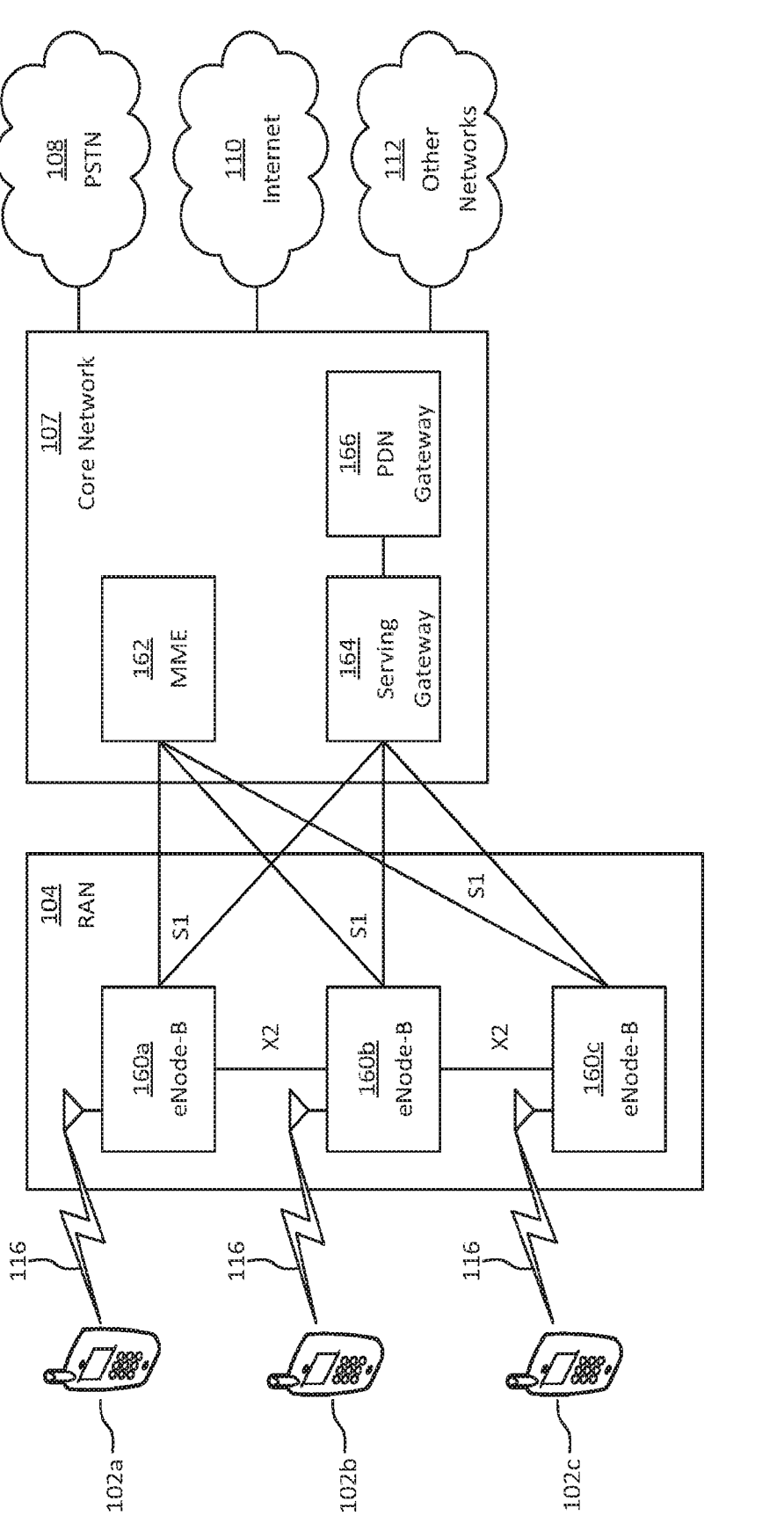
FIG. 50D is a system diagram of another example RAN and core network.

FIG. 50D is a system diagram of the RAN 104 and the core network 107 according to an embodiment. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As illustrated in FIG. 50D, the eNode-Bs 160a, 160b, 160c may communicate with one another over an X2 interface.

The core network 107 illustrated in FIG. 50D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 50E:
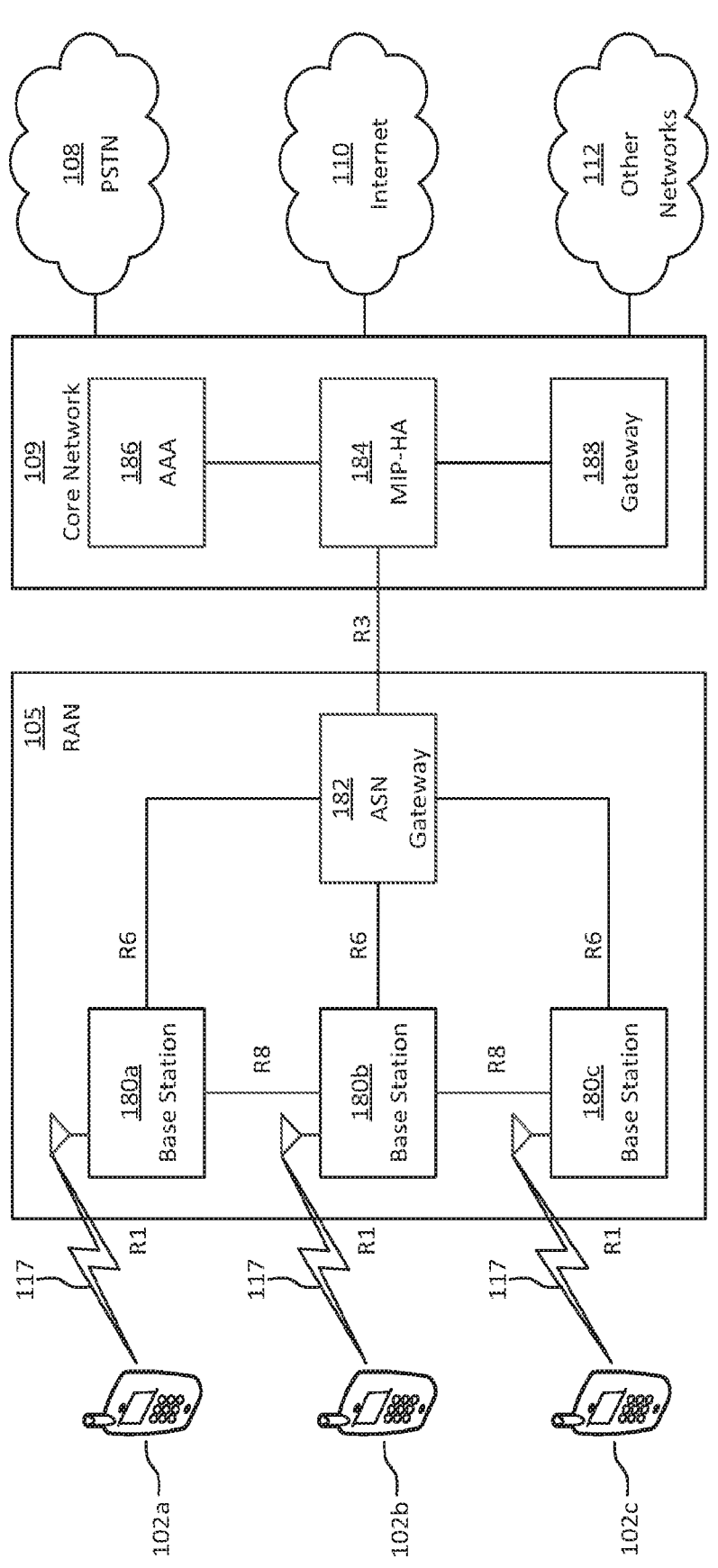
FIG. 50E is a system diagram of another example RAN and core network.

FIG. 50E is a system diagram of the RAN 105 and the core network 109 according to an embodiment. The RAN 105 may be an access service network (ASN) that employs IEEE 802.16 radio technology to communicate with the WTRUs 102a, 102b, and 102c over the air interface 117. As will be further discussed below, the communication links between the different functional entities of the WTRUs 102a, 102b, 102c, the RAN 105, and the core network 109 may be defined as reference points.

As illustrated in FIG. 50E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell in the RAN 105 and may include one or more transceivers for communicating with the WTRUs 102a, 102b, 102c over the air interface 117. In an embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, and 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, and 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As illustrated in FIG. 50E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not illustrated in FIG. 50E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

The core network entities described herein and illustrated in FIGS. 50A, 50C, 50D, and 50E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 50A, 50B, 50C, 50D, and 50E are provided by way of example only, and it is understood that the subject matter disclosed and claimed herein may be embodied or implemented in any similar communication system, whether presently defined or defined in the future.

Figure 50F:
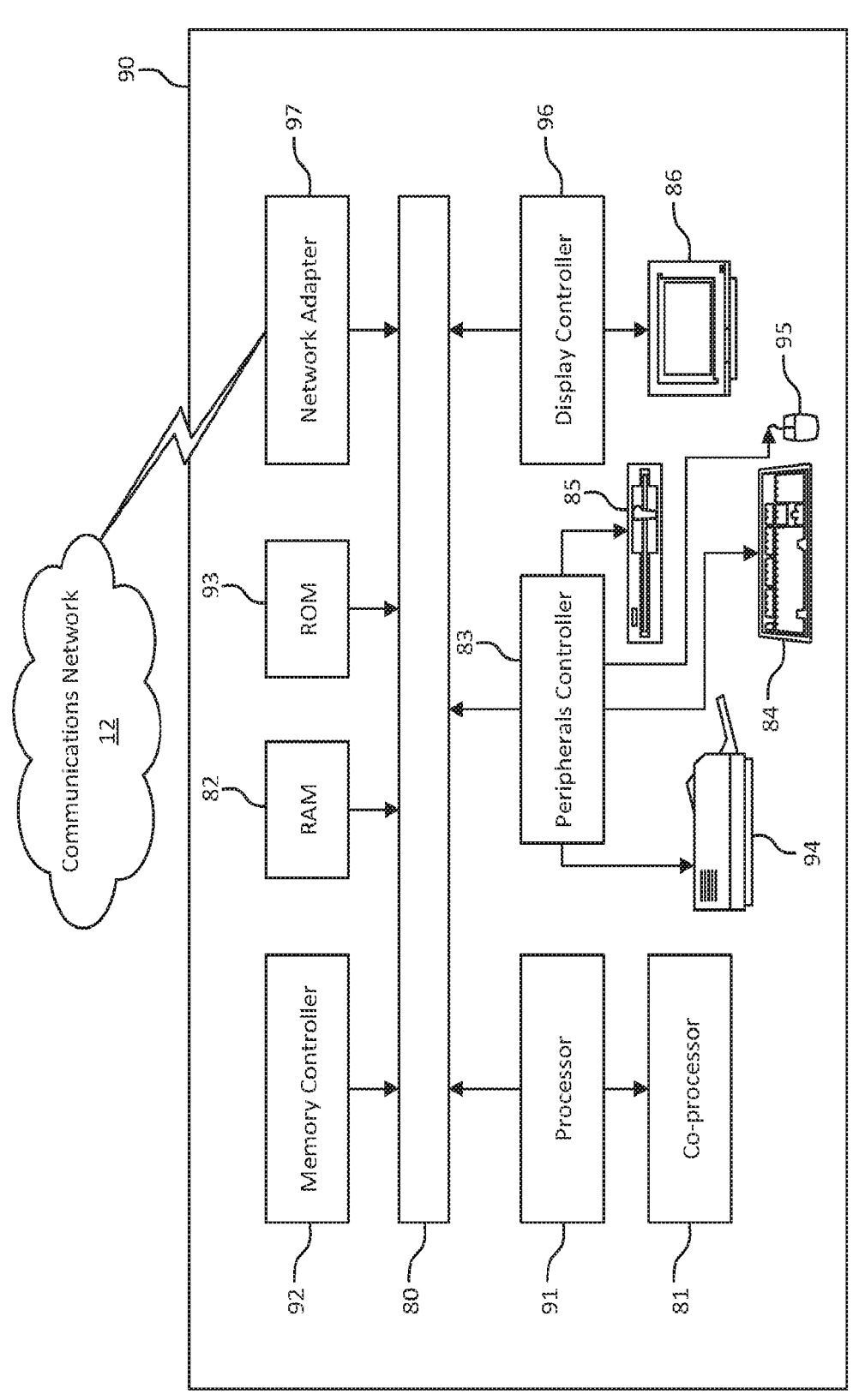
FIG. 50F is a block diagram of an example computing system.

FIG. 50F is a block diagram of an exemplary computing system 90 in which one or more apparatuses of the communications networks illustrated in FIGS. 50A, 50C, 50D and 50E may be embodied, such as certain nodes or functional entities in the RAN 103/104/105, Core Network 106/107/109, PSTN 108, Internet 110, or Other Networks 112. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91.

Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adapter 97, that may be used to connect computing system 90 to an external communications network, such as the RAN 103/104/105, Core Network 106/107/109, PSTN 108, Internet 110, or Other Networks 112 of FIGS. 50A, 50B, 50C, 50D, and 50E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

Figure 50G:
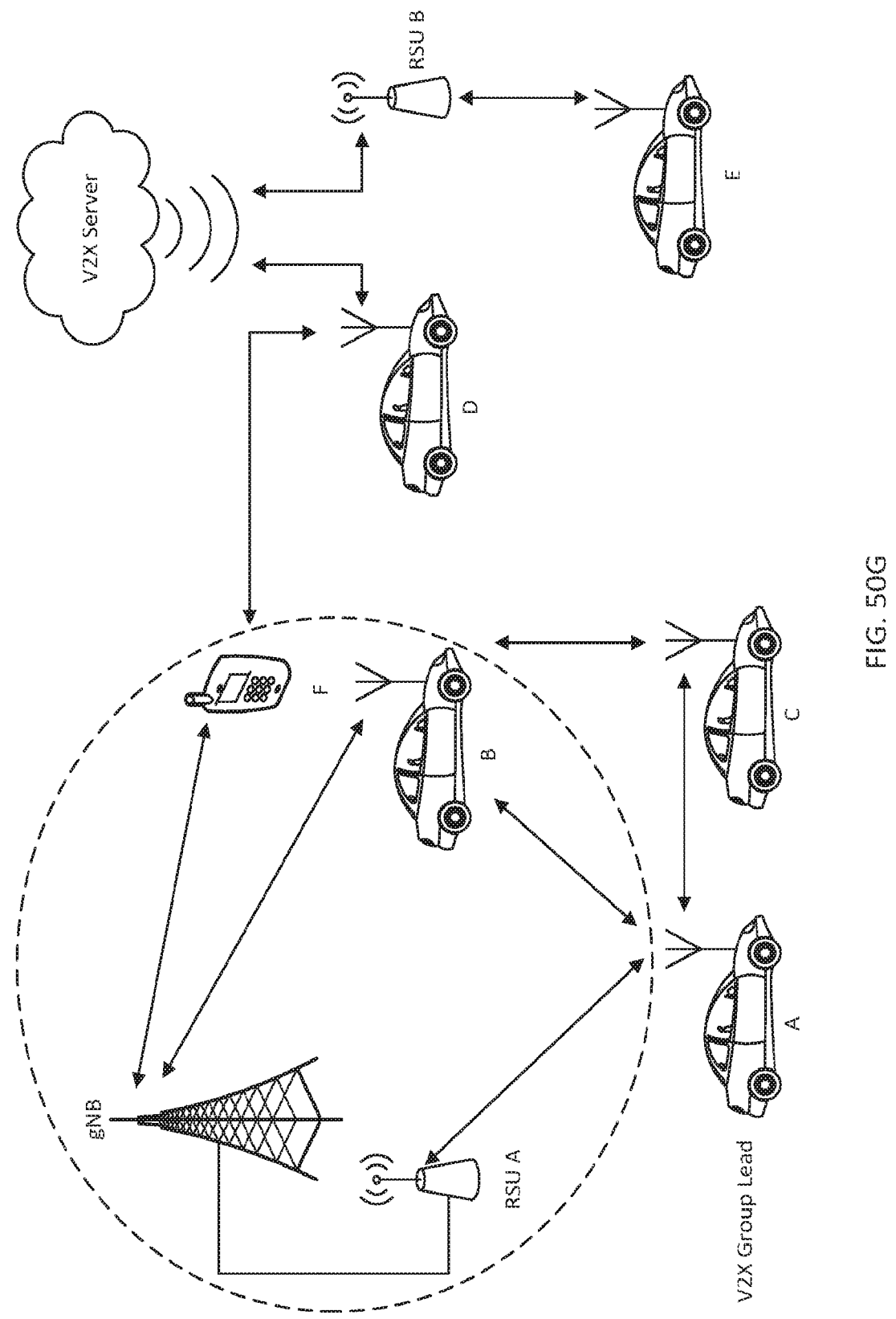
FIG. 50G is a block diagram of another example communications system.

FIG. 50G illustrates one embodiment of an example communications system 111 in which the methods and apparatuses described and claimed herein may be embodied. As shown, the example communications system 111 may include wireless transmit/receive units (WTRUs) A, B, C, D, E, F, a base station, a V2X server, and a RSUs A and B, though it will be appreciated that the disclosed embodiments contemplate any number of WTRUs, base stations, networks, and/or network elements. One or several or all WTRUs A, B, C, D, E can be out of range of the network (for example, in the figure out of the cell coverage boundary shown as the dash line). WTRUs A, B, C form a V2X group, among which WTRU A is the group lead and WTRUs B and C are group members. WTRUs A, B, C, D, E, F may communicate over Uu interface or Sidelink (PC5) interface.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations or functions described herein may be implemented in the form of such computer executable instructions, executing on the processor of an apparatus or computing system configured for wireless and/or wired network communications. Computer readable storage media include volatile and nonvolatile, removable and non-removable media implemented in any non-transitory (e.g., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

What is claimed is:

1. A method of tracking mobile devices on a group basis, the method comprising:
   receiving, at a location group server, location information for each of a plurality of mobile devices;
   determining, by the location group server based on the location information, that a distance between each of the plurality of mobile devices satisfies a distance threshold;
   triggering, by the location group server based on the satisfaction of the distance threshold, one or more location group operations; and
   receiving, by the location group server, a location update from a device of the plurality of mobile devices.

2. The method of claim 1, wherein the location update is not received by the location group server from a remainder of the plurality of mobile devices.

3. The method of claim 1, wherein the one or more location group operations comprises selecting a lead mobile device of the plurality of mobile devices.

4. The method of claim 1, wherein the one or more location group operations comprises adding or removing a member from a location group.

5. The method of claim 1, wherein the one or more location group operations comprises assigning a leader to a location group.

6. The method of claim 1, wherein the one or more location group operations comprises configuring a client to start or stop reporting location information.

7. The method of claim 1, wherein the one or more location group operations comprises controlling a frequency at which location information is reported.

8. The method of claim 1, wherein the location information is selected from a group consisting of a location group client identifier, a location group client credential, an identifier of an application client associated with a location group client, an application client context, a location group client registration result, a location group client policy, a location group server context, a device identifier, a time duration, and a threshold number of mobile devices.

9. An apparatus, the apparatus being a locationing group server comprising a processor, communications circuitry, and a memory comprising instructions which, when executed by the processor cause the apparatus to:

receive location information for each of a plurality of mobile devices;

determine, based on the location information, that a distance between each of the plurality of mobile devices satisfies a distance threshold;

trigger, based on the satisfaction of the distance threshold, one or more location group operations; and receive a location update from a device of the plurality of mobile devices.

10. The apparatus of claim 9, wherein the location update is not received from a remainder of the plurality of mobile devices.

11. The apparatus of claim 9, wherein the one or more location group operations comprises selecting a lead mobile device of the plurality of mobile devices.

12. The apparatus of claim 9, wherein the one or more location group operations comprises adding or removing a member from a location group.

13. The apparatus of claim 9, wherein the one or more location group operations comprises assigning a leader to a location group.

14. The apparatus of claim 9, wherein the one or more location group operations comprises configuring a client to start or stop reporting location information.

15. The apparatus of claim 9, wherein the one or more location group operations comprises controlling a frequency at which location information is reported.

16. The apparatus of claim 9, wherein the location information is selected from a group consisting of a location group client identifier, a location group client credential, an identifier of an application client associated with a location group client, an application client context, a location group client registration result, a location group client policy, a location group server context, a device identifier, a time duration, and a threshold number of mobile devices.

17. An apparatus, the apparatus being a User Equipment (UE) comprising a processor, communications circuitry, and a memory comprising instructions which, when executed by the processor cause the apparatus to:

transmit location information associated with the UE to a location group server;

receive, from the location group server, one or more location group operations, wherein the one or more location group operations are based at least in part on determining, based on the location information, that a distance between each of a plurality of mobile devices satisfies a distance threshold and the location group operations comprise forming a location group including the UE and the plurality of mobile devices; and transmit, based on the one or more location group operations, a location update, wherein the location update comprises a group location of the plurality of mobile devices.

18. The apparatus of claim 17, wherein the location update is not transmitted by a remainder of the plurality of mobile devices.

19. The method of claim 1, further comprising receiving, by the location group server, a request to subscribe to a location group, wherein the request to subscribe to the location group comprises the distance threshold and the one or more location group operations are based on the request to subscribe to the location group.

20. The apparatus of claim 9, wherein the instructions, when executed by the processor, further cause the apparatus to receive, by the location group server, a request to subscribe to a location group, wherein the request to subscribe to the location group comprises the distance threshold and the one or more location group operations are based on the request to subscribe to the location group.

* * * * *